US008368701B2

(12) United States Patent
Paltashev et al.

(10) Patent No.: US 8,368,701 B2
(45) Date of Patent: Feb. 5, 2013

(54) METAPROCESSOR FOR GPU CONTROL AND SYNCHRONIZATION IN A MULTIPROCESSOR ENVIRONMENT

(75) Inventors: Timour Paltashev, Fremont, CA (US); Boris Prokopenko, Milpitas, CA (US); John Brothers, Sunnyvale, CA (US)

(73) Assignee: Via Technologies, Inc., Taipei (TW)

( * ) Notice: Subject to any disclaimer, the term of this patent is extended or adjusted under 35 U.S.C. 154(b) by 647 days.

(21) Appl. No.: 12/266,034

(22) Filed: Nov. 6, 2008

(65) Prior Publication Data

US 2010/0110083 A1    May 6, 2010

(51) Int. Cl.
*G06F 15/00* (2006.01)
*G06F 1/00* (2006.01)
*G06T 1/20* (2006.01)
*G06T 1/00* (2006.01)
*G06T 15/00* (2011.01)

(52) U.S. Cl. .................... 345/501; 345/506; 345/522
(58) Field of Classification Search .................. None
See application file for complete search history.

(56) References Cited

U.S. PATENT DOCUMENTS

| 2002/0152010 A1* | 10/2002 | Colmenarez et al. | 701/36 |
| 2007/0091101 A1* | 4/2007 | Huang et al. | 345/506 |
| 2008/0074433 A1* | 3/2008 | Jiao et al. | 345/522 |
| 2009/0160867 A1* | 6/2009 | Grossman | 345/522 |
| 2009/0248941 A1* | 10/2009 | Morein et al. | 710/308 |

OTHER PUBLICATIONS

Adam Moerschell and John D. Owens. Distributed texture memory in a multi-GPU environment. Computer Graphics Forum, vol. 27, Issue 1, pp. 130-151, Mar. 2008. Article published online: Oct. 31, 2007.*

* cited by examiner

*Primary Examiner* — Kee M Tung
*Assistant Examiner* — Zhengxi Liu
(74) *Attorney, Agent, or Firm* — McClure, Qualey & Rodack, LLP

(57) ABSTRACT

Included are embodiments of systems and methods for processing metacommands. In at least one exemplary embodiment a Graphics Processing Unit (GPU) includes a metaprocessor configured to process at least one context register, the metaprocessor including context management logic and a metaprocessor control register block coupled to the metaprocessor, the metaprocessor control register block configured to receive metaprocessor configuration data, the metaprocessor control register block further configured to define metacommand execution logic block behavior. Some embodiments include a Bus Interface Unit (BIU) configured to provide the access from a system processor to the metaprocessor and a GPU command stream processor configured to fetch a current context command stream and send commands for execution to a GPU pipeline and metaprocessor.

26 Claims, 35 Drawing Sheets

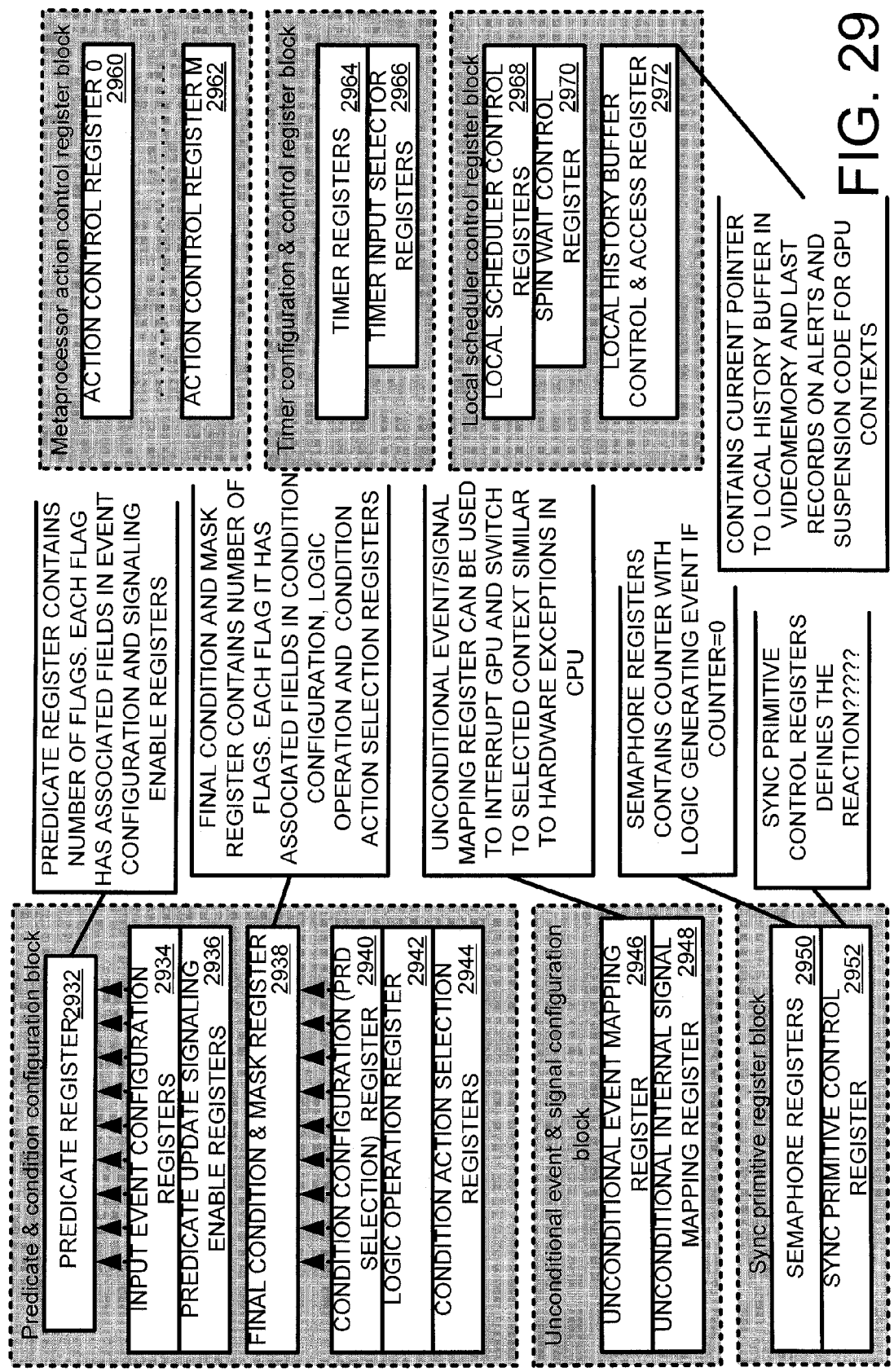

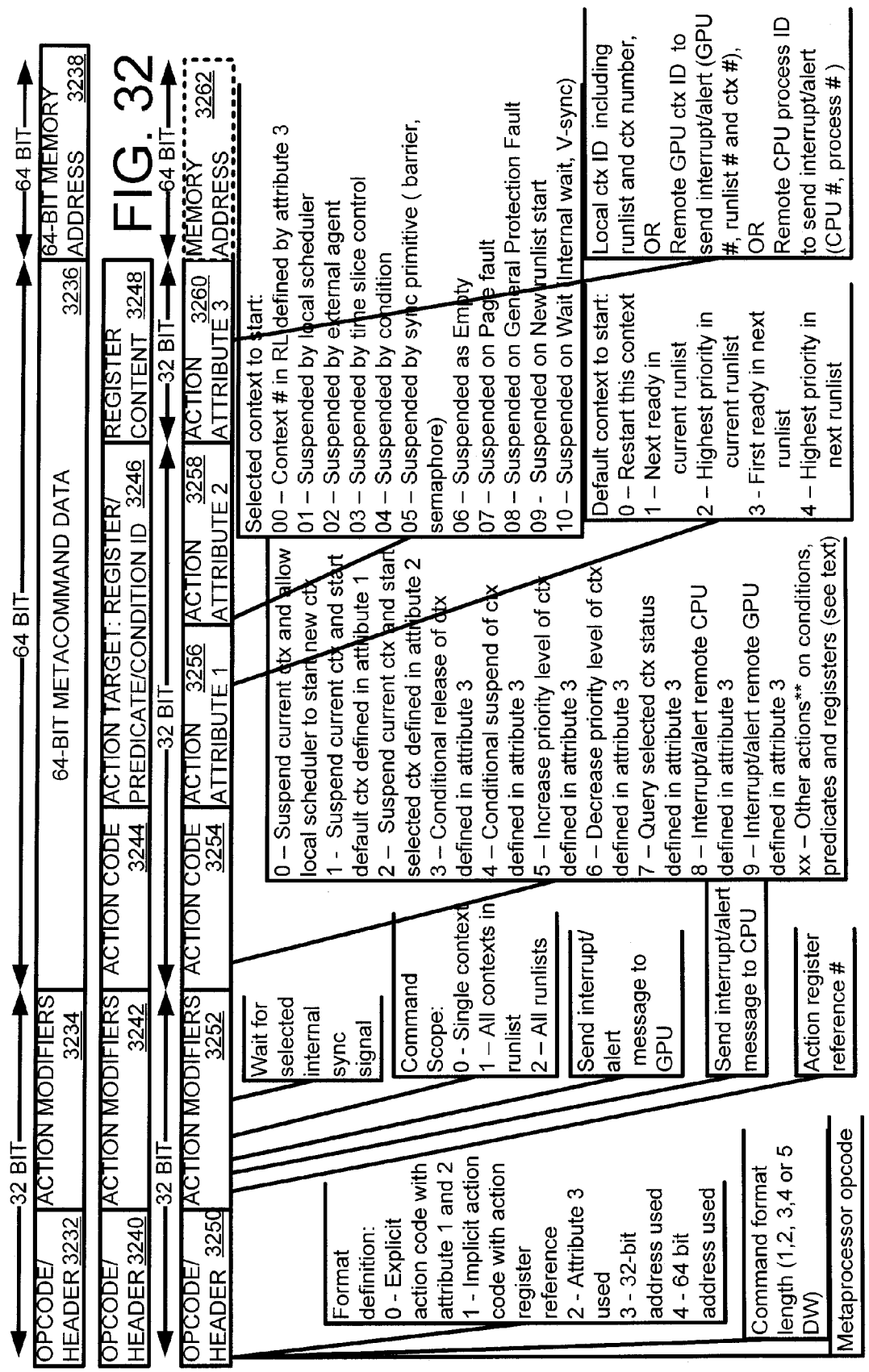

METAPROCESSOR FOR GPU CONTROL AND SYNCHRONIZATION IN A MULTIPROCESSOR ENVIRONMENT

CROSS REFERENCE TO RELATED APPLICATIONS

This application is related to copending U.S. Utility patent applications entitled "Support of a Plurality of Graphic Processing Units" and "Multiple GPU Context Synchronization Using Barrier Type Primitives" accorded Ser. Nos. 12/266,078, and 12/266,115 respectively.

BACKGROUND

As computer generated graphics have evolved, the demand for processing capabilities has increased. While a single central processing unit (CPU) has historically been utilized to process instructions for rendering graphics, many graphics applications can be better realized with additional hardware. More specifically, as graphics demands have increased, the use of multiple CPUs, and/or a graphics processing unit (GPU) has also been utilized. The introduction of a GPU into a computer has helped streamline the processing of graphics instructions. While the introduction of a GPU has increased graphics capabilities, many dynamic graphics scenes are more suitably rendered with the utilization of a plurality of GPUs. In introducing more than one GPU into a computing environment, synchronization of the GPUs may be desirable.

Software-based multiple CPU synchronization mechanisms have been utilized. However, because of the nature of recently developed GPUs, which may utilize stream type architecture and may run a plurality of contexts, the existing multiple CPU synchronization support may not adequately fulfill the desired software and/or hardware functionality. Introduction of a PCI-Express system interface may provide a generic message transport level for communication between a plurality of CPUs and GPUs in the computer system as well as coherency support between data blocks in main and local memories.

PCI-Express locked transaction can be configured to support messages and vendor defined messages that can be used as low level primitives for implementation of different synchronization types. However, this mechanism may not contain desired GPU synchronization support and vendors must define their messages to support multi-CPU and multi-GPU configurations of the system, as well as special hardware blocks in GPU architecture. These messages may be defined as GPU metacommands which control the activity of GPU on input command stream manipulating.

SUMMARY

Included are embodiments of systems and methods for processing metacommands for controlling GPU activity on an input command stream level. In at least one exemplary embodiment a Graphics Processing Unit (GPU) includes a metaprocessor configured to process at least one context register, the metaprocessor including context management logic and a metaprocessor control register block coupled to the metaprocessor, the metaprocessor control register block configured to receive metaprocessor configuration data, the metaprocessor control register block further configured to define context management logic block behavior. Some embodiments include a Bus Interface Unit (BIU) configured to provide the access from a system processor to the metaprocessor and a GPU command stream processor configured to fetch a current context command stream and send commands for execution to a GPU pipeline.

Also included are embodiments of a system for processing metacommands. At least one embodiment includes metacommand execution logic configured to execute at least one metacommand; a context description register block configured to receive a context signal and a context status update signal and provide a context status to metacommand execution logic and a metaprocessor control register block configured to receive a predicate and condition signal and provide a final condition signal to metacommand execution logic. Some embodiments include an implicit metacommand decoder configured to detect a register update and at least one GPU signal.

Also included are embodiments of a method. At least one embodiment of a method includes detecting a new metacommand and determining whether the detected metacommand is an implicit metacommand. Some embodiments include in response to determining that the detected metacommand is an implicit metacommand, updating a context register and detecting an event type associated with the updated context register and determining whether the detected metacommand is an explicit metacommand. Some embodiments include in response to determining that the detected metacommand is an explicit metacommand, determining whether action encoding is a direct action code and, in response to determining that the action encoding is a direct action code, decoding the action and sending the action code to a logic block.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

Figure 20A:
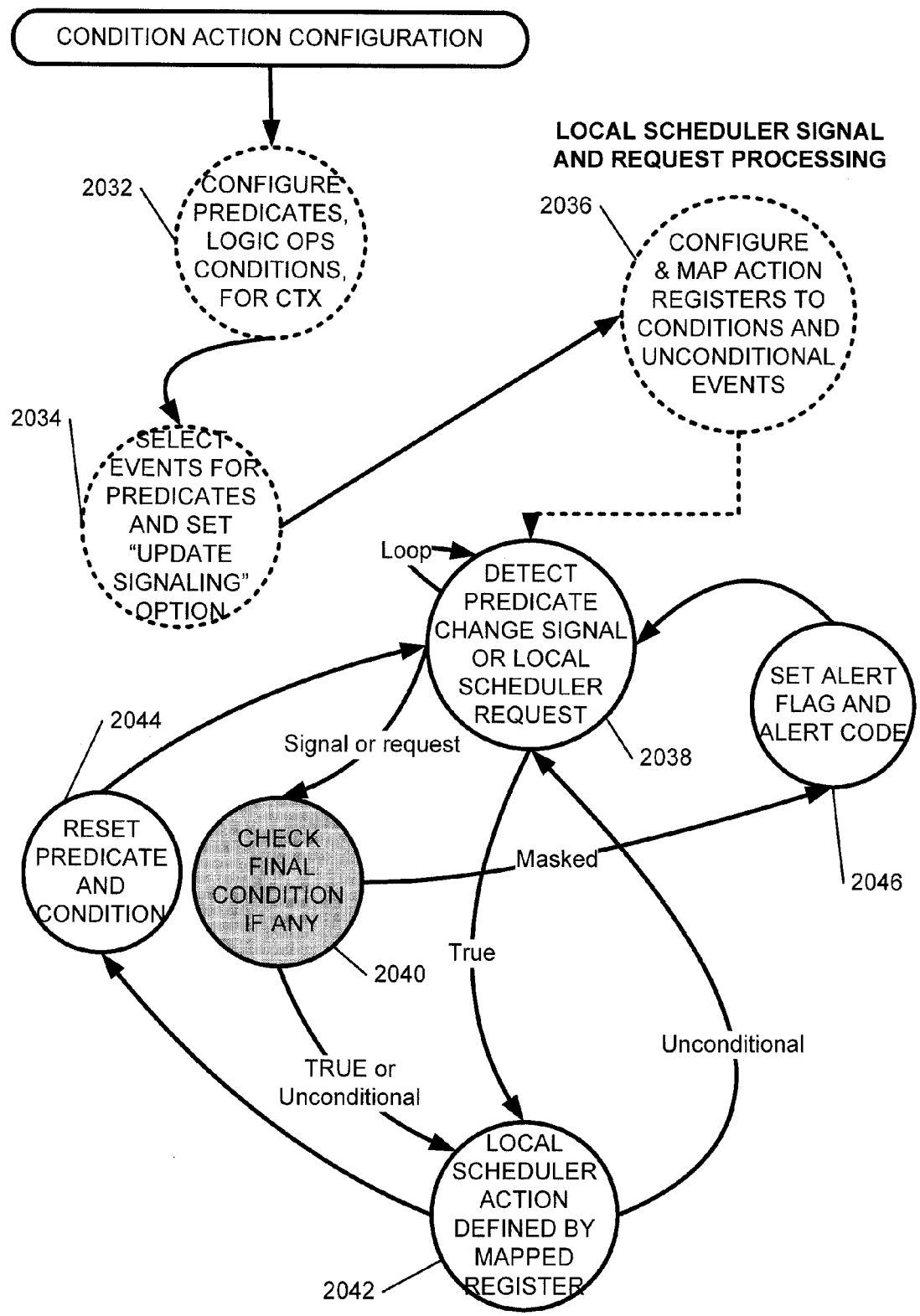
FIG. 20A is an exemplary state machine of signal and request processing, similar to the state machine from FIG. 19.
Figure 20B:
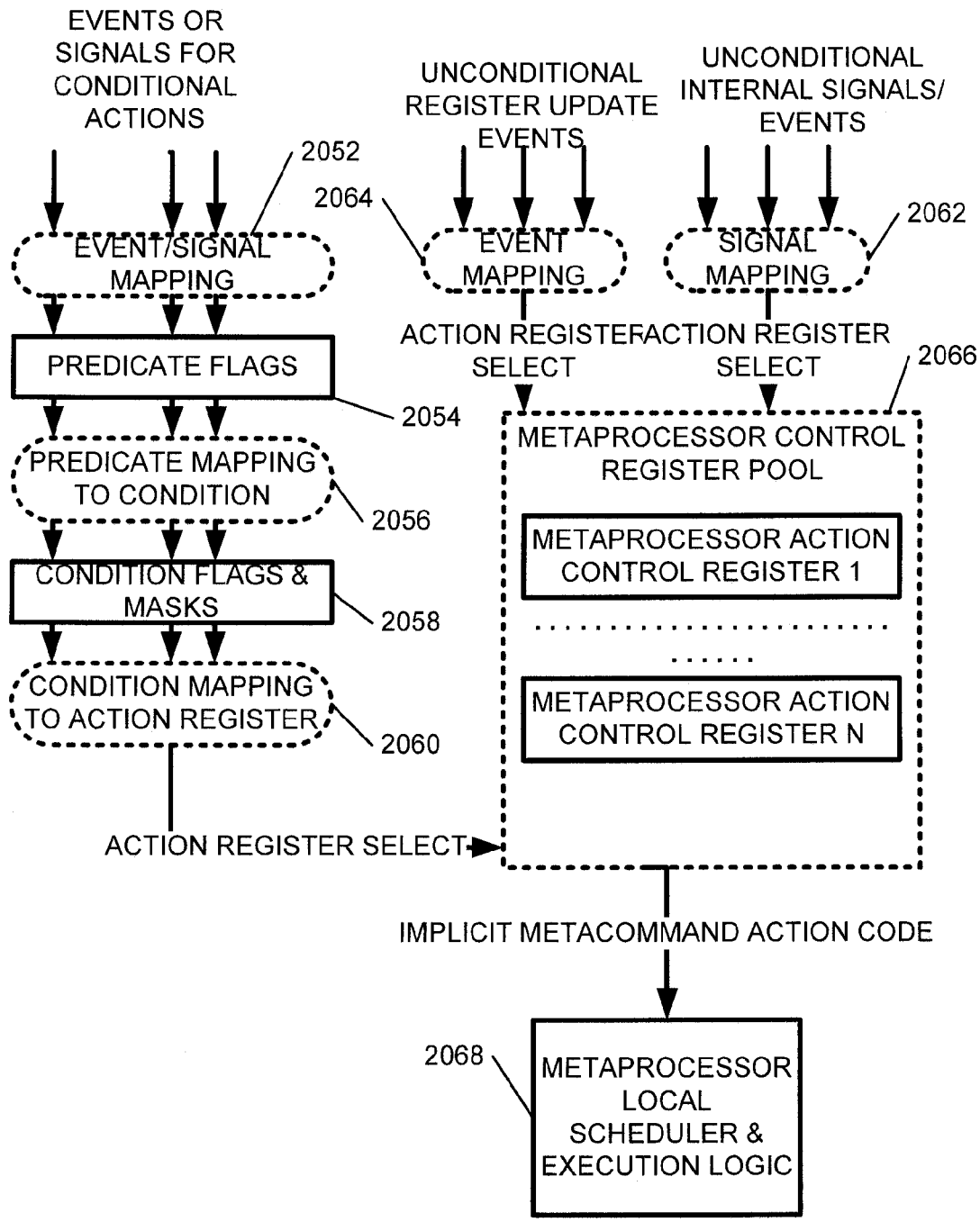

FIG. 20B an exemplary illustration of conditional and unconditional event processing in a metaprocessor.

Figure 21:
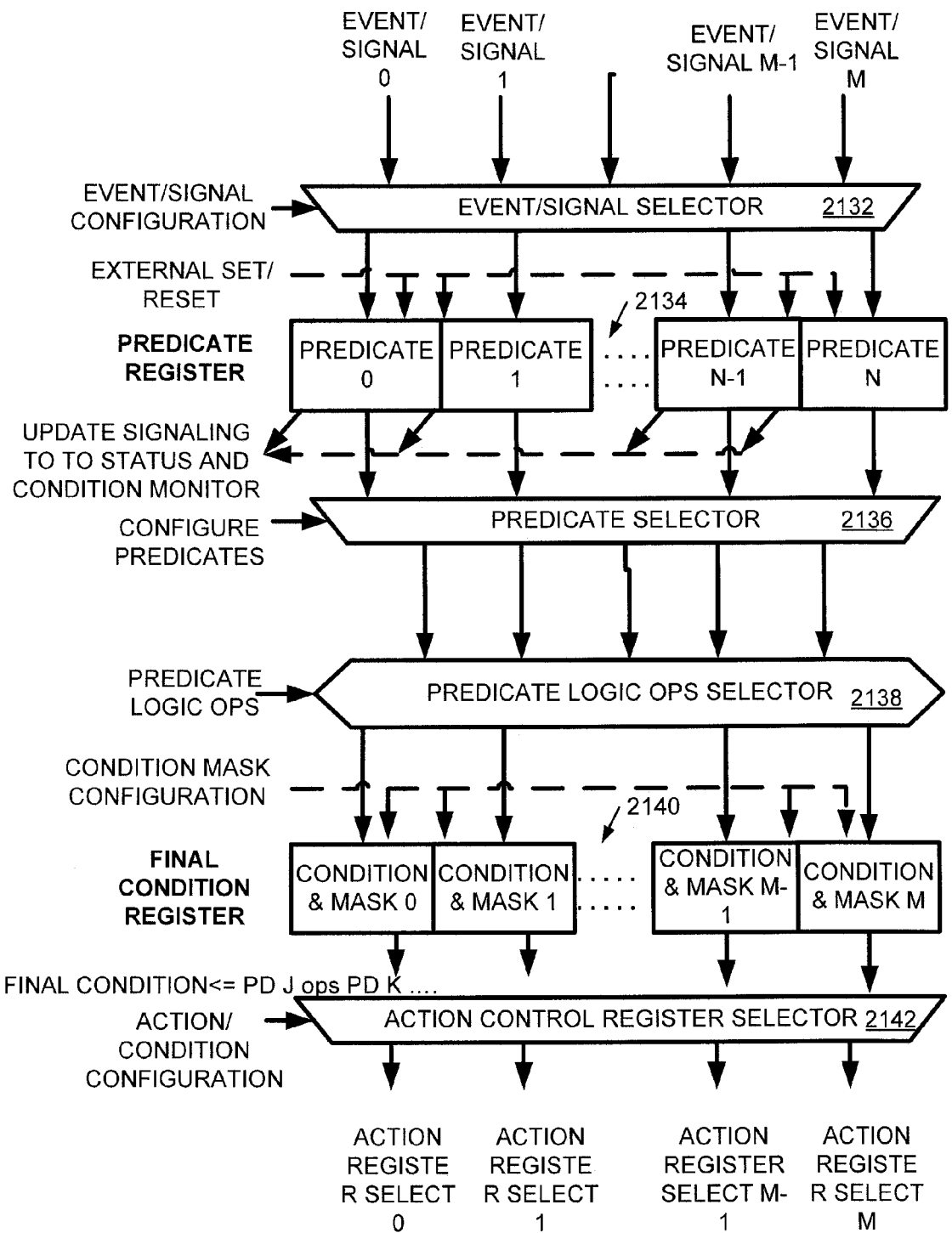

FIG. 21 is another exemplary illustration of event processing, similar to the diagram from FIGS. 20A and 20B.

Figure 22:
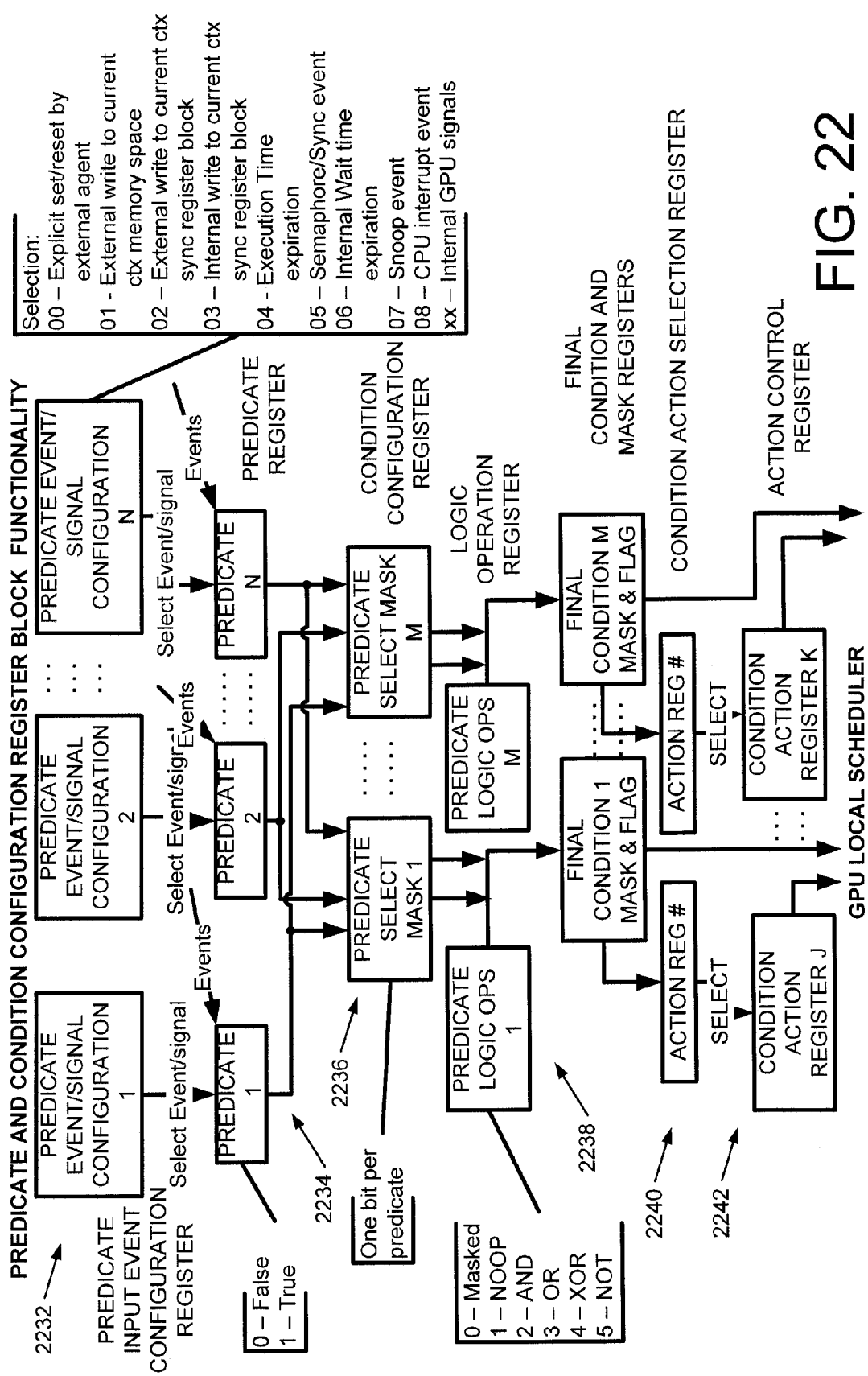

FIG. 22 is an exemplary flow diagram illustrating the functionality of predicate and condition configuration registers.

Figure 18:
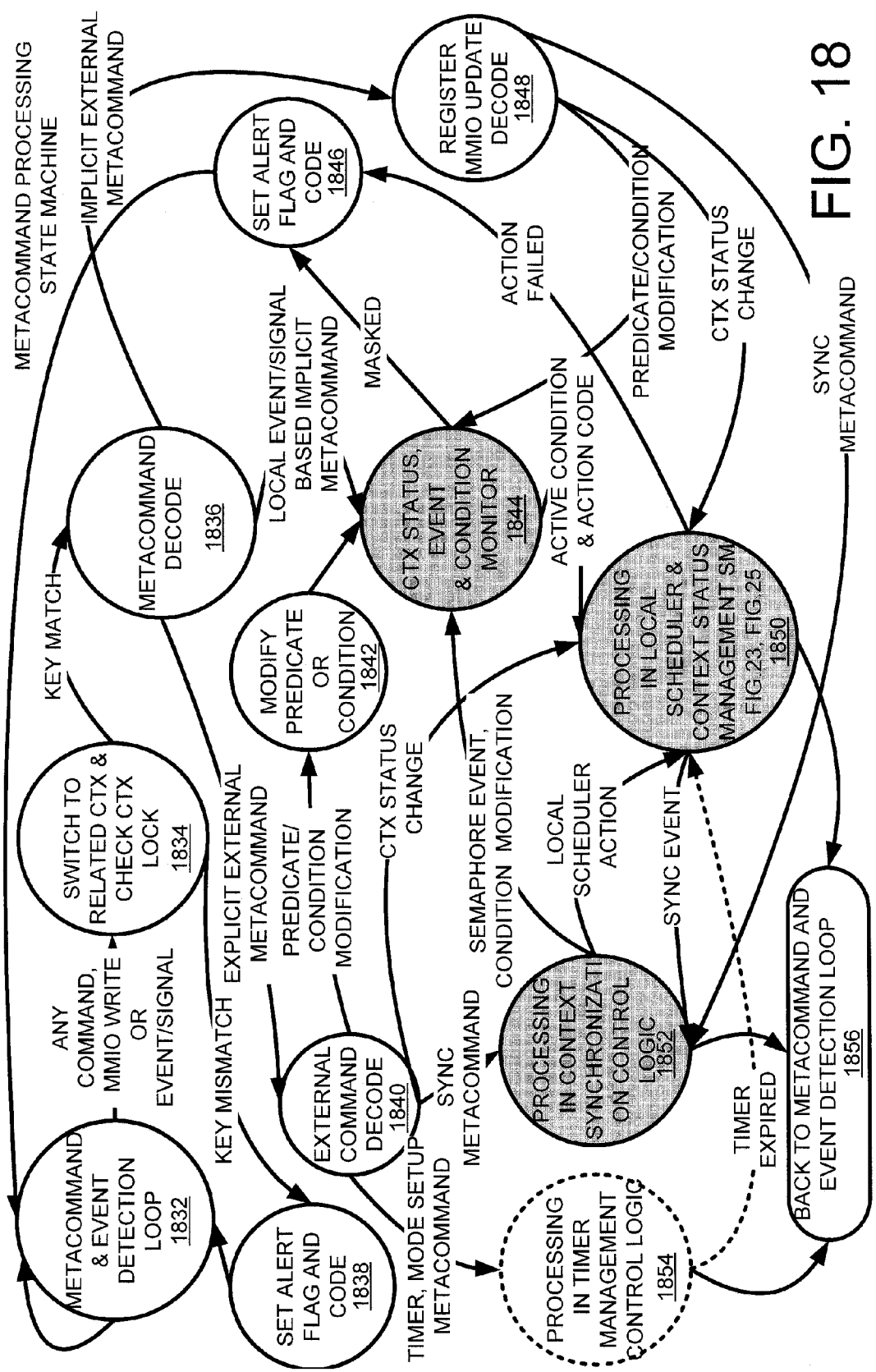
FIG. 18 is an exemplary state machine of metacommand processing in a metaprocessor.
Figure 23:
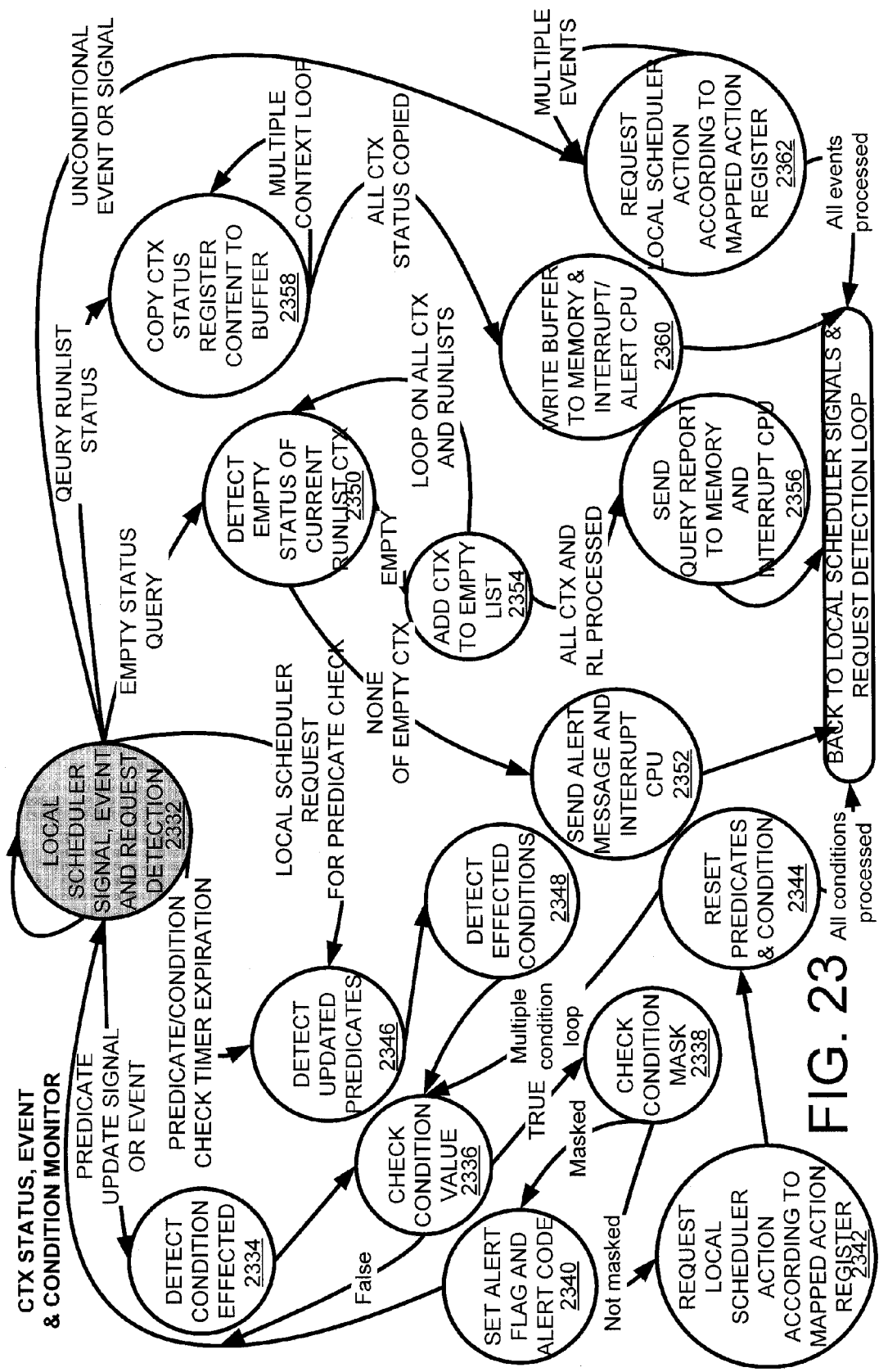

FIG. 23 is an exemplary state machine of context status, event, and condition monitoring, similar to the diagram from FIG. 18.

Figure 24:
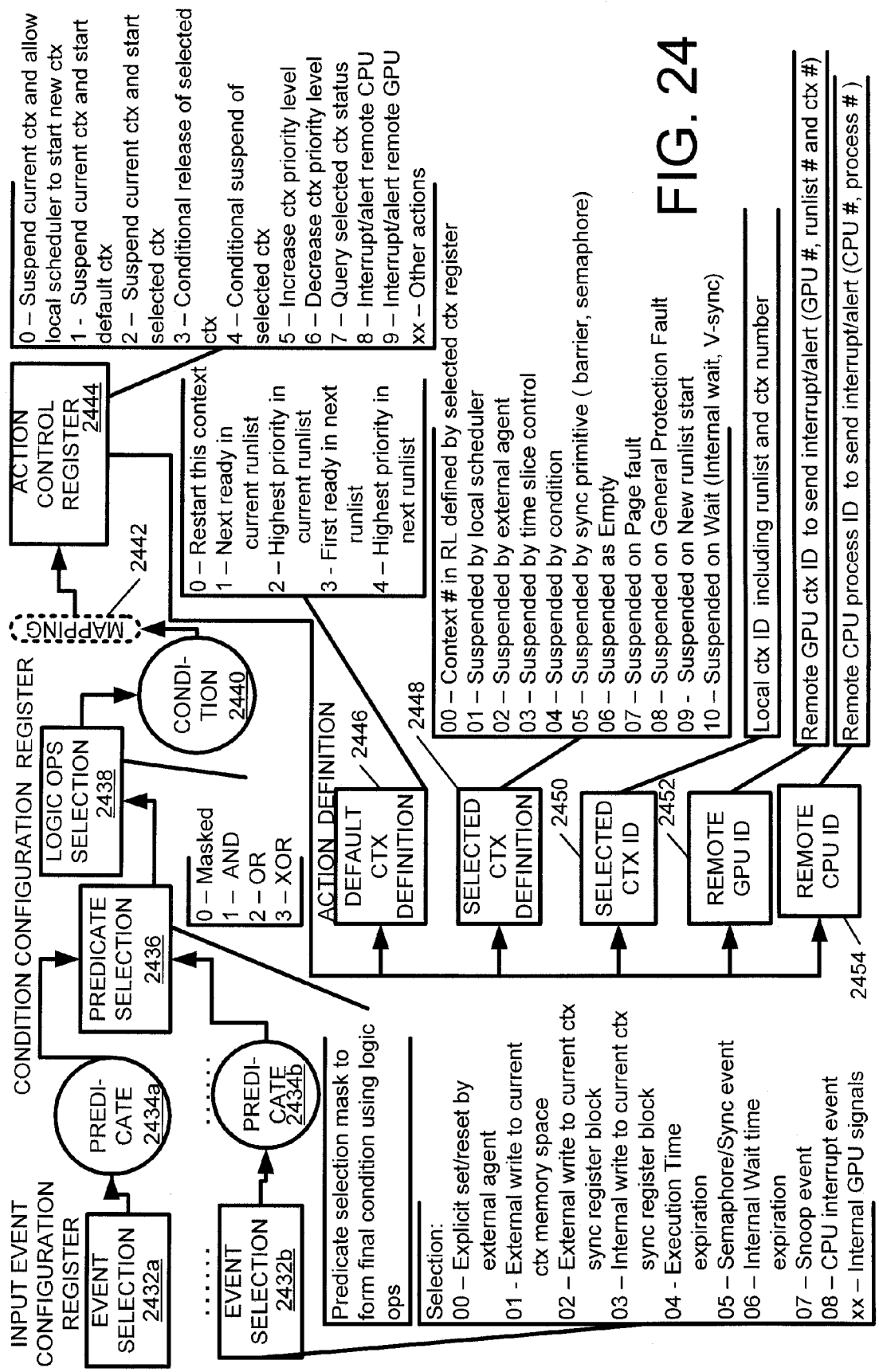

FIG. 24 is a final condition formulation and action control register field description.

Figure 25:
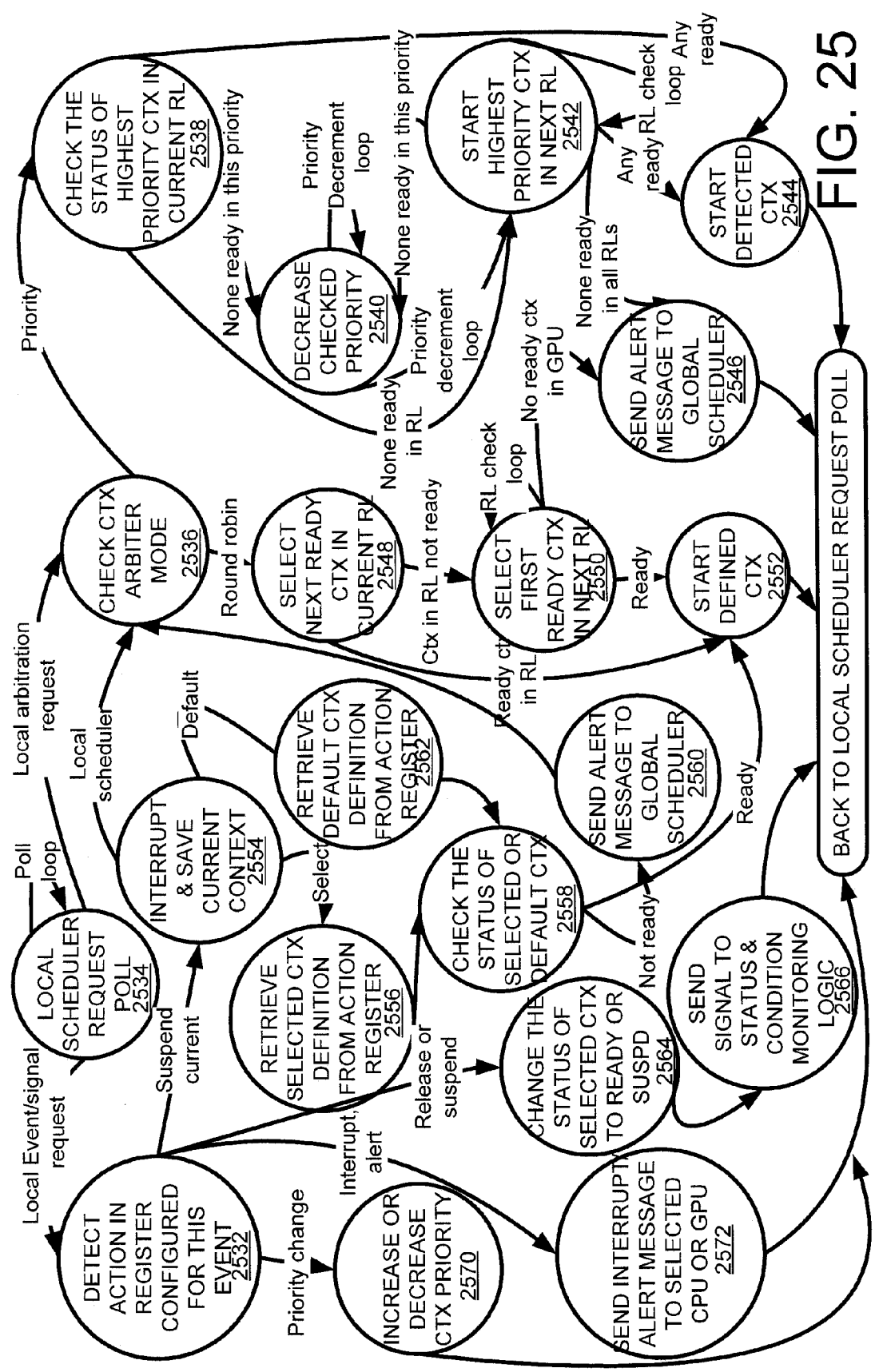

FIG. 25 is an exemplary local scheduler event and request processing state machine, similar to the diagram from FIG. 18.

Figure 26A:
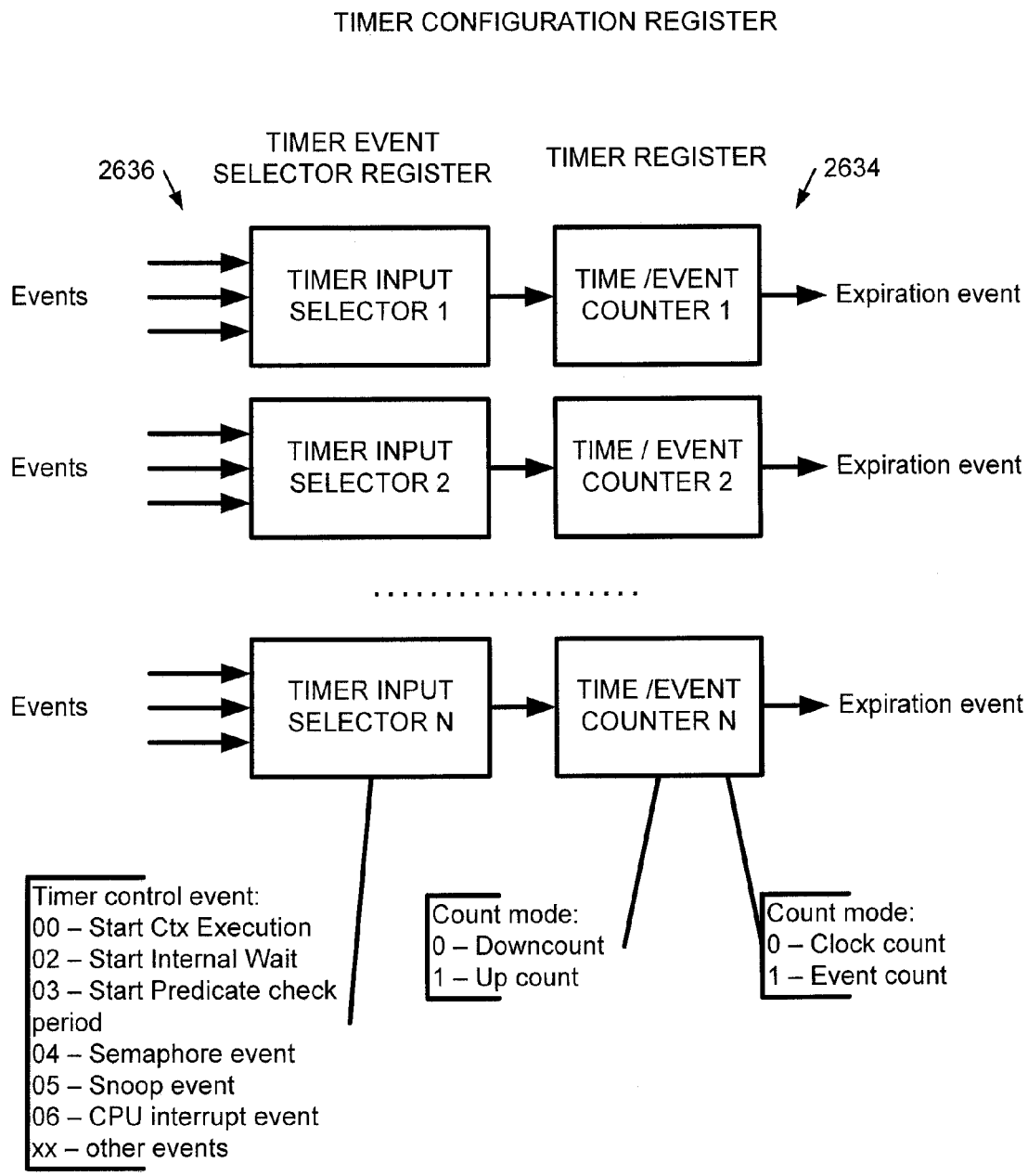

FIG. 26A is an exemplary diagram of a timer configuration register.

Figure 26B:
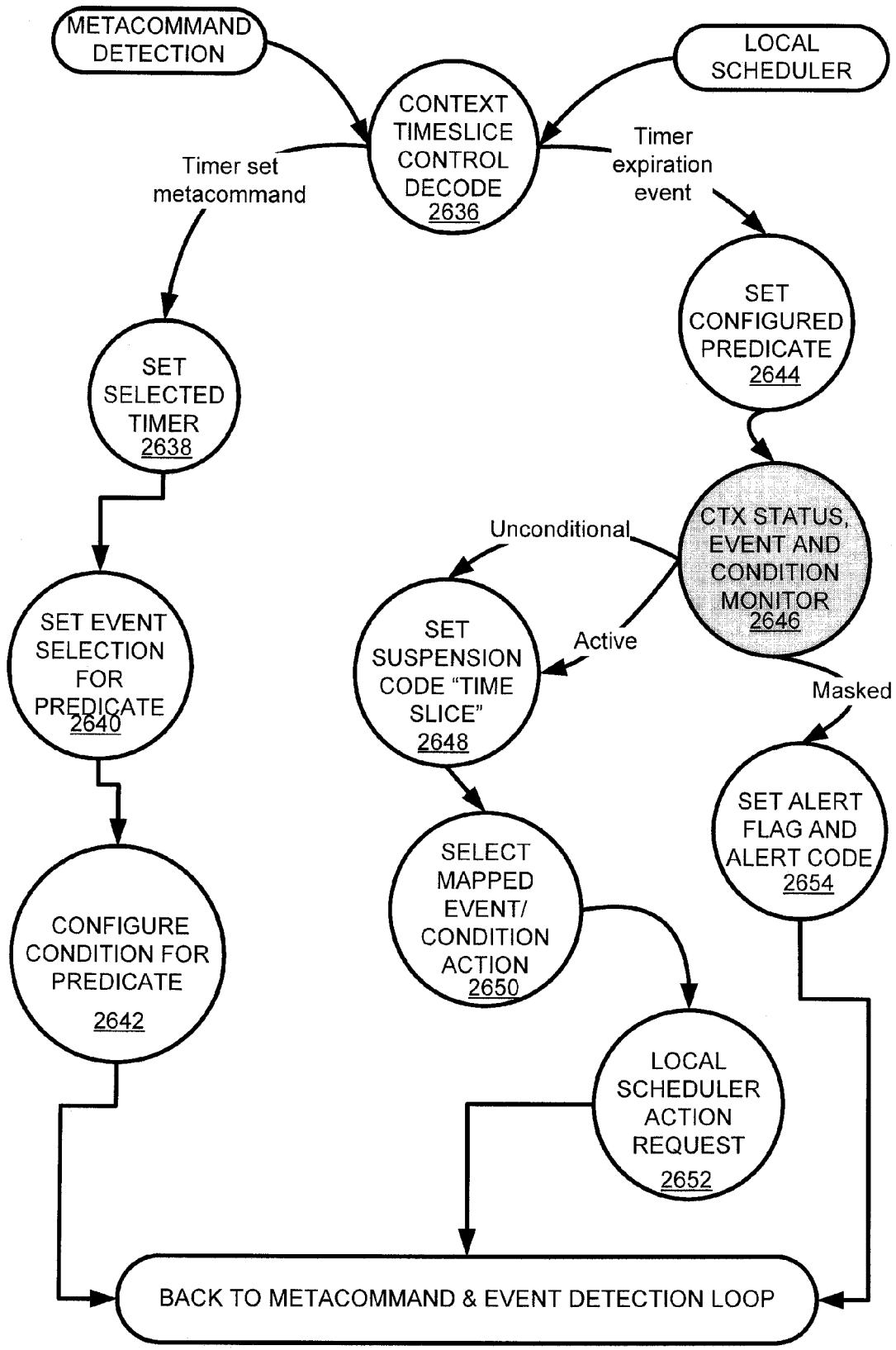

FIG. 26B is an exemplary state machine of timer related metacommand processing.

Figure 27:
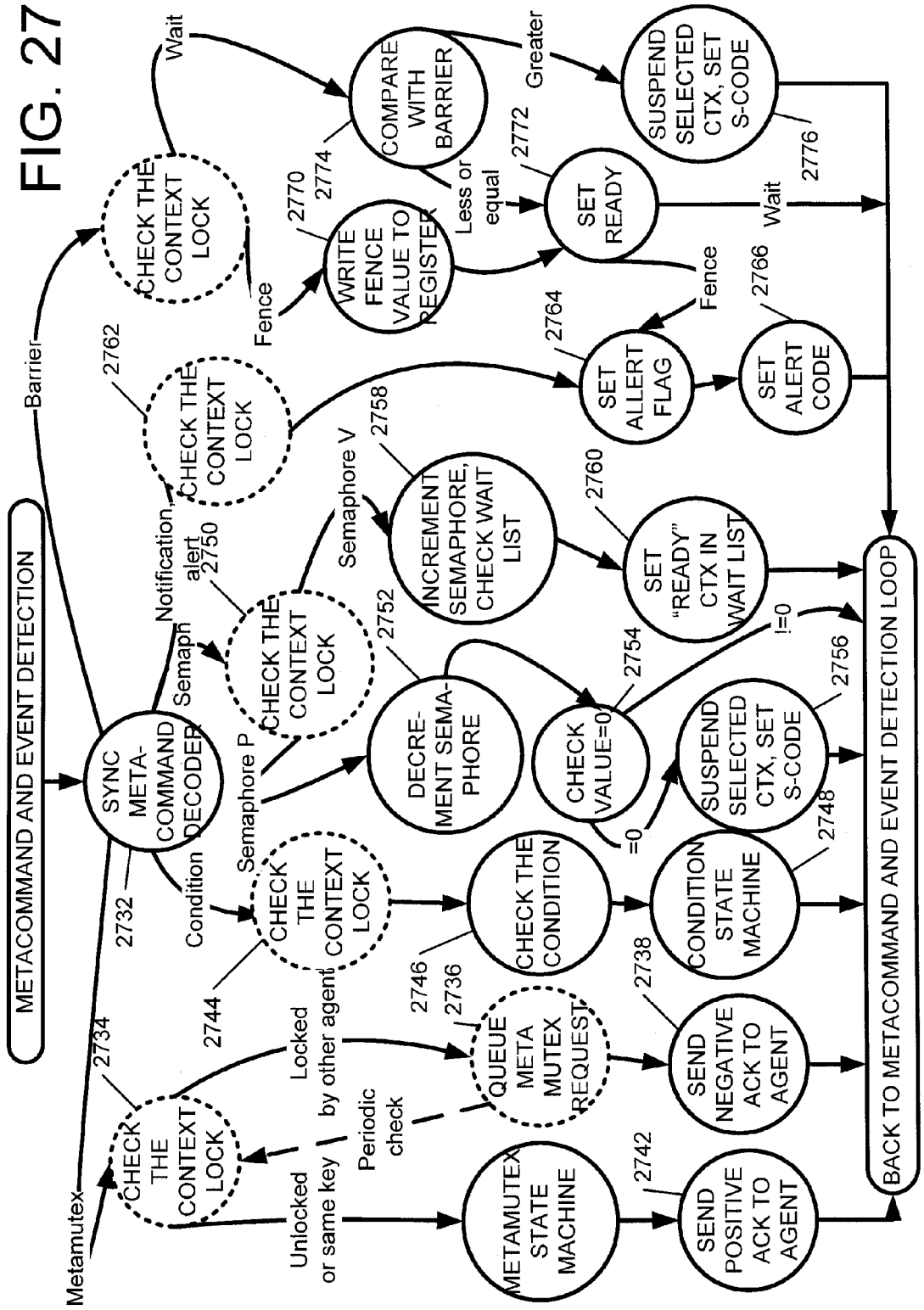

FIG. 27 is a synchronization metacommand execution state machine.

Figure 28B:
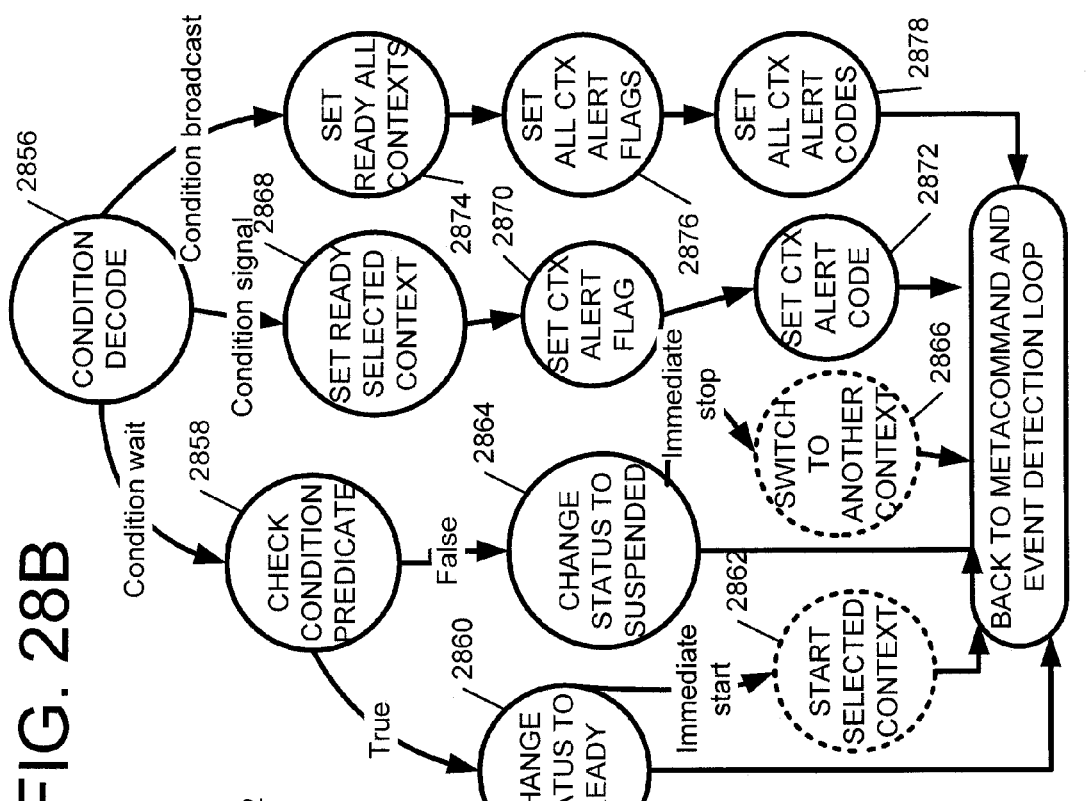
Figure 28A:
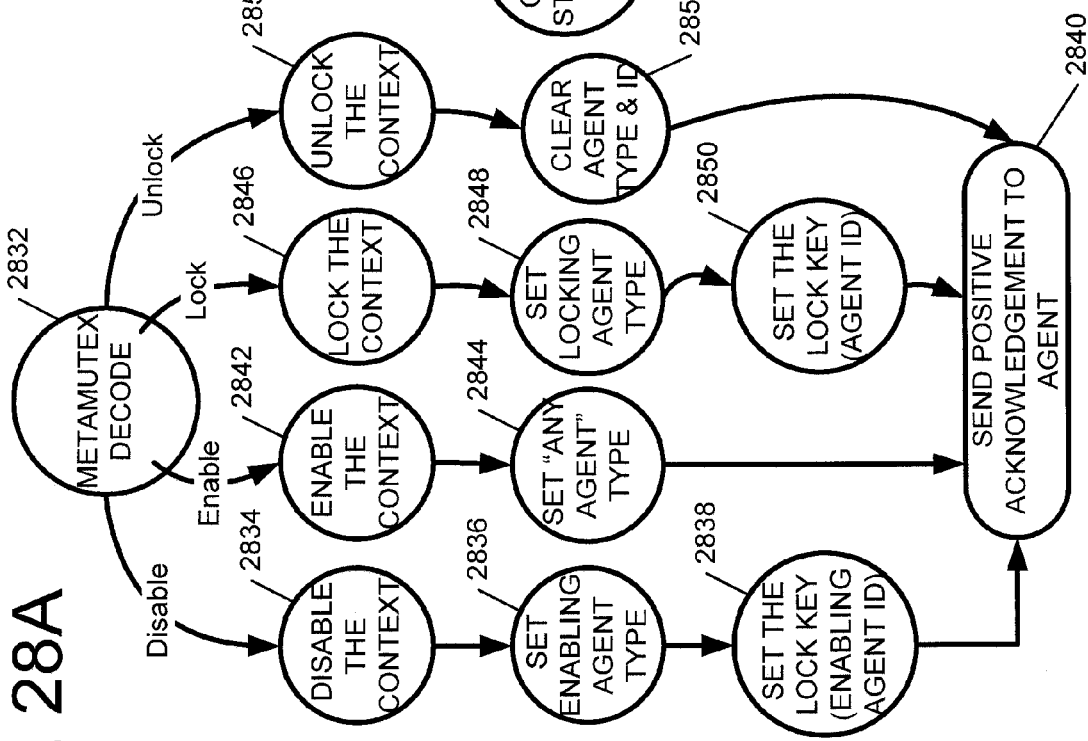

FIG. 28A is a metamutex command execution state machine, similar to the state machine from FIG. 27.

FIG. 28B is a sync condition command execution state machine, similar to the state machine from FIG. 27.

FIG. 29 is an illustration of a metaprocessor control register block.

Figure 30:
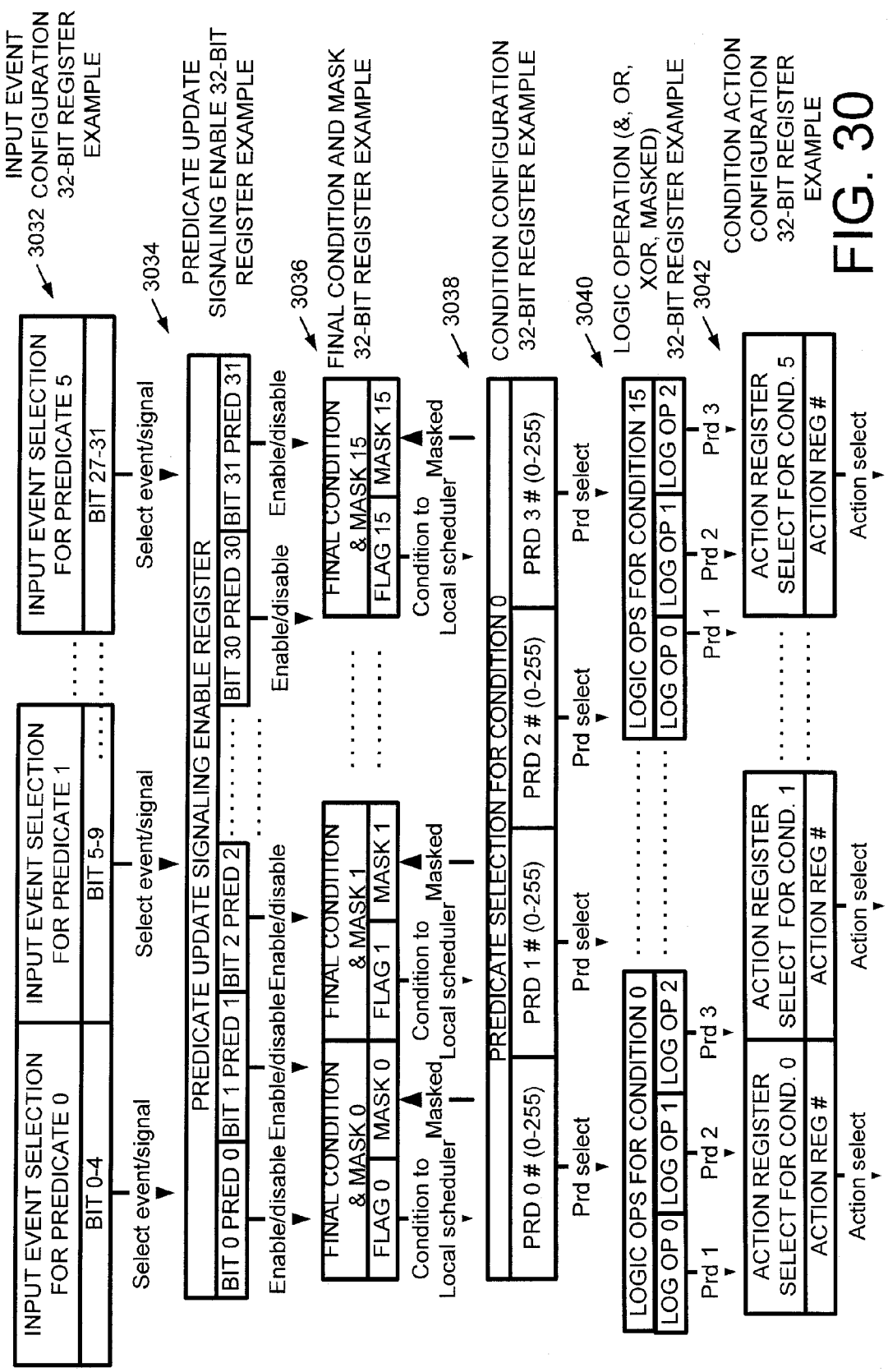

FIG. 30 is an exemplary implementation of metaprocessor control registers.

Figure 31:
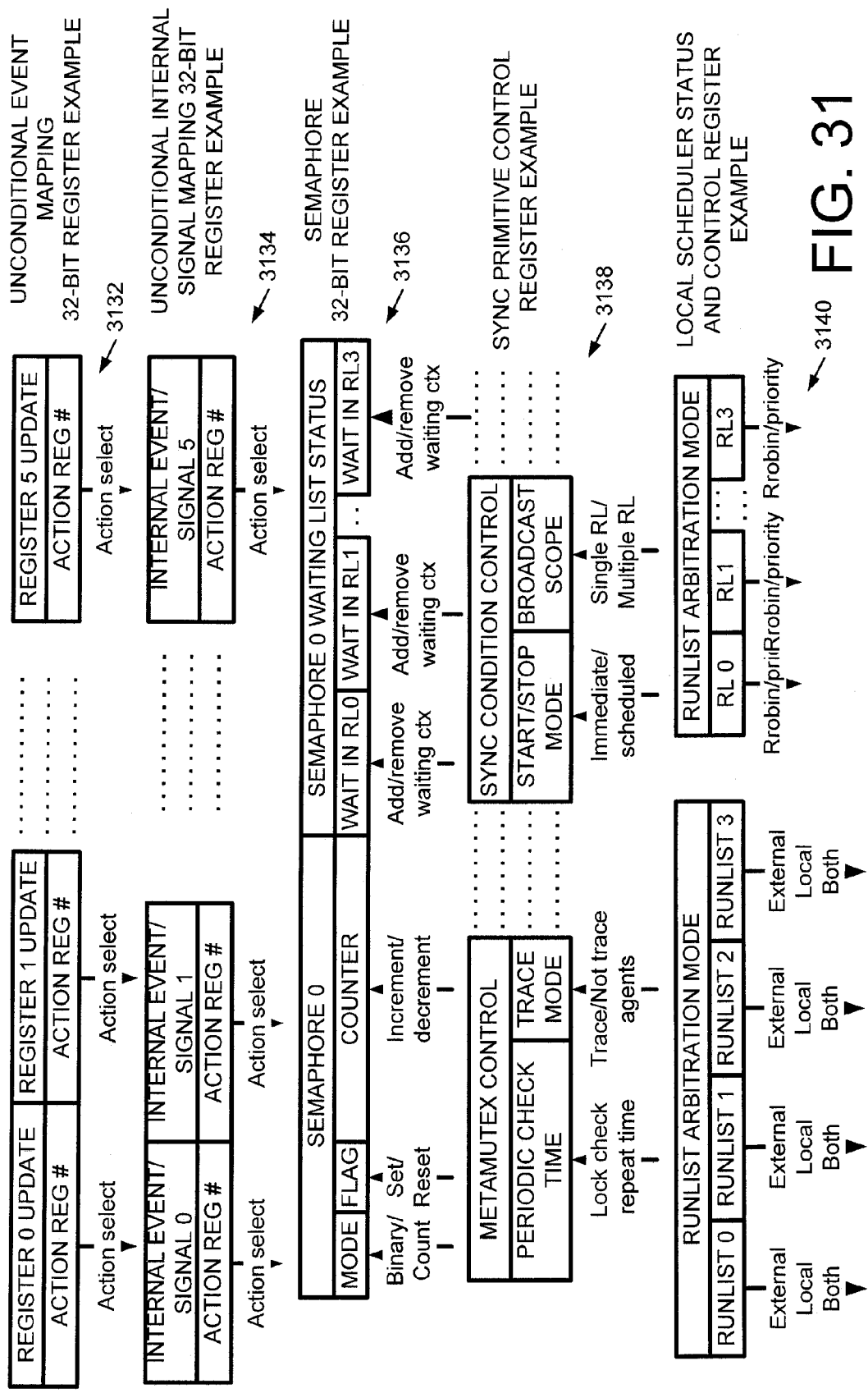

FIG. 31 is another exemplary implementation of metaprocessor control registers.

FIG. 32 is an exemplary set of metaprocessor instruction formats.

DETAILED DESCRIPTION

Figure 1:
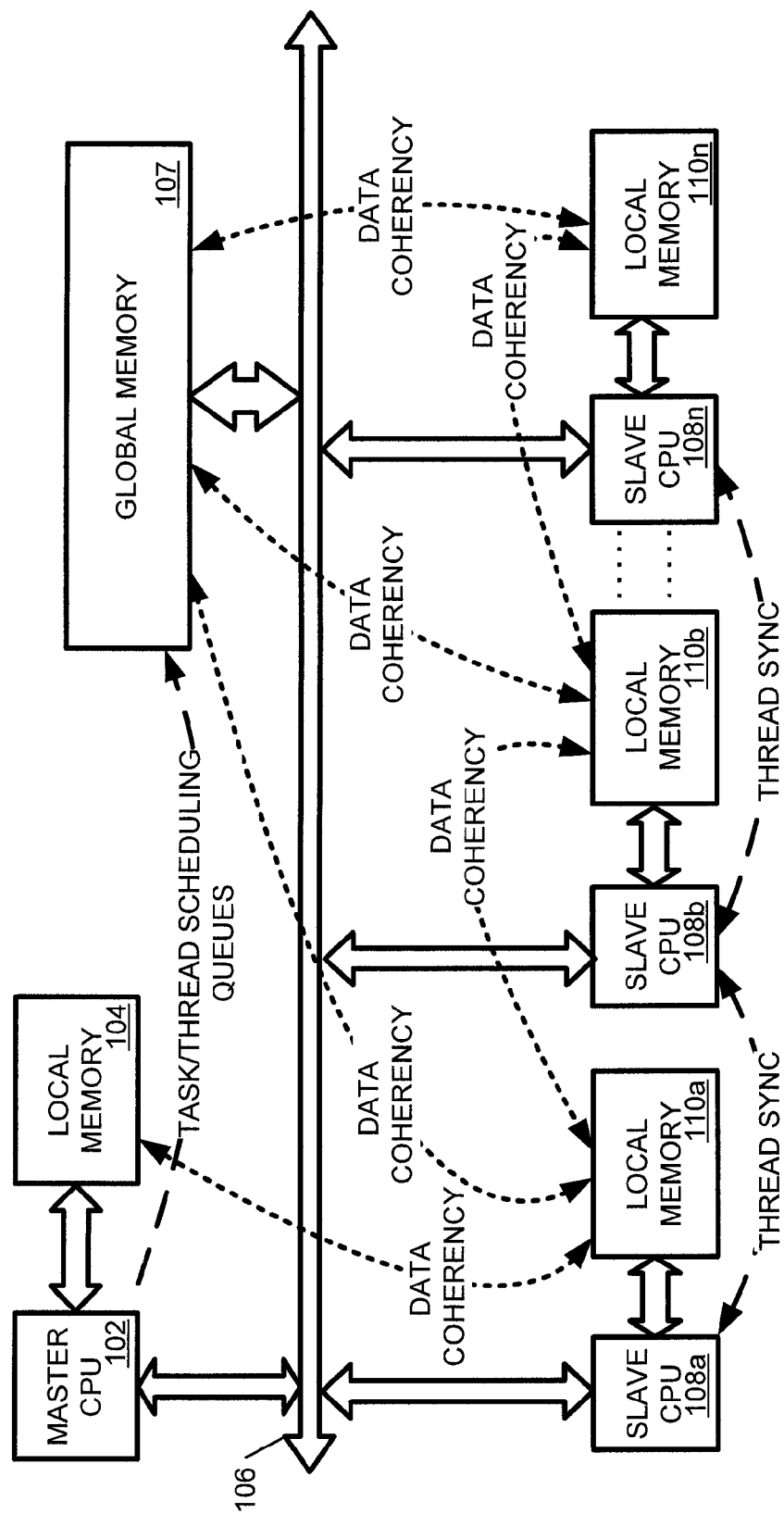
FIG. 1 is a depiction of a Multiple Instruction stream Multiple Data stream (MIMD) structure with a Central Processing Unit (CPU).

FIG. 1 is a depiction of a Multiple Instruction stream Multiple Data stream (MIMD) structure with a Central Processing Unit (CPU). As illustrated, FIG. 1 includes a common bus multiprocessor system with global memory and multiple CPUs with attached local memory subsystems. Such a system may have two or more CPUs with workload being distributed among them. The system may have a dedicated master CPU that can be configured to schedule processes and threads and/or may have a distributed scheduling process running on the symmetrical multiprocessors, known as a Symmetric Multiprocessing (SMP) system. There are several techniques for task distribution. Another implementation may use SMP techniques when the CPUs are sharing the same operating system and application task pool.

Such systems using shared address space with globally accessible data generally maintain memory data coherency between data blocks copied to local memories and synchronize process/thread execution. CPU and memory subsystems in such multiprocessors generally have special hardware-supported primitives and resources to provide proper functioning of multiprocessors, including bus snooping and directory based protocols for memory data coherency, special instructions and hardware blocks for data access synchronization and thread execution control. New PCI-Express bus functionality can provide support for implementation of such primitives.

More specifically, with regard to FIG. 1, master CPU 102 can be coupled to local memory 104. Additionally, master CPU 102 can be coupled to bus 106. Bus 106 can be coupled to global memory 107, as well as slave CPUs 108a-108n. Coupled to slave CPUs 108a-108n are local memory 110a-110n, where "n" represents that any number of slave CPUs 108 and local memories 110 may be included. As illustrated, there may be data coherency between the local memory 104 and local memory 110a. Similarly, there may be data coherency between global memory and local memories 110. There may be data coherency amongst the local memories 110 and/or 104. Similarly, the slave CPUs may perform a thread sync with each other and master CPU 102 may send task/thread scheduling queues to global memory 107.

Figure 2:
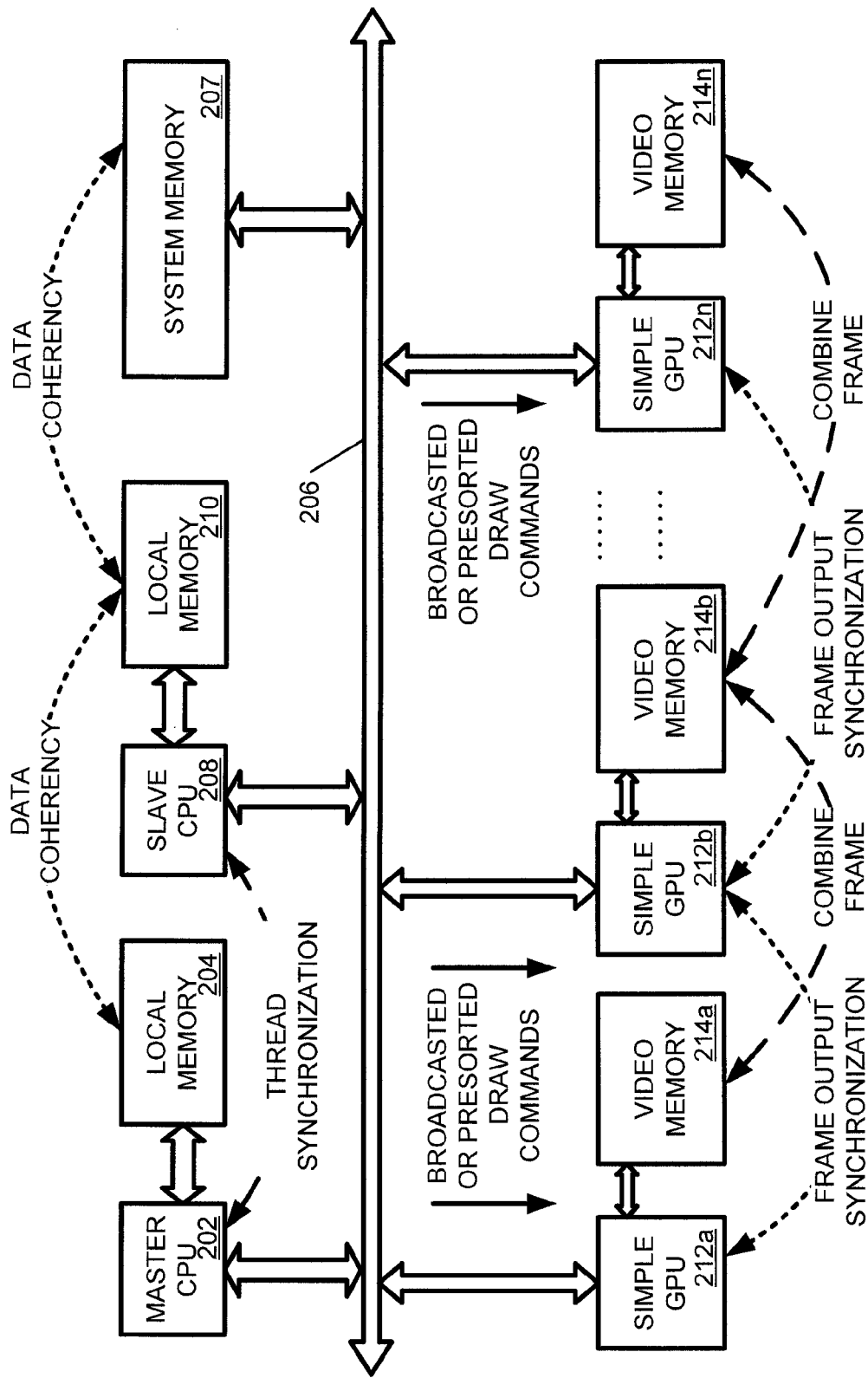
FIG. 2 is a depiction of a structure with multiple simple graphics processors combined with one or more CPU, similar to the structure from FIG. 1.

FIG. 2 is a depiction of a structure with multiple simple graphics processors combined with one or more CPU, similar to the structure from FIG. 1. More specifically, the nonlimiting example of FIG. 2 illustrates a multiprocessor system that includes a master CPU with one or more slave CPUs connected with a plurality of GPUs. More specifically, in the nonlimiting example of FIG. 2, master CPU 202 is coupled to local memory 204, as well as bus 206. Slave CPU 208 is also coupled to bus 206, as well as local memory 210. System memory 207 is coupled to bus 206. Also coupled to bus 206 are simple GPUs 212a-212n. Coupled to simple GPUs 212a-212n are video memories 214a-214n, respectively.

As illustrated, data coherency may exist between local memory 204, local memory 210 and system memory 207. Similarly, thread synchronization may occur between master CPU 202 and slave CPU 208. Broadcasted and/or presorted draw commands may be communicated to one or more of the simple GPUs 212. Similarly, frame output synchronization may occur between simple GPUs 212. Video memories 214 may communicate to facilitate combination of one or more frames.

At least one approach for such system implementation includes a space and/or volume split of a 3D graphics scene into a plurality of segments with related groups of graphics objects and sending the graphics objects to separate GPUs to generate parts of the final frame. Another approach includes utilizing a time split with different GPUs that are rendering sequential frames. Synchronization in these configurations can be relatively simple and can be implemented at the end of frame generation, when the GPUs combine final frame buffer data for display. The system may use thread execution synchronization on the CPU level but synchronization between GPUs may not be required during frame rendering, in such a configuration. There may be a plurality of approaches on load distribution that can be used, which may include:

1) At least one of the GPUs receives a presorted group of objects (or entire scene frame in case of time split) to render and all associated state information. These objects are related to preliminary divided screen segments (or selected frame for particular GPU).

2) At least one of the GPUs may receive the same (or similar) broadcasted flow of objects and states. The GPUs may clip objects out of their assigned screen segment and render objects located in the segment of their responsibility.

Embodiments of this disclosure are related to emerging applications with using multiple GPUs combined with one or more CPUs in graphics and data processing systems. Real time rendering of complex 3-dimensional scenes with high level of realism can utilize computational power, which may be provided by complex multiprocessing structures. Those structures may include one or more GPUs and CPUs, as illustrated in FIG. 3.

Figure 3:
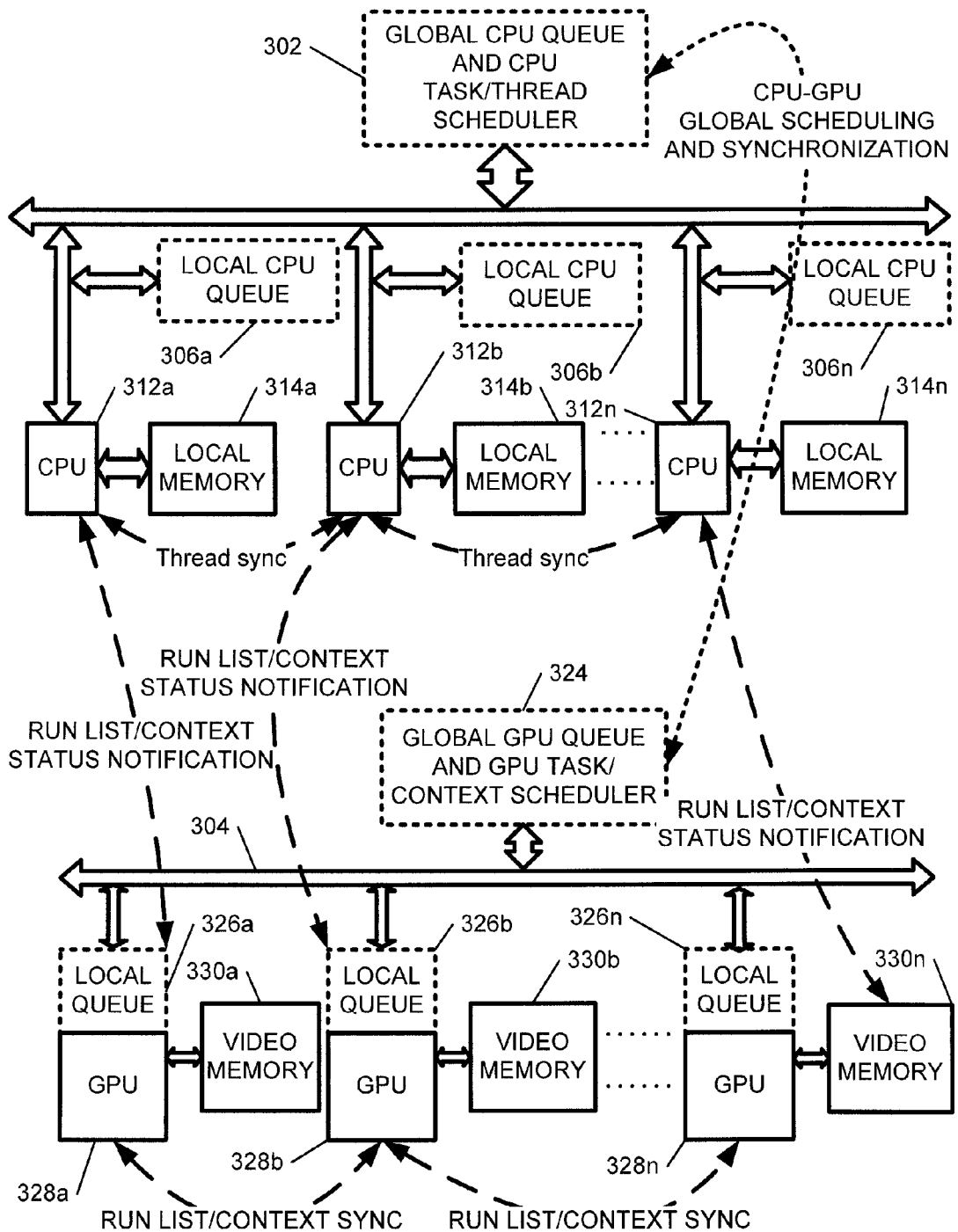
FIG. 3 is a block diagram illustrating an embodiment of an MIMD system that includes multiple CPUs and multiple GPUs, similar to the diagram from FIG. 2.

FIG. 3 is an embodiment of a Multiple Instruction stream Multiple Data stream (MIMD) processor system that includes multiple CPUs and multiple GPUs. As illustrated, computational task mapping and scheduling of execution of such complex multiprocessors may be accomplished with substantial programming support tools as well as special hardware solutions, which may significantly reduce an overhead on multiprocessor synchronization and computation scheduling. Such CPU-GPU MIMD multiprocessor systems, as illustrated in FIG. 3, may also include other engines including, but not limited to video, encryption, data move/transform etc.

More specifically, as illustrated in FIG. 3, global CPU queue and CPU thread scheduler 302 (referred to herein as CPU QTS 302) may be implemented using a dedicated master CPU and/or as an SMP task running on a plurality CPUs. Bus 304 may provide communication with CPU 312A and local CPU queue 306a may implement a separate memory block and/or mapped to local CPU memory. CPU 312a may be also communicatively coupled to local memory 314a.

Similarly, CPU QTS 302 is also coupled to CPU 312b and local CPU queue 306b. CPU 312b is communicatively coupled to local memory 314b. CPU QTS 302 is also coupled to additional CPU(s), as indicated with the depiction of CPU 312n, local memory 314n, and local CPU queue 306n. Blocks with dashed line borders are depicting logical blocks that may be implemented as separate units or may use existing resources of CPU modules.

One should note that while bus 304 (as well as other similarly depicted components elsewhere in the present application) is illustrated as a bus, this is a nonlimiting example. More specifically, the depiction of FIG. 3 is illustrated as a logical representation. As one of ordinary skill in the art will understand the above description refers to bus 304 for purposes of example, as any technique for facilitating communication between CPU QTS 302 and other components in FIG. 1 may be utilized.

Additionally included in the nonlimiting example of FIG. 3 is a global GPU queue and a GPU task/context scheduler 324 (FPU QTS 324). GPU QTS 324 is coupled to local GPU queue 326a and GPU 328a. GPU 328a is coupled to local queue 326b and GPU 328b. GPU 328b is also coupled to video memory 330b. As described above, GPU QTS 324 may also be coupled to other components, as illustrated with local queue 326n, GPU 328n, and video memory 330n. One should note that GPU context scheduler also can be considered as logical a block that can be implemented using CPU resources and/or special GPU-to-CPU protocols.

In operation, many multiprocessor systems can be configured to synchronize CPUs 312a, 312b, and 312n via a thread sync. Additionally, CPU QTS 302 and GPU QTS 324 may also be configured to communicate with each other for the purposes of global scheduling and synchronization. CPU 312a may be configured to communicate with GPU local queue 326a for purposes of run list/context status notification. Similarly, CPU 312b can be configured for communication with local queue 326b, as can CPU 312n with 326n.

As also illustrated in FIG. 3, several tasks (processes) and subtasks (threads) may run simultaneously (or substantially simultaneously). A process may include one or more threads that may run in parallel and/or sequentially on the same or a plurality of CPUs. One or more of the processes may use one or more associated GPUs and/or other specialized hardware units during the execution of one or more CPU threads. A process with a dedicated address space may run on a particular CPU as multiple threads with process-specific scheduling. The process can be scheduled to a particular CPU-by-CPU QTS 302, which may be configured to run on a dedicated CPU and/or on any available CPU in the system.

An associated GPU may also be configured to fetch commands from DMA buffers in a CPU process address space while writing to and/or fetching from a location in global memory space. Additionally, GPUs 328 may also have a thread of execution, which can also be known as a context. The GPU process may also be referred to as a run list, which may include a plurality of contexts.

GPUs 328 may also be configured to receive shader threads for execution on a programmable shader, which can be configured to process stream data inside a GPU. Additionally, a plurality of GPUs may also be associated with a linked adapter. Such a configuration can make the plurality of GPUs visible as one logical GPU for CPU processes.

Figure 4:
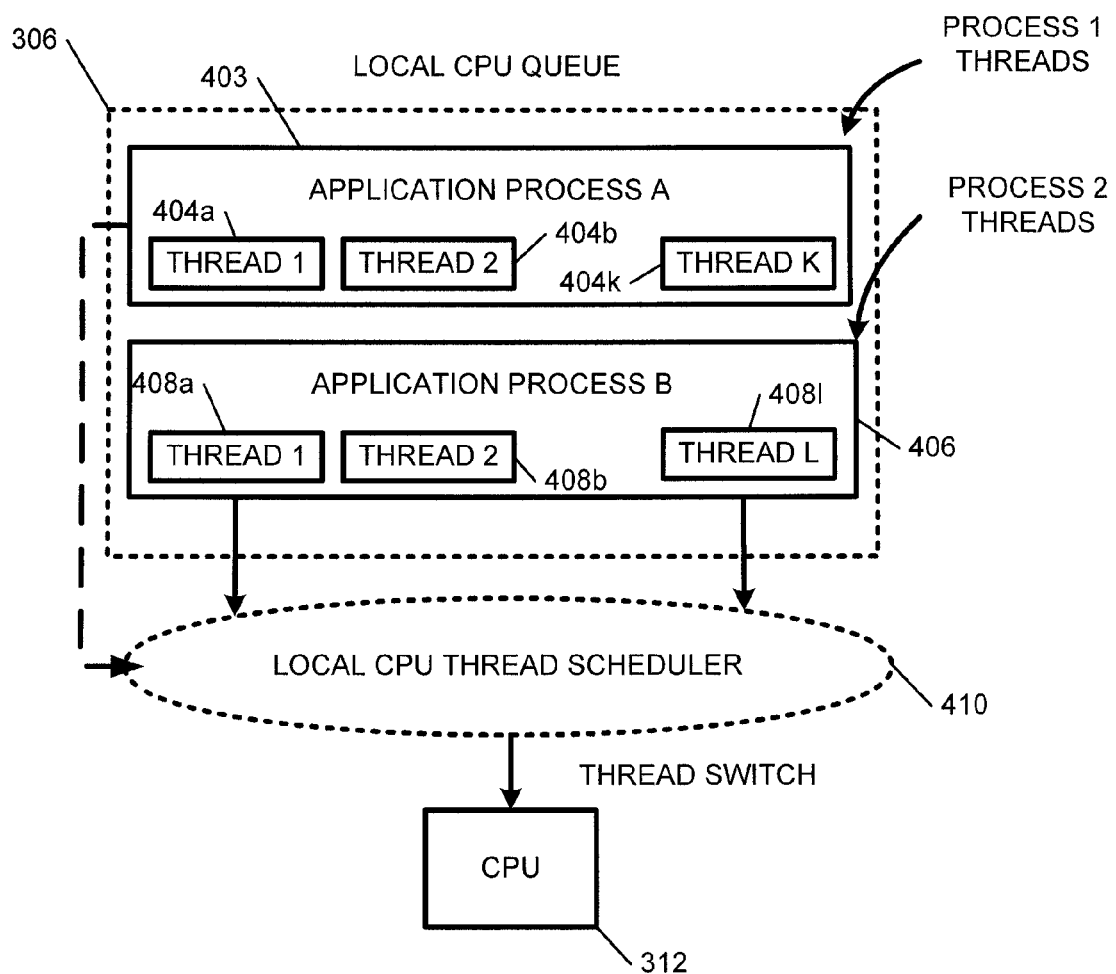
FIG. 4 is an embodiment of a local CPU queue, similar to the CPU queue from FIG. 3.

FIG. 4 is an embodiment of a local CPU queue, similar to the CPU queues from FIG. 3. More specifically, FIG. 4 includes local CPU Queue 306. Local CPU queue 306 includes application process A 403 and application process B 406. Application process A 403 can include one or more threads 404a, 404b, 404k, where 404k indicates that the application process A 403 can include any number of threads. Similarly, application process B 406 includes one or more threads 408a, 408b, and 408l, where 408l indicates that application process B 406 can include any number of threads. The thread(s) from an application process can be sent to local CPU process/thread scheduler 410, which can switch threads running on CPU 312. The CPU 312 can, upon receiving a thread, process the desired instruction(s).

Figure 5:
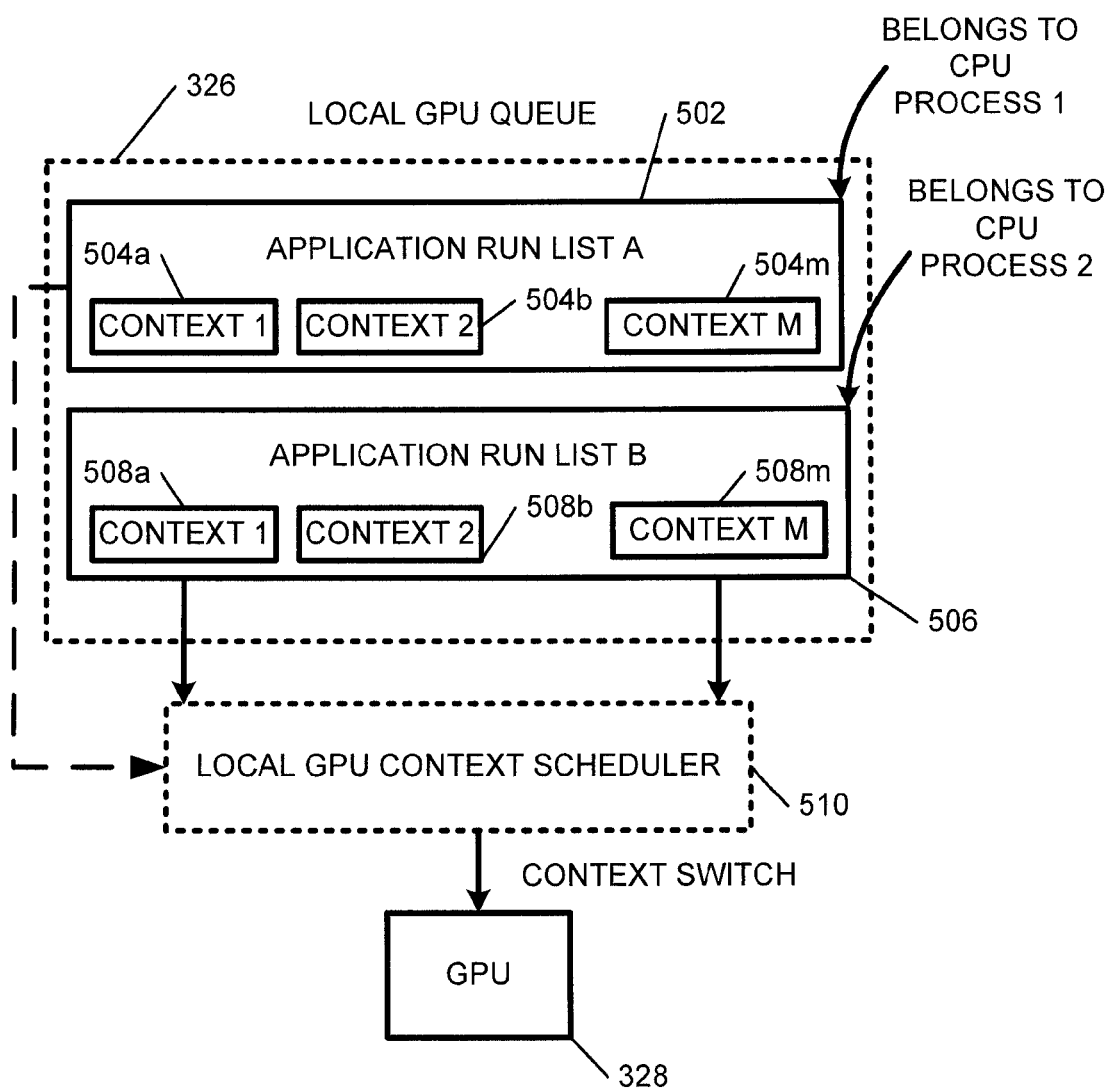
FIG. 5 is an embodiment of a local GPU queue, similar to the GPU queue from FIG. 3.

FIG. 5 is an embodiment of a local GPU queue, similar to the GPU queue from FIG. 3. Similar to local CPU queue from FIG. 3, local GPU queue 326 includes application run list A 502 includes a one or more context 504a, 504b, and 504m, where context m (504m) indicates that any number of contexts can be present in application run list A 502. Similarly, local GPU queue 326 can include application run list B 506. Application run list B 506 can include one or more contexts 508a, 508b, and 508m. The local GPU queue 326 can be configured to send data from an application run list 502, 506 to the local GPU context scheduler 510. The local GPU context scheduler 510 can be configured to communicate with logic providing a running context switch on GPU 328.

Figure 6:
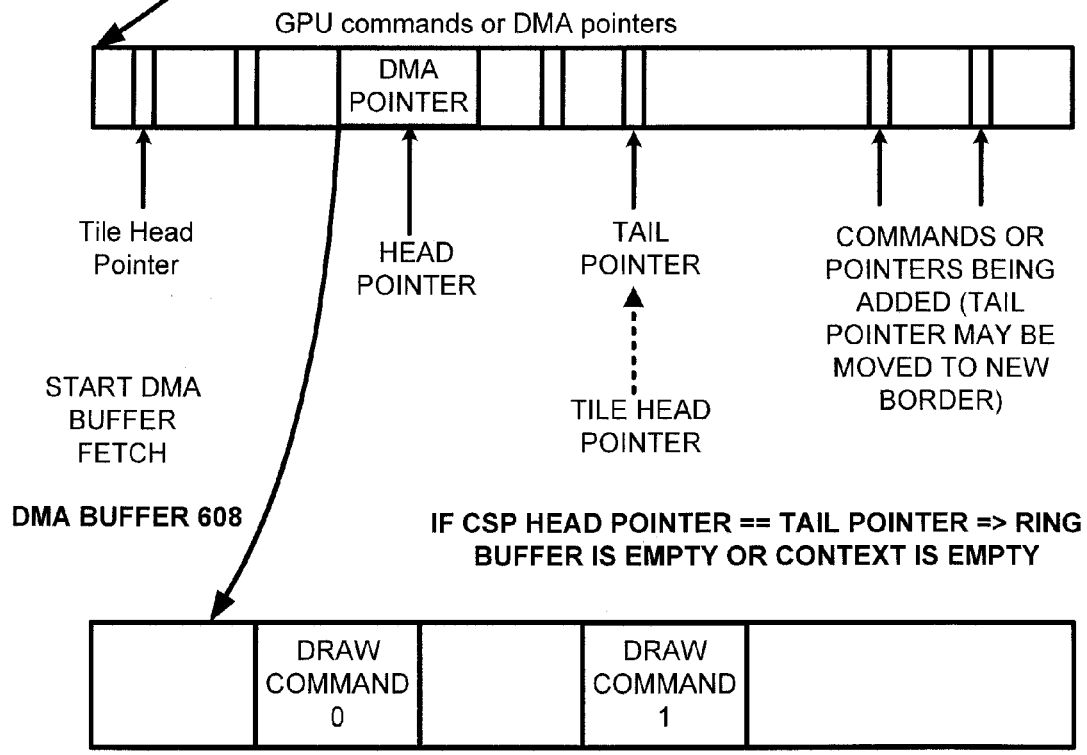
FIG. 6 is a diagram illustrating embodiments of GPU run lists, such as run lists that can be processed in the configuration from FIGS. 3 and 5.

FIG. 6 is a diagram illustrating exemplary embodiments of run lists, such as run lists that can be processed in the configuration from FIG. 3. More specifically, in the nonlimiting example of FIG. 6, run list odd 602 includes a plurality of context pointers 0, 1, 2, 3. The context pointers can be configured to point to an address in memory, such as Direct Memory Access (DMA) memory. Also included with run list odd 602 is a current run list active pointer 608, which can be configured to point to the current context that is being executed.

Also included in the nonlimiting example of FIG. 6 is run list even 604. Run list even 604 includes a plurality of context pointers, as well as a plurality of ring buffer pointers. An example of a ring buffer is included below, as ring buffer 606. Ring buffer 606 can include a tile head pointer, as well as a DMA pointer and a head pointer. The DMA pointer can be configured to point to a DMA buffer, which can include one or more draw command and/or other GPU commands. Also included in the ring buffer 606 is a tail pointer and pointers that are being added. One should note that the ring buffer can be configured to accommodate more than two run lists in a GPU. The odd and even configuration of FIG. 6 is nonlimiting example. A head pointer and a tail pointer can define one or more contexts in a run list. A head pointer can be configured to indicate an address from where GPU is fetching a current command to be executed by parser or stream processor. The head pointer can be similar to a program counter, in this sense. The tail pointer can be configured to reflect the nature of a GPU command stream generation by a CPU application and can be configured to indicate the border of a valid command stream. Such pointers can be configured to allow overlap of CPU and GPU activity when a GPU follows a CPU application. When the GPU follows a CPU application, the CPU may continue to write to the command stream and occasionally move the tail pointer to a new border while GPU is executing a context from the head side.

Additional pointers may be added for simplification and improvement of context switches and other synchronization procedures, for example the pointer indicating the command currently being executed in one of the GPU internal pipeline blocks (e.g., rasterizer, texture units, etc.). The tile head pointer in FIG. 6 may have an address of a command being executed on the top of rasterization unit when triangles are converted to pixel flow. A GPU context may be compared with a CPU thread, which represents certain part of application task. A run list or group of contexts is comparable to a CPU process containing several threads.

Additionally, in many systems, threads can be synchronized with each other. A synchronization mechanism can be utilized with any thread scheduling approach and hardware may be connected to scheduling software and/or hardware. Such a thread synchronization mechanism for a CPU domain that includes a plurality of synchronization primitives is included in "Synchronization Primitives for a Multiprocessor: A Formal Specification", A. D. Birrell, J. V. Guttag, J. J. Horning, R. Levin, Aug. 20, 1987, SRC Research Report 20, which is hereby incorporated by reference in its entirety.

Figure 7:
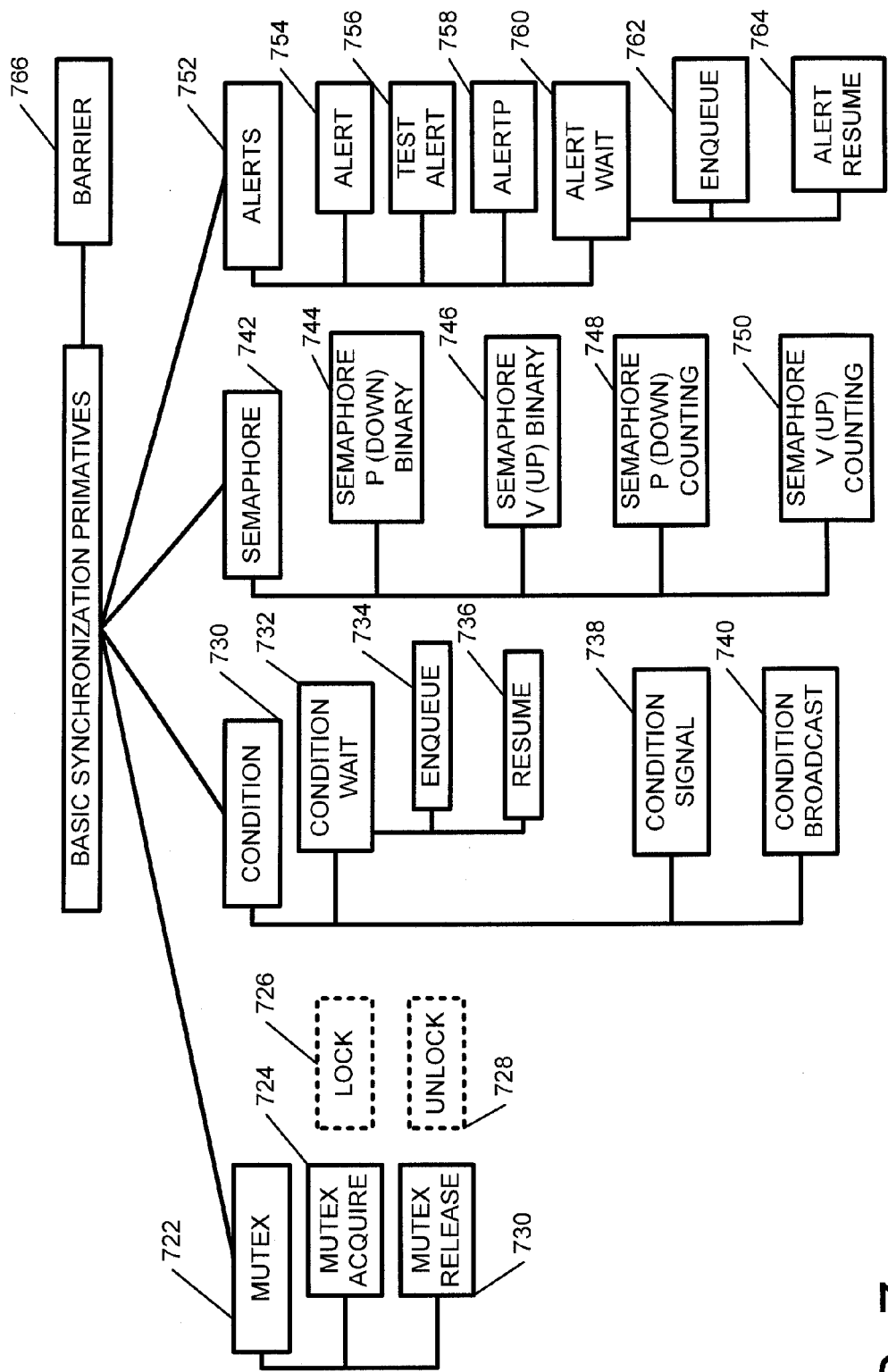
FIG. 7 is a block diagram illustrating an embodiment of synchronization primitives that can be utilized in synchronizing CPUs, such as the CPUs from FIG. 1.

FIG. 7 is a block diagram illustrating an embodiment of synchronization primitives that can be utilized in synchronizing CPUs, such as the CPUs from FIG. 1. As illustrated, synchronization primitives can be included to synchronize CPUs to include mutex primitive group 722 (indicating mutually exclusive commands), condition primitive group 730, semaphore primitive group 742, and alerts primitive group 752. Mutex primitive group 722 can include "mutex acquire" 724 and "mutex release" 730 primitives. Lock 726 and unlock 728 primitives are also included as different names for mutex primitives.

In the condition group 730 is a condition wait primitive 732, which includes an enqueue 734 and a resume 736 variations. An enqueue variation 734 of condition wait 732 can be configured to suspend a current thread and put the suspended thread in the queue if condition predicate is not true (not satisfied). A resume variation 736 of condition wait may resume thread execution if condition predicate is true (satisfied). A condition signal primitive 738 is also included in the condition group, as well as a condition broadcast primitive 740. In operation, the condition signal primitive 738 and the condition broadcast primitive 740 may call for wake-up of wait-suspended (enqueued) threads to check the condition predicate one more times and proceed if the condition is still true.

Condition signal primitive 728 may inform a CPU regarding a condition predicate change for one or more suspended threads. The condition broadcast primitive 740 can be configured to inform suspended threads. Semaphore group 742 can include a semaphore P (down) binary primitive 744, a semaphore V(up) binary primitive 746, a semaphore P(down) counting primitive 748, and a semaphore V(up) counting primitive 750. Binary semaphores can be configured to operate similar to the mutex primitives. Additionally, binary semaphore P may be associated with acquire and binary semaphore V with release. Counting semaphore P (down) can be configured to check a semaphore value, decrement the semaphore value, and proceed the thread execution if the value is not zero. Otherwise, counting semaphore P does not complete down part of operation and goes to sleep. Counting semaphore V (up) increments the semaphore value and wakes up a thread in sleeping stage that is unable to finish the down portion of semaphore P operation on semaphore with this particular address. Semaphores can be useful in cases of interaction with interrupt routines because, in at least some embodiments, semaphores cannot use mutexes.

Alerts can provide a soft form of interrupt of thread execution in conjunction with both semaphores and condition primitives, which may implement timeouts, aborts, etc. This functionality may be used in situations where decisions to make this request occur at an abstraction level higher than that the level in which the thread is blocked. Alerts group 752 can be configured to include an alert primitive 754, a test alert primitive 756, an alert P primitive 758, and an alert wait primitive 760. Alert wait primitive 760 may include variations that include an enqueue primitive 762 and/or an alert resume primitive 764.

Calling Alert(t) is a request that the thread(t) raise the exception Alerted. The procedure TestAlert allows a thread to determine whether there is a pending request for it to raise Alerted. AlertWait is similar to Wait, except that AlertWait may raise Alerted rather than returning. The choice between AlertWait and Wait depends on whether or not the calling thread is to respond to an Alert at the point of the call. The procedure AlertP can be configured to provide an analogous facility for semaphores.

An additional synchronization operation in programs with parallel loops is a barrier 766. A barrier 766 can be configured to hold the processes from continuing until all the processes reach the barrier. Once the processes have reached the barrier 766, the barrier 766 can release the processes. At least one implementation of a barrier 766 can be utilized with a plurality of spin locks: one used to protect a counter that tallies the processes arriving at the barrier and one used to hold the processes until the last process arrives at the barrier. Another solution can include a sense-reversing barrier, which can be configured to make use of a private preprocess variable, which can be initialized to "1" for each process.

Described above are thread synchronization primitives that may be supported by CPU special features. The primitives indicated above may be configured to provide hardware primitives, such as Atomic Register-Memory exchange, Atomic Test and Set, Atomic Fetch and increment of memory value (Read-And-Update), as well as others.

Additionally, these instructions can be utilized in sequence. More specifically, if the contents of the memory location specified by the load linked are changed before the store conditional stores to the same address occurs, then the store conditional fails. If the processor performs a context switch between the two instructions, then the store conditional also fails. The store conditional can be defined to return a value indicating whether or not the store was successful. Since the load linked returns the initial value and the store conditional returns 1 if the store conditional succeeds (and 0 otherwise), the following sequence implements an atomic exchange on the memory location specified by the contents of R1. More specifically, as a nonlimiting example, MOV R3,R4,R0; mov exchange value
LL R2,0(R1); load linked
SC R3,0(R1); store conditional
BEQZ R3,*try*; branch store fails
MOV R4,R2; put load value in R At the end of this sequence the contents of R4 and the memory location specified by R1 have been atomically exchanged (ignoring effect from delayed branches). When a processor intervenes and modifies the value in memory between the LL and SC instructions, the SC returns 0 in R3, causing the code sequence to try again. An advantage of the load linked/store conditional mechanism is that this mechanism can be used to build other synchronization primitives. As a nonlimiting example, an atomic fetch-and-increment might include:

try: LL R2,0(R1); load linked
DADDUI R3,R2,#1; increment
SC R3,0(R1); store conditional
BEQZ R3,*try*; branch store fails Hardware/Software Lock support and barrier improvement A problem with a lock implementation is that the lock implementation can introduce a large amount of unneeded memory traffic contention. As a nonlimiting example, when the lock is released, the processors can generate both a read and a write miss, although, at most, one processor can successfully get the lock in the unlocked state. It is possible to improve this situation by explicitly handing the lock from one waiting processor to the next. Rather than simply allowing all processors to compete every time the lock is released, a list can be kept to indicate that the waiting processors and hand the lock to one explicitly, when its turn comes. This sort of mechanism can include a queuing lock. Queuing locks can be implemented in hardware and/or in software using an array to keep track of the waiting processes. Hardware implementation can utilize a special synchronization controller that may be integrated with memory or bus controller.

There is a plurality of key insights in implementing such a queuing lock capability. First, one can distinguish the initial access to the lock to perform the queuing operation, and also the lock release, to provide the lock to another processor. The queue of waiting processes can be implemented by a variety of mechanisms. In a directory-based multiprocessor, this queue can be related to the sharing set and similar hardware can be used to implement the directory and queuing lock operations.

One complication is that the hardware may generally be prepared to reclaim such locks, since the process that requested the lock may have been context-switched and may not even be scheduled again on the same processor. Queuing locks can be used to improve the performance of barrier operation. Alternatively, a primitive can be introduced that reduces the amount of time needed to increment the barrier count, thus reducing the serialization at this bottleneck, which should yield comparable performance to using queuing locks.

One primitive that can be introduced for synchronization operations is a "fetch-and-increment" primitive, which can be configured to fetch a variable and increment its value. The returned value can be the incremented value and/or the fetched value. Using fetch-and-increment, one can dramatically improve the barrier implementation, compared to a simple "code-sensing" barrier.

Figure 8:
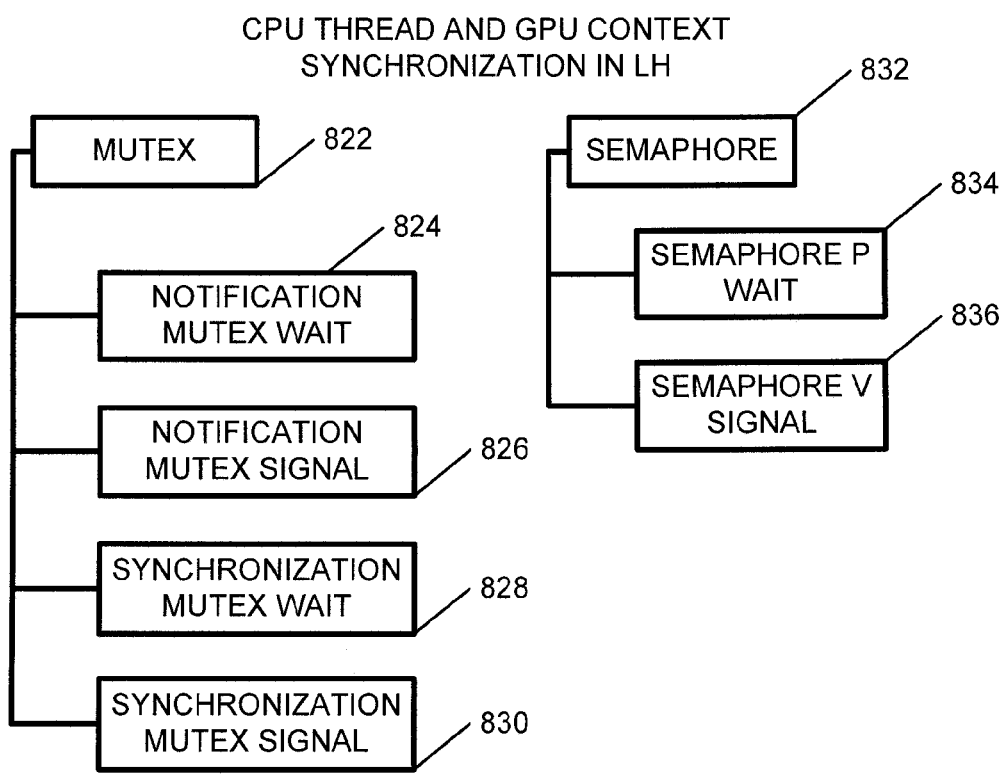
FIG. 8 is a block diagram illustrating another embodiment of synchronization primitives, similar to the primitives from FIG. 7 and implemented in an operating system, such as a Microsoft® operating system.

FIG. 8 is a block diagram illustrating another variation of synchronization primitives, similar to the primitives from FIG. 7. More specifically, FIG. 8 includes a mutex group 822, which includes a notification mutex wait primitive 824, a notification mutex signal primitive 826, a synchronization mutex wait primitive 828, and a synchronization mutex signal primitive 830. Also included in FIG. 8 is a semaphore group 832, which includes a semaphore P wait primitive 834 and a semaphore V signal primitive 836.

While the discussion above is directed to one embodiment of software primitives and CPU synchronization hardware support, this disclosure includes a discussion related to a GPU metaprocessor hardware unit for support of primitives that can be configured to efficiently facilitate multiple GPU synchronization. More specifically, this disclosure includes discussions of GPU hardware synchronization primitives, as well as hardware blocks that may be configured to implement those primitives to support GPU-to-GPU synchronization and multiple GPU-CPU synchronization.

Figure 9:
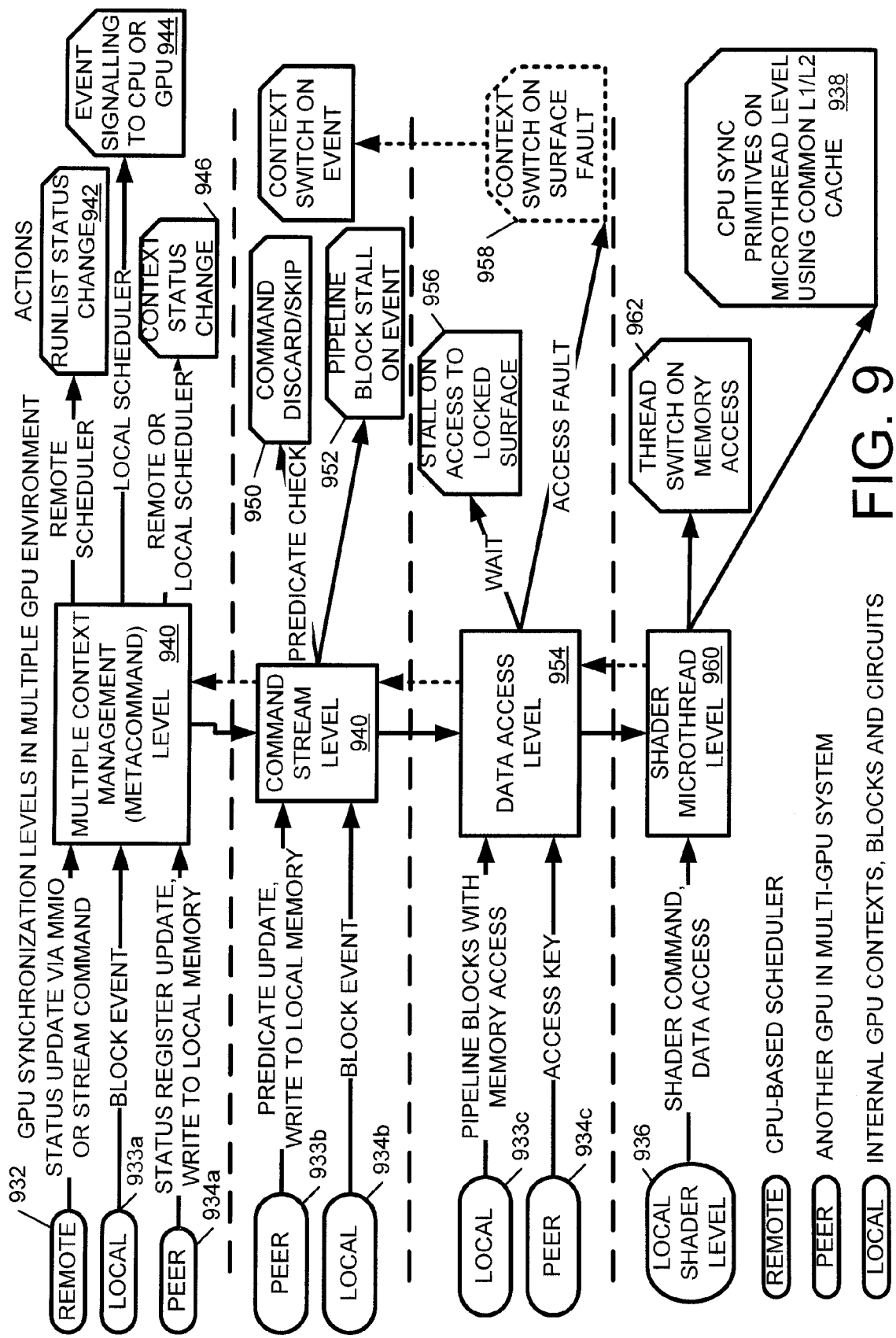
FIG. 9 is a block diagram illustrating GPU synchronization levels in a multiple GPU environment with a metacommand level, similar to the block diagram from FIG. 8.

FIG. 9 illustrates GPU synchronization levels that include context management, command stream management, data access and shader microthread levels. There are actors and possible actions on each level of synchronization. Actors may include remote type 932, which may include a CPU-based scheduler thread/process, a peer type 934*a*-934*c*, which includes another GPU context. Another actor may include a local type 933*a*-933*c*, which includes local GPU circuits and pipeline blocks with current running context. A local shader level actor 936 may include a shader program and instructions requesting data. Because of full programmability, the shader level 936 may implement one or more CPU sync primitives 938 using a common L2 cache and memory coherency mechanism in multi-CPU and multi-GPU system. Similar to a CPU, features can be added into the shader instruction set to support synchronization primitives.

GPU Metacommand and/or multiple context management level 940 is a level of control for next generation GPUs and may be configured to manipulate by context status and context groups (e.g., run lists) based on an event from local, remote, and peer actors in the system. This metacommand level 940 can be configured to implement CPU-to-GPU and/or GPU-to-GPU synchronization. On this level, GPU hardware may receive context status update commands via Memory Mapped Input/Output (MMIO) and/or stream command from remote actors, GPU pipeline event from local circuits, and status register update or update of synchronization registers mapped to local GPU memory. Metacommand levels may change run lists status 942 in response to a remote scheduler, signal an event in response of local scheduler 944, and change status of current context in response to remote or local scheduler 946.

Command stream level 948 may be enhanced compared to previous implementations by adding predicated command execution (or discard/skip 950) and potentially stalling command execution 952. Metacommands can also be included in an executable command stream if synchronization in particular command streams is desired.

Data access level synchronization 954 can be configured to support the handling of data hazards in access to shared surface, stall on access to locked surface 956, as well as virtual memory access faults 958 for context switch on an event 964. Shader microthread level 960 is also introduced when a shader program can access data directly from the memory with switching microthreads for latency compensation 962. Full programmability of shaders can provide a possibility to implement standard CPU-based synchronization primitives, such as those depicted in FIG. 7.

Figure 10:
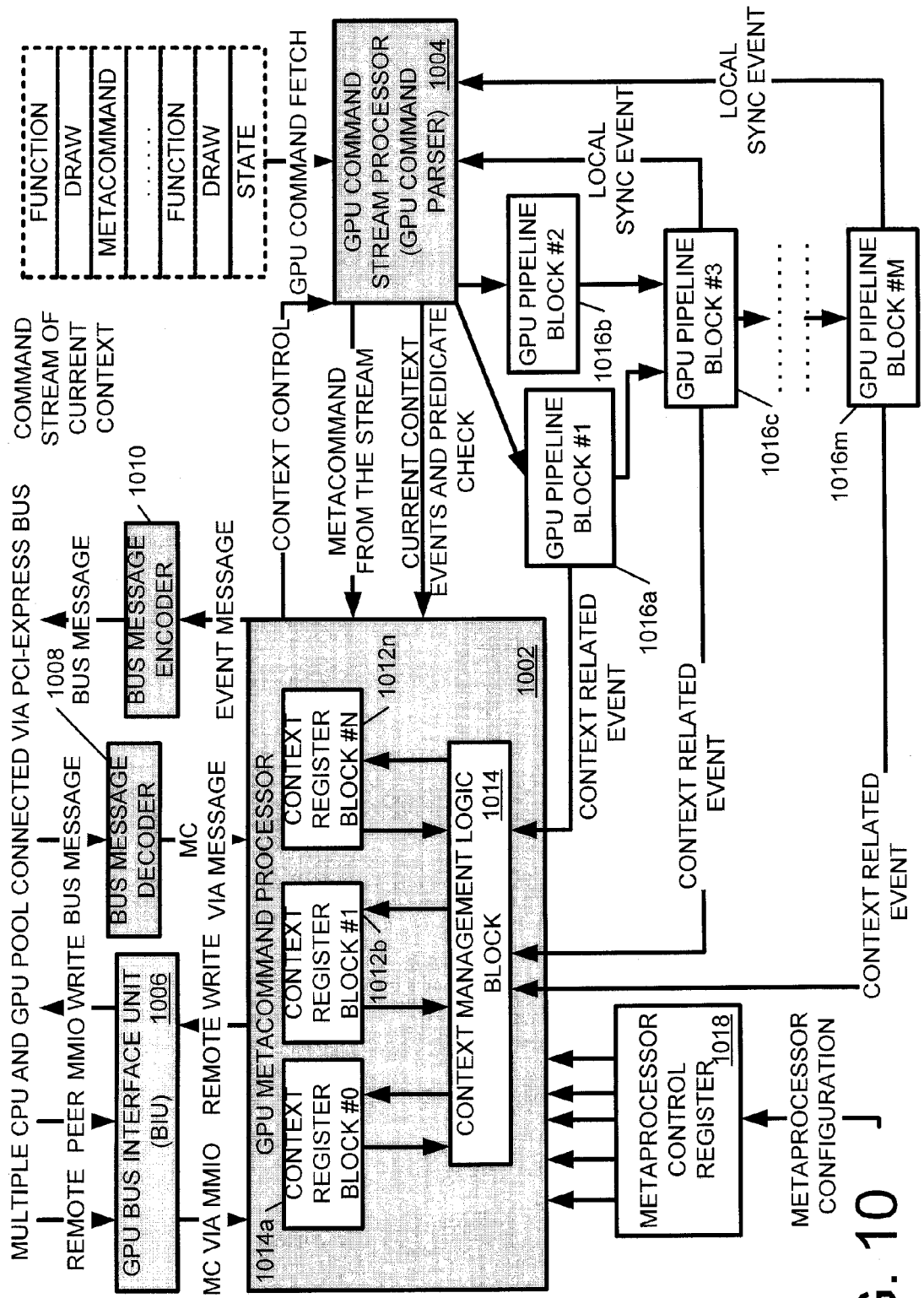
FIG. 10 is a GPU metacommand processor block diagram in conjunction with other GPU units, similar to the diagram from FIG. 9.

An exemplary structure of a GPU metacommand processor (metaprocessor) and structure of communication with other GPU blocks is presented on FIG. 10. A metaprocessor 1002 may be coupled to a command stream processor 1004, Bus Interface Unit (BIU) 1006, bus message encoder 1010, and/or decoder 1008. The BIU 1006 may include an encoder and/or a decoder as logical parts of the same hardware unit. Metaprocessor 1002 receives a metacommand and event signals from these units, as well as from one or more GPU pipeline blocks.

The Metaprocessor 1002 may include one or more context register blocks 1012a-1012n and context management logic 1014 connected to other parts of the GPU. Context management logic 1014 implements operations on contexts and synchronization primitives, discussed in more detail below. The metaprocessor control register can be configured to define the configuration or predicates and/or conditions, as well as actions to be performed by context management logic. At least one embodiment of context management logic 1014 in a metaprocessor can be based on programmable core as well as on a dedicated fixed function hardware unit, depending on requirements to response time.

The Bus Interface Unit 1006 can be configured to provide the access from the system of CPUs and/or GPUs to the metacommand processor logic. The command stream processor 1004 can be configured to fetch a current context command stream and send commands for execution to GPU pipeline blocks 1016a-1016m. The command stream may also contain metacommands, which may be forwarded for execution in the metaprocessor 1002 and/or executed in the command stream processor. The metacommand processor 1002 receives metacommands from the BIU 1006, a Command Stream Processor (CSP), the message decoder, as well as context-related event/signal notifications from the CSP and the GPU pipeline units. Based on this information, metaprocessor manipulates multiple contexts in the GPU. A Metaprocessor control register 1018 can be used to define context management logic block behavior in case of implementation as dedicated hardware block.

Figure 11:
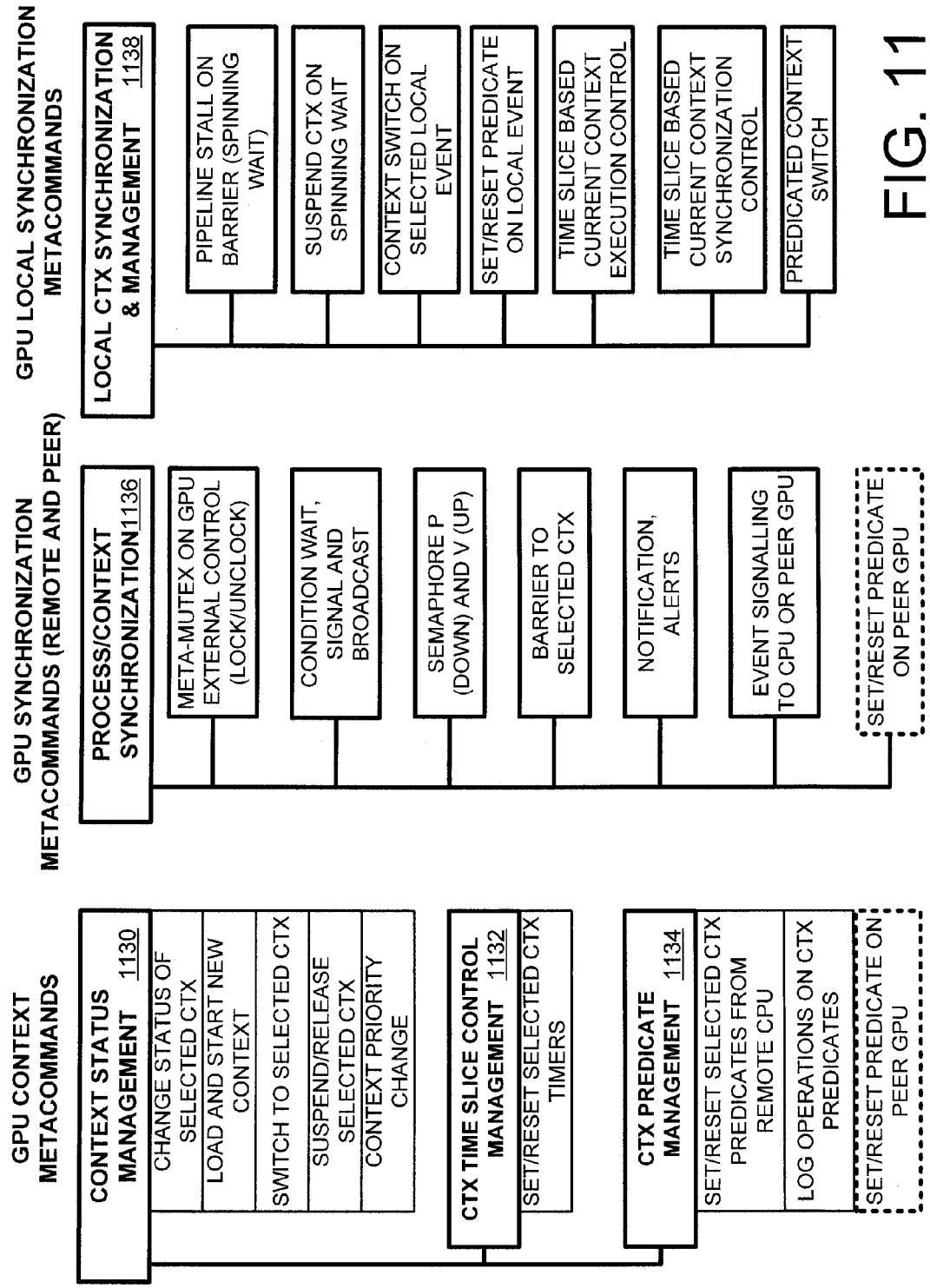
FIG. 11 is a block diagram illustrating an exemplary embodiment of GPU metacommands for synchronization and context management, similar to the diagram from FIG. 10.

An exemplary implementation of metaprocessor may have a plurality of groups of metacommands, as presented on FIG. 11:

1) GPU context management commands.
2) GPU remote and peer synchronization metacommands.
3) GPU local synchronization and management metacommands.

FIG. 11 is a block diagram illustrating an exemplary embodiment of GPU metacommands for synchronization and context management, which can be executed on the structure similar to the diagram from FIG. 10. The first group of metacommands includes a context status management subgroup 1132 with metacommands of changing status of selected context, load and start of new context, switch to selected context, suspend and/or release selected context, priority change for selected context. Another subgroup may include context time slice control management metacommands 1134, which may set and reset one or more timers used in context management. Context predicate management subgroup 1136 can be configured to manipulate by local and peer GPU context predicates and define some logic operations on predicates.

The second group may contain process/context synchronization metacommands 1136. At first look, the metacommands appear similar to CPU synchronization primitives on FIG. 7, although, in at least one embodiment, there may be some differences in implementation, behavior, and meaning of those primitives at GPU metacommand level. Meta-mutex defines mutually exclusive access to a selected context/run list. The CPU and/or GPU may lock a particular GPU context for further management and, in at least one nonlimiting example, no other CPU and/or GPU may manipulate this locked context. After this CPU and/or GPU is unlocked, the context other actors may access this context and send metacommands. A special context lock register with agent ID (CPU process or GPU ID with context number) are provided to support such a metacommand.

A condition wait metacommand may be similar to a predicated command execution in a lower command stream level but instead of skipping commands, the wait metacommand changes the status of context to "suspended" if a condition is not satisfied. If a condition is satisfied, the context status is changed to "ready." One variation of such command may include "condition start" when metaprocessor initiates an immediate context switch to a selected thread if a condition is satisfied. The condition could be formed from a combination of predicates using condition configuration registers in a context register block of the metacommand processor, however this is not a requirement.

The condition signal metacommand may release particular suspended context if another actor changes the blocking condition. This metacommand contains two essential parts: predicate change part and signal part which changes the status of context to "ready". Before execution starts, this context rechecks the condition. The condition broadcast is similar to the signal and directed to all contexts in the run list or to all run lists.

Semaphore P and semaphore V are metacommands that can be configured to provide a capability to manage context execution on software events versus astronomical time in case of time slice counter based management. Both the CPU and the GPU can send these metacommands to the context and manage execution and/or suspension of the context. In operation, these semaphores may be similar to those depicted in FIG. 7 and the subject for those semaphores are currently running or suspended contexts.

Barrier metacommands may hold context execution until the Wait-Fence keys match. A barrier synchronization register block with pairs of Wait-Fence registers may be a part of context register block and/or implemented in memory access unit. Notification and alert metacommands may change the status of a context without interrupting context execution if the metacommand is running. In their actions those, commands are very similar to original primitives from FIG. 7. Set and/or reset selected predicates metacommands also may belong to this group.

Local context synchronization and management metacommands 1138 may be initiated by events in the GPU pipeline blocks and circuits. A pipeline stall on a barrier event may be reported to metaprocessor and the event may initiate a context suspend on spinning wait and switch to another context. As a result, the priority of the context may be changed as well. Selected local events may change predicates and a predicate change may initiate a condition signal metacommand. Time slice based current context execution control can be configured to define a maximum astronomical execution time of particular context. After expiration of a timer, this context may be switched to another timer. Time slice based synchronization commands can also be configured to define a maximum astronomic time between synchronization events to avoid hanging of GPU on spinning wait or any other event.

A predicated context switch metacommand can allow a predicated context switch when the next waiting context checks a selected predicate before beginning execution. Non-limiting examples of metacommands for metacommand processor (MCP) are listed in following tables.

TABLE 1

Remote actor context management examples

| MetaCommand | Arguments | Target unit in GPU | Issued by |
|---|---|---|---|
| Load and start new context | Context pointer, status mask | Metacommand processor (MCP)context register block | SW GPU scheduler via MMIO (remote actor) |
| Suspend/ Release ctx | Context ID, Status mask | MCP context register block | SW GPU scheduler via MMIO (remote actor) |
| Switch to selected ctx | New Context ID if any | MCP context register block | SW GPU scheduler via MMIO, GPU local scheduler (remote, local) |
| Set predicate | Predicate ID or predicate select mask | MCP predicate block | SW GPU scheduler via MMIO (remote) |
| Set time slice for predicate check | Context ID, time slice in cycles | MCP context register block | SW GPU scheduler via MMIO or special command in executable DMA buffer (remote) |
| Context priority change | Context ID, priority level or mask | MCP context register block | SW GPU scheduler via MMIO (remote, local) |
| Send external notification and alerts | Memory address, Notification value | Any GPU block connected with memory interface unit | Special command in executable DMA buffer (remote) |

TABLE 2

Local context management support examples

| Metacommand | Arguments | Target unit in GPU | Issued by |
|---|---|---|---|
| Switch (Predicated) to another context | Context ID, Predicate ID | Command stream processor (CSP) context register block | SW GPU scheduler via MMIO, local GPU scheduler |
| Interrupt current ctx (and activate new ctx) | New Context ID if any | MCP context register block | SW GPU scheduler via MMIO, local GPU scheduler |
| Suspend (predicated) particular context | Context ID, predicate ID | MCP context register block | SW GPU scheduler via MMIO, local GPU scheduler |
| Set predicate to be checked by local scheduler | predicate ID | MCP predicate block | SW GPU scheduler via MMIO |
| Time slice control | Counter ID, time value | GPU local scheduler in CSP | SW GPU scheduler via MMIO |
| Barrier | Block ID, Wait token | MCP context register block | SW GPU scheduler via MMIO |
| Context priority change | Context ID, priority level or mask | MCP context register block | SW GPU scheduler via MMIO |

TABLE 3

Remote Peer-to-Peer Context management support examples

| Operation | Arguments | Target unit in GPU | Issued by |
|---|---|---|---|
| Suspend Context on spinning Wait | Default (running context) | MCP context and control register block | Local GPU scheduler |
| Send Fence to other GPU sync block | Fence address and value | Any block with interface to MXU | Input Command stream from executable DMA buffer |
| Set spin wait watchdog timer | Counter ID, value | MCP context and control register block | SW GPU scheduler via MMIO |
| Set time slice for context switch on spin wait | Counter ID, value | MCP context and control register block | SW GPU scheduler via MMIO |
| Enable/disable watchdog and wait token modes | Register ID, mask | MCP context and control register block | SW GPU scheduler via MMIO |
| Set predicate on peer GPU | Register ID, predicate ID or mask, set/reset | MCP context and control register block | Peer GPU |

Another classification of metacommands can be based on encoding and representation. Metacommands for a GPU metaprocessor can be classified in two main groups. First, explicit metacommands containing opcode and encoded action supplied with address and modification flags. This metacommand token can be inserted into GPU command streams and/or sent as a message via a PCI-X interface. Second, implicit metacommand, which can be initiated by an update of context related register and/or signal setting predicate and/or condition. Metacommand action details in this case may be defined by the content of the metaprocessor content register. Below is an example of metacommand token which can be inserted in the input command stream of GPU:
0Bh RunListUpdate This command may be accepted from the BIU command stream, the command may occur within a DMA and/or a RB stream may raise an "illegal command code" event.

TABLE 4

0Bh RunListUpdate

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | Reserved | | | | | | | Act | O/E | r |
| 31 | 30 | 29 | 28 | 27 | 26 | 25 | 24 | 23 | 22 | 21 | 20 | 19 | 18 | 17 | 16 |
| 0 | 0 | 1 | 0 | 1 | 1 | DWF | | | | | | reserved | | | |

| | |
|---|---|
| Bit 1 | ODD/EVEN |
| | 0 = Update EVEN Run List |
| | 1 = Update ODD Run List |
| Bit 2 | Active |
| | 0 = Update only (Please use the Set Register cmd) |
| | 1 = Update and Kick-off this Run List |
| | (If the Privilege DMA is still running, and the Disable Context Switch is on, then the Run-List Switch may wait DMA command is complete). |
| Bits 25-24 | DWF (num of DWORD following) (=DWF + 1) |
| | Run List update may start from Context0, then Context1, Context2, and Context3. This field may specify the number of the context address followed this command. |

TABLE 5

0Dh EnableContextSwitch

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | reserved | | | | | | | | E | r |
| 31 | 30 | 29 | 28 | 27 | 26 | 25 | 24 | 23 | 22 | 21 | 20 | 19 | 18 | 17 | 16 |
| 0 | 0 | 1 | 1 | 0 | 1 | DWF | | | | | | reserved | | | |

| | |
|---|---|
| Bit 1 | Enable |
| | 0 = Disable context interrupt, interrupt is not enable after this command |
| | 1 = Enable context interrupt, any command after this point can be interrupted |
| Bit 25-24 | DWF (number of DWs following) |

Implicit metacommands may include following nonlimiting examples:

1) "Suspend context on spinning wait" which may be triggered in case of pipeline stall on spinning wait. Conditions present when this command is internally triggered may include:

a. Explicit Wait command fetched from the stream and being executed in one of the pipeline blocks.

b. Wait command execution attempt resulted on spinning wait when GPU pipeline stalled for significant amount of time, which exceeds special watchdog timer or time of wait token circulation. Such implicit commands can change the status of a current context to "Suspended," and initiate a current context save procedure with a context head pointer value preceding a Wait command that caused this event.

1) A "Time-Slice Based Context Switch" may be triggered by expiration of context time slice timer. Further actions are similar to the previous command.

2) A "Predicated Context Switch" may be triggered by change of selected predicate value. This predicate may be checked periodically using timer or immediately after any update of predicate registers. Further actions may be similar to a previous command.

Figure 12:
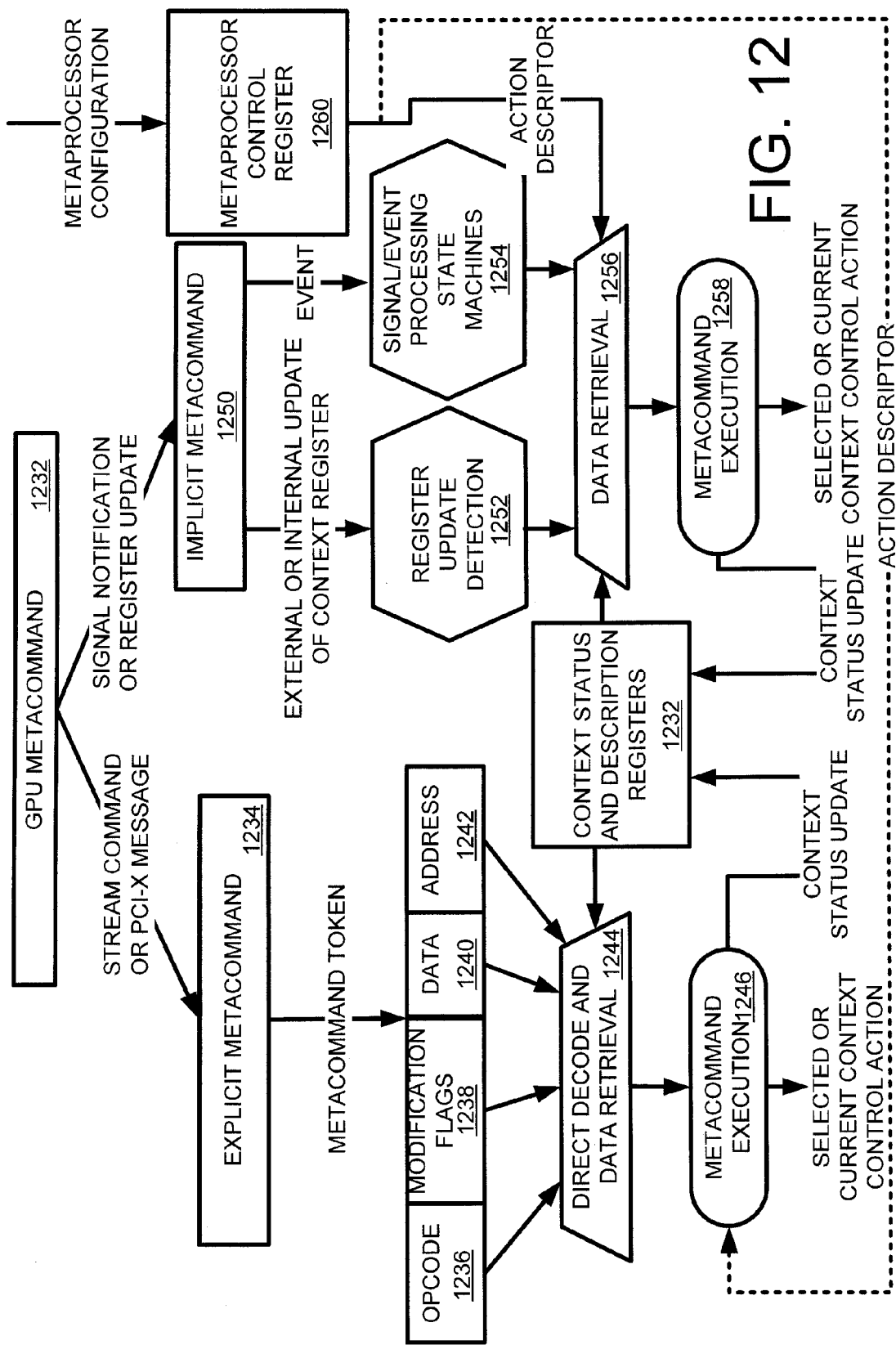
FIG. 12 is a metacommand execution flowchart.

FIG. 12 illustrates processing flow of both type metacommands in metaprocessor logic. An explicit metacommand may be received from a PCI-X and/or command stream and may be represented as a token of a format containing opcode, modification flags, action encoded descriptor, and address, if any writes to memory space are going to be completed. This metacommand, decoded directly, as in most CPUs, retrieves desired data from command token and context status register. In some cases, metacommand action may encode by the reference to a particular metaprocessor control register containing action description. After data retrieval, the metacommand may be executed with an update of specified context status and some control actions applied to current and/or specified contexts.

Implicit metacommands initiated by context related register update (including predicates) and signal or event in GPU pipeline blocks. Special logic detects register updates, pipeline events and/or signals. Based on the type of signals, this logic may send requests to a metaprocessor control register, which may include encoded actions similar to encoded action fields in an explicit metacommand token. This action descriptor along context status information may be returned to metacommand execution logic, which may use the information in metacommand execution and/or context status update.

FIG. 12 is a data flow illustration of metacommand processing in GPU, similar to the GPU metaprocessor from FIG. 12. GPU metacommands 1232 may exist in a plurality of forms, such as an explicit metacommand 1234 and/or as an implicit metacommand 1250, as it depicted in FIG. 12. An explicit metacommand 1234 may be considered as a token with opcode 1236. Opcode 1236, modification flags 1238, and arguments may include data values 1240 and/or address information 1242, which can be sent to direct decode 1244 for execution 1246. Such tokens can be received via PCI-X message interface and/or from a GPU command stream. Implicit type metacommands 1250 may be configured without a token format and can be considered as a form of state machine action in response of event. This event may be a signal, message, or update of some context block registers.

An appropriate state machine may be triggered 1252, 1254 in this case and metacommand may be executed after retrieval of required data 1256 from context descriptor and control registers 1248, as well retrieval of data from metaprocessor control register 1260. As a result of the metacommand execution 1246, 1258, the status of a selected or current (default) context may be updated, as well context execution may be altered. Metacommand execution 1246, 1258 can send context status updates to contest description and control registers.

Figure 13:
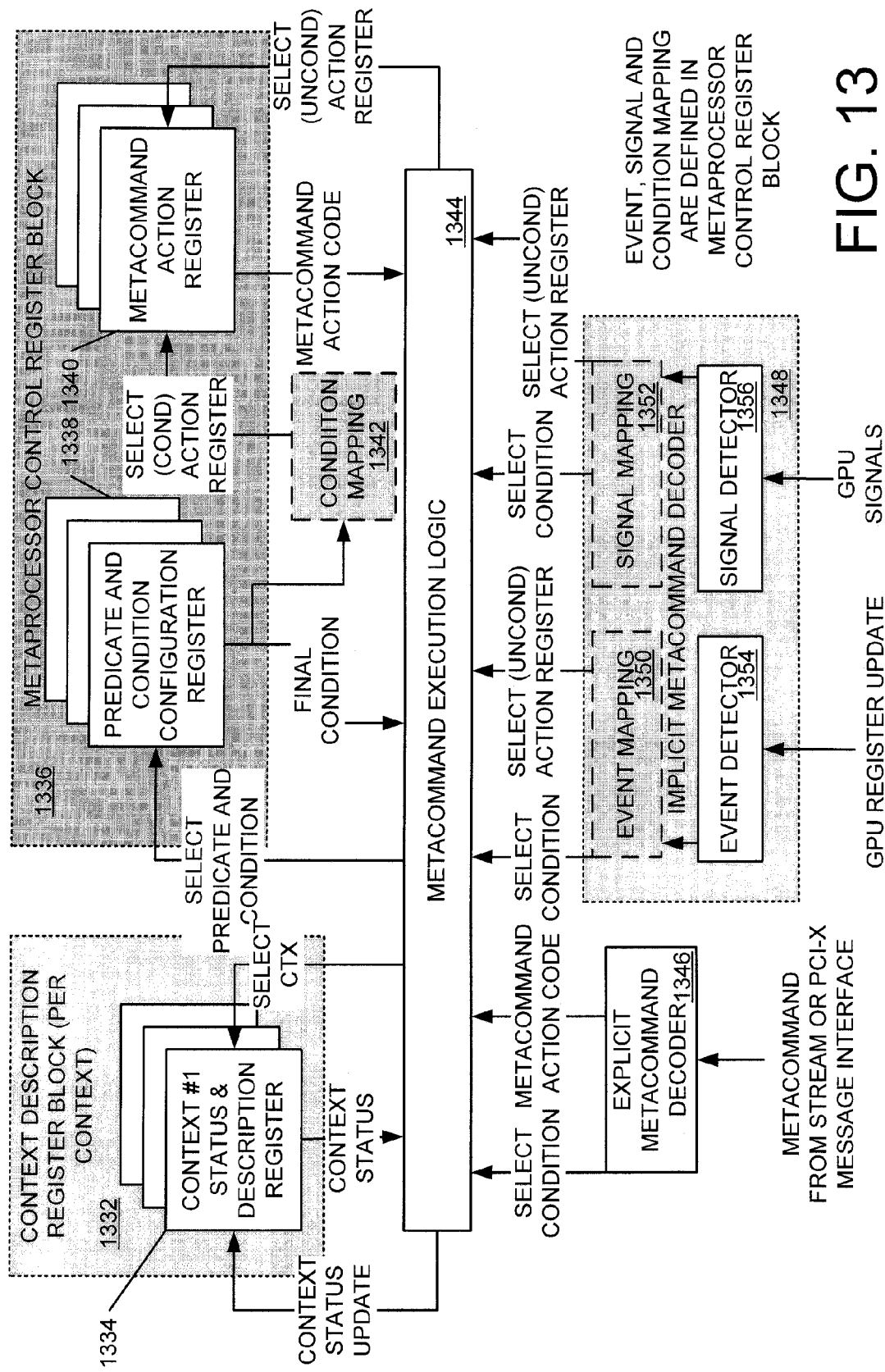
FIG. 13 is a block diagram with details of metacommand execution.

FIG. 13 depicts a more detailed nonlimiting example of metacommand execution data retrieval. An explicit metacommand decoder 1346 may be configured to provide a metacommand action code from a command token, which selects a context status for metacommand execution at block 1344. Explicit metacommand execution may be conditional if one or more of the conditions are selected to check before the execution. Unconditional execution uses command token data directly and/or refers to a metacommand action register to retrieve an action code.

An implicit metacommand decoder 1348 may include an event detector 1354 and/or signal detector 1356 to detect a register update and GPU signals. Special event mapping 1350 and signal mapping logic 1352 may be configured to select a condition where an event and/or signal can be mapped or a direct unconditional action defined in a metacommand action register. Condition is provided by mapping this event and/or signal to a particular predicate, which form a final condition to be later used in action selection, if the condition becomes "true." Each condition may have a mapping to one of the action registers. In some cases, like general GPU fault and/or some other hardware events, metacommand action may be unconditional and direct selection of action registers may be desirable. Conditional and unconditional implicit metacommand processing may provide flexibility for the GPU metaprocessor.

Additionally, context description register block 1332 may include a plurality of context status and description registers 1334, which may receive a select context signal and a context status update signal and provide a context status to metacommand execution logic 1344. Metaprocessor control register block 1336 may include a plurality of predicate and condition configuration registers 1338, which may be configured to receive a select predicate and condition signal and provide a final condition signal to metacommand execution logic 1344 and condition mapping component 1342. Condition mapping component 1342 may send a select condition action register signal to metacommand action register 1340, Metacommand action register 1340 may also receive a select unconditional action register signal from metacommand execution logic 1344 and send a metacommand action code to metacommand execution logic 1344.

Figure 14A:
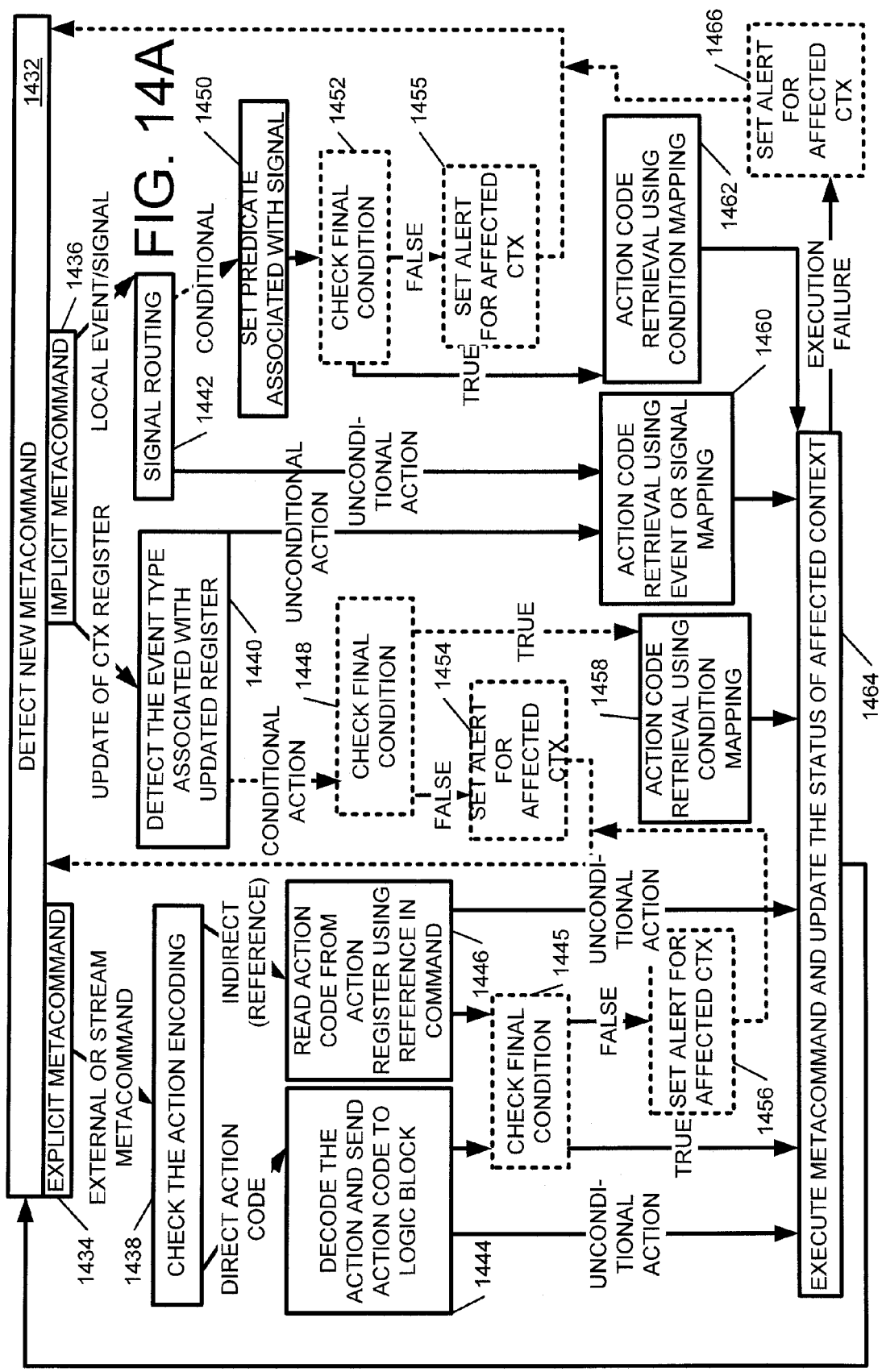
FIG. 14A is a flowchart of an explicit and implicit metacommand execution sequence.

FIG. 14A is a flowchart of an explicit and implicit metacommand execution sequence. FIG. 14A describes an exemplary sequence of actions that may decode and retrieve data in explicit and implicit metacommand processing. In the case of an explicit metacommand 1434 detected at block 1432, the coding action encoding may be checked 1438. In case of direct action encoding, if the action is an unconditional action, the token field may be decoded and sent to the execution logic 1364 directly. If, on the other hand, the action is conditional, the action may be sent to check final condition component 1445. If the final condition is "false" at block 1445, the alert flag and code may be set without execution at block 1456. If the final condition is "true," the action may be sent to block 1464 to execute the metacommand and update the status of the affected context.

In case of an indirect action encoding, at block 1438, the action code may be retrieved from a metacommand control action register at block 1446. In the case of an unconditional command, the code may be sent to the execution logic 1464. In the case of a condition, the code is sent to check final condition block 1445. If the final condition is "true," the data may be sent to block 1464. If the condition is "false," the data may be sent to block 1456 to set an alert for the affected context, which is then returned to block 1432 to detect a new metacommand.

There is a plurality of types of implicit metacommands (block 1436) when one or more context and/or control registers is updated and/or local event/signal is generated. In the case of a register update, the event type associated with the register may be detected at block 1440. If the event type is a conditional event, then an appropriate predicate may be set and the final condition may be checked, at block 1448. If the final condition is "true," then action mode may be retrieved from an action register using condition mapping and sent for further execution at block 1458 and then sent for execution at block 1464. If, at block 1448, the condition is "false," then only an alert flag and code are set and a new metacommand is detected at block 1432. If, at block 1440, a unconditional action is detected, the action code retrieval from the action register is performed using event mapping (table), at block 1460.

When a local signal is detected at block 1436, the signal may be routed to an associated predicate, at block 1442. If the signal is conditional, the predicate can be set with the associated signal, at block 1450. The final condition can be checked at block 1452. If the condition is "false," an alert for the affected retrieve an action code from the action register. If the condition is "true," an action code may be retrieved using condition mapping (block 1462), and the metacommand can be executed at block 1464. If the condition is "false," then an alert flag and code may be set. Retrieved action code may be sent for execution to the logic. If metacommand execution has failed for whatever reason, the alert flag and code may be set, as well, as shown at block 1466.

Figure 15:
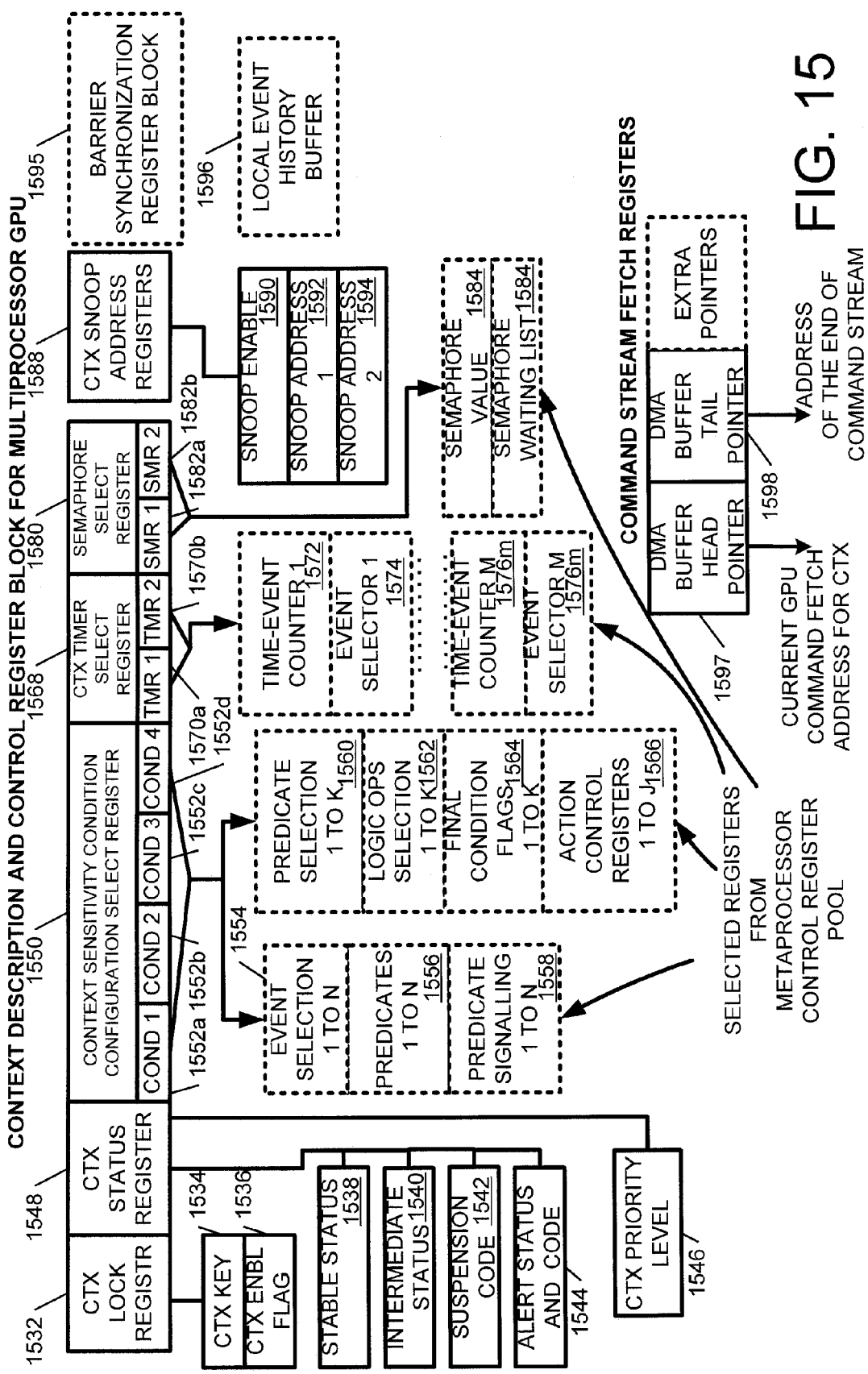
FIG. 15 is a block diagram with context description and control register block in a GPU metaprocessor.

To support context management, a GPU metacommand processor may be configured with a context descriptor and control register block that can be accessed by a remote CPU, peer GPU, and local hardwired or programmable scheduler. The functionality of such a block supporting a plurality of GPUs in a multiple context environment is depicted in FIG. 15. The number of context descriptors and control register blocks can match a maximal allowed number of contexts.

Figure 14B:
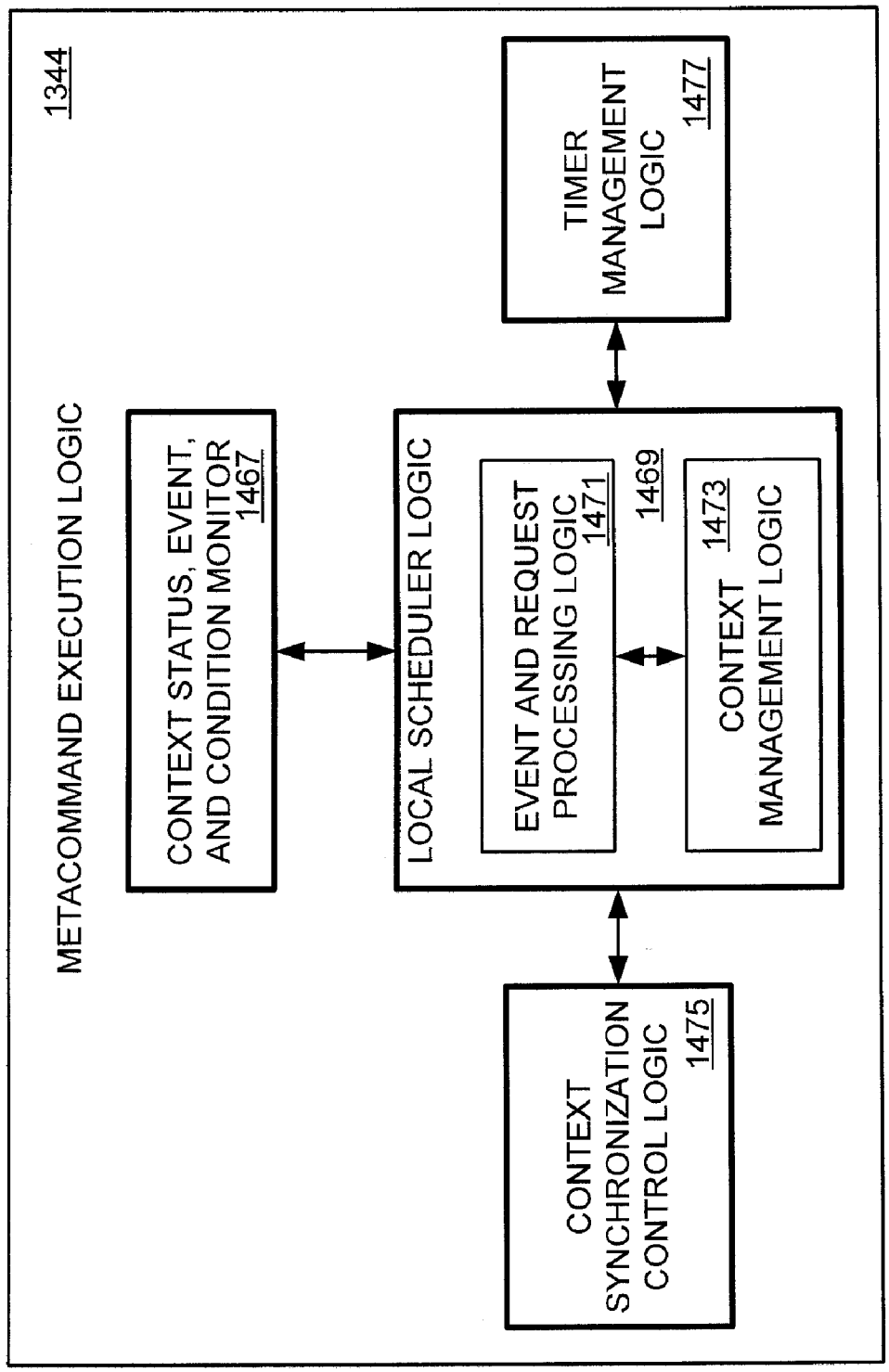
FIG. 14B is a block diagram illustrating an exemplary embodiment of execution logic.

FIG. 14B is a block diagram illustrating an exemplary embodiment of execution logic. More specifically, the metacommand execution logic 1344 may include a plurality of major blocks. More specifically, the metacommand execution logic 1344 may include a context status, event, and condition monitor block 1467, a local scheduler logic block 1469 with an event and request processing logic block 1471 and a context management logic block 1473. Also included are a context synchronization control block 1475 and a timer management logic block 1477.

FIG. 15 is a block diagram illustrating an exemplary context register block in a metaprocessor that can be combined into at least one run list, similar to the run lists from FIG. 6. More specifically, included in FIG. 15 are two groups of registers: context description and control register blocks and command stream fetch register blocks. A first group may include a context lock register 1532 with a context-enabled flag 1536 and context key 1534. This register provides a sensitivity of context register block to commands received from different agents, as illustrated in more detail in FIG. 16.

Context status register 1548 may contain few fields that describe stable status 1538 and intermediate status 1540 of a context, as well as a suspension reason code 1542. Alert status and code 1544 may be configured to define the necessity to check a condition and/or semaphore before starting restore and execution of this context. Context priority level 1546 may define the context priority, which may be used in context execution scheduling. Priority may be changed locally and/or remotely.

Context sensitive condition configuration register 1550 may be configured to define conditions 1552a, 1552b, 1552c, and 1552d, which may affect the status of a context. The register 1550 may contain references to conditions in a metaprocessor control register pool. These metaprocessor control registers may be configured to define predicate selection to form condition code (block 1560), select an event (block 1554), define predicate values (block 1556), define predicate signaling, select a predicate (block 1560), define logical operations (block 1562), define condition flags (block 1564), and action control registers (block 1566) that are associated with this context. Predicate signaling register (block 1558) may be configured to define the signaling to local scheduler. Predicate update event may be signaled to a local scheduler immediately or no signal to scheduler will be sent and it will discover predicate change on time-based polling of conditions.

For at least one of the predicates there is event, a selection register may be configured to define an internal and/or external event affecting predicate value. The predicate signaling register 1558 may be configured to define the signaling to local scheduler. A predicate update event may be signaled to a local scheduler or no signal to scheduler will be sent and it local scheduler can discover predicate change on time-based polling of conditions. Redicate select mask 1560 selects a group of predicates for logical operation defining the condition. Predicate logic ops 1562 may be configured to define the type of logical operation on multiple predicate bits to produce a final condition value.

Context timer select register 1568 may include timers 1570a and 1570b and may also include references to selected time-event counters 1572-1572m and event selectors 1574-1574m for those counters that are located in metaprocessor control register block. Metaprocessor control register may contain one or more counters that may be configured for different purposes according to a coupled event selector register and particular context may use the counters via context timer select register reference. As a nonlimiting example, a timer 1570 may count execution time slice, wait time slice, predicate check time slice etc. Some of the counters may be configured to count software events and may be used for simple synchronization of context execution.

Semaphore select register 1580 may be used for "semaphore type" synchronization and context suspend and wakeup. The semaphore select register 1580 may have references to one or more semaphore registers 1582 in metaprocessor control register pool with coupled semaphore value register 1584 and waiting list counter 1586, which may contain a number of contexts waiting for this semaphore.

Context snoop address registers 1588, 1590, 1592, and 1594 may be configured to define the addresses that are snooped by a context and generate a snoop event signal to local scheduler. Snooping could be also disabled. Similarly, context descriptor may include barrier synchronization register block 1595 which will be used by Fence/Wait synchronization commands. Barrier synchronization register block 1595 can be considered as a logical part of metaprocessor while physically, barrier synchronization register block 1595 can be implemented in other blocks like BIU or memory access unit MXU. Local event history buffer 1596 may be shared by one or more contexts and may contain a sequence of last event codes including suspension and alert codes for every context in GPU. This information may help to debug and schedule context execution.

Command stream fetch registers may be configured to support access to the context data in the memory. DMA buffer head pointer 1597 can be configured to fetch addresses for contexts, while the DMA buffer tail pointer 1598 can be configured to convey an address at the end of the command stream. While in at least one configuration, if the total number of allowed contexts is 16, the contexts may be grouped into 2 run lists with 8 context each or 4 run lists with 4 context each. It may also be possible to group the contexts to uneven groups, as well.

Figure 16:
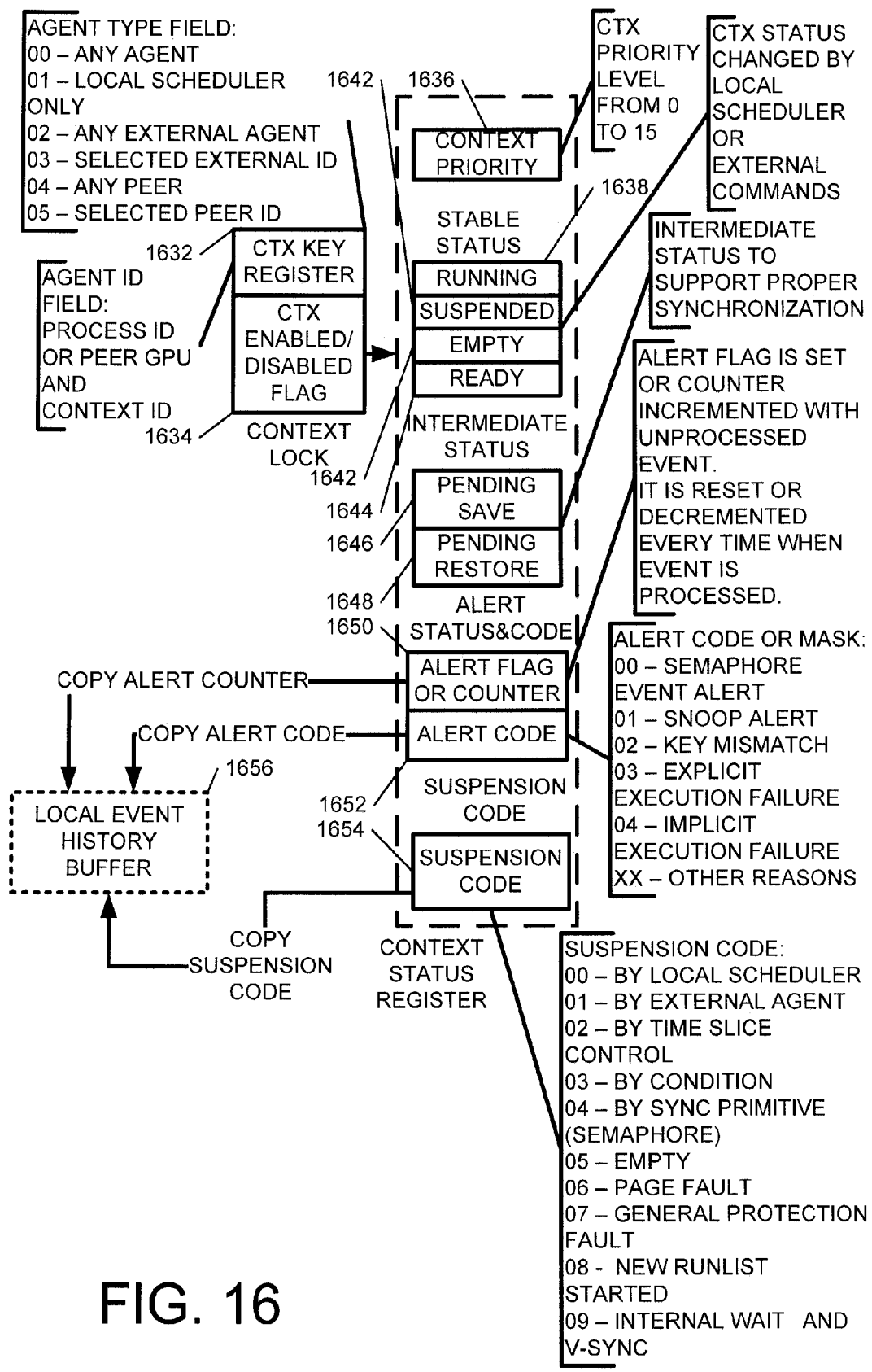
FIG. 16 is an exemplary embodiment of a context status register.

FIG. 16. describes a context lock register and context status register. A context lock may be configured to define the sensitivity of a context to action of external and internal agents. The context lock may include a context key register 1632 with an agent type field and agent ID field, as well as a context enabled/disabled flag register 1634. Agent types may include any agent, local scheduler, any external agent, selected external process with agent ID, any peer GPU, selected peer GPU with agent IF and combinations of listed above. An agent type field may be implemented as a mask. An agent ID field may contain a CPU number and process ID, as well as a peer number and context ID, depending on defined agent type.

A context priority field 1636 may be configured to define a context priority level (for example, from 0 to 15) and can be changed by an agent defined in an agent type field, as well as by local scheduler. There are four main stable stages of context status: "Running" 1638, "Empty" 1640, "Ready" 1642, and "Suspended" 1644. There are two intermediate stages: Pending save 1646 and pending restore 1648, which may be used to indicate the processes of context state load and save. Context state transition chart is presented in following FIG. 17.

"Running" state 1638 indicates that this context is currently running in GPU pipeline. This status may be changed when head pointer reaches a tail and there are no more commands in the stream to process. Another reason might occur the contexts suspend is based on internal or external events which sets suspension code.

"Empty" status 1642 may be configured to indicate that the context has nothing to do and may be deleted by loading new context in associated context register block. If a CPU updates the tail pointer, the context may return to a "ready" state 1642 and can be restarted any time. An empty context 1642 may cause automatic switch off of this context and saving the state in the memory. After that this context status will change to "suspended" 1640.

"Ready" 1642 indicates that the context can be started any time by local scheduler according to priority or order of context switch procedure. This context may check conditions before restart if it is alerted in status register. If sync condition is not satisfied it returns to "suspended" status 1640.

"Suspended" status 1640 may be configured to indicate that the context is waiting for some conditions to be ready to start execution. Condition satisfaction as a result of internal event or external messages may release this context to "Ready" status 1642.

"Pending Save" 1646 and "Pending Restore" 1648 are temporal intermediate states between "Running" 1638 and "Suspended" 1640. These states may be utilized in case of any access to memory mapped registers, which may be located at the memory (context suspended) or in the GPU (context running).

Figure 17:
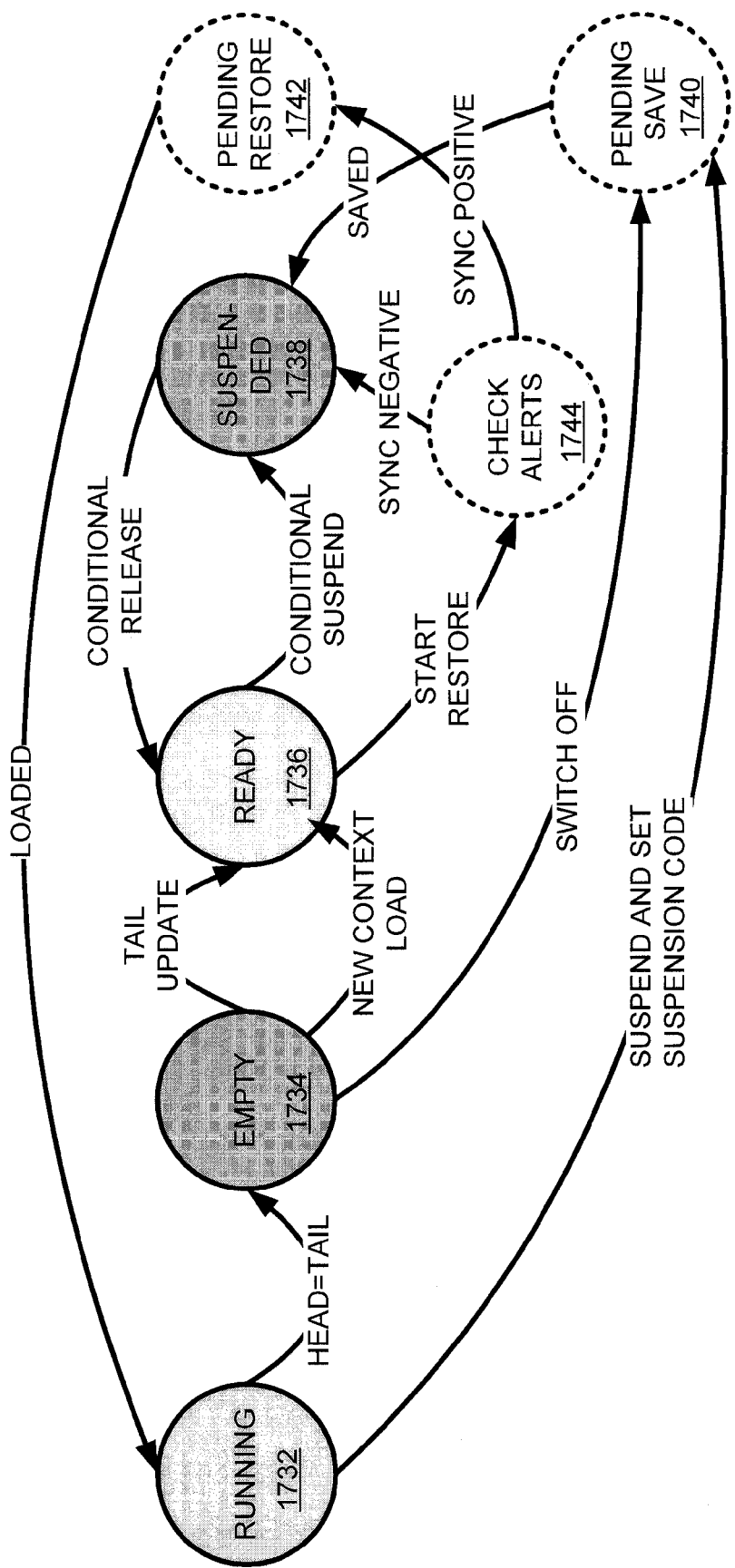
FIG. 17 is an exemplary embodiment of a context state transition diagram.

Returning to FIG. 16 where alert status and code register is presented. Alert flag (or counter to count multiple alerts) 1650 is incremented with any unprocessed event which may happen in case if context being suspended at the moment of event. Both alert counter 1650 and alert codes 1652 are copied to local event history buffer 1656 to trace the activity of contexts. Alert examples may include:

00—semaphore event alert
01—snoop alert
02—key mismatch
03—Explicit Execution failure
04—Implicit execution failure
xx—other reasons If the context is suspended from execution suspension code is written to the register and copied to local event history buffer. Suspension code 1652 may include the reason of suspension:

00—By Local scheduler
01—By External agent
02—By Time slice control
03—By Condition
04—By Sync primitive (semaphore)
05—Empty
06—Page fault
07—General Protection Fault
08—New run list started09—Internal Wait and V-sync FIG. 17 illustrates exemplary context status transition when events and metacommands apply to a status management state machine, such as the metacommands from FIG. 11. In at least one configuration, there are four main stable stages of context status: "Running" 1732, "Empty" 1734, "Ready" 1736, and "Suspended" 1738. There are two intermediate stages: "Pending Save" 1740 and "Pending Restore" 1742, which can be used to indicate the processes of context state load and save. The "Running" state 1732 indicates that a context is currently running in GPU pipeline. This status may be changed when a head pointer reaches the tail and there are no more commands in the stream to process. Another reason might be that "Context Suspend" 1738 is based on events, which sets suspension code. "Empty" 1734 status indicates that the context has nothing to do and may be deleted by loading new context in associated context register block. If a CPU updates the tail pointer, the CPU may return to "Ready" state 1732 and can be restarted any time. Empty contexts may cause automatic switch off of this context and saving the state in the memory. After that occurs, the context status may change to "Suspended."

"Ready" 1736 indicates that the context can be started any time by local scheduler according to priority or order of context switch procedure. This context may check conditions before restart if the context is alerted 1744 in status register. If a sync condition is not satisfied, the context returns to "Suspended" status 1738. "Suspended" status 1738 indicates that the context is waiting for some conditions to be ready to start execution. Condition satisfaction as a result of internal event or external messages may release this context to "Ready" status 1736. "Pending Save" 1740 and "Pending Restore" 1742 are temporal intermediate states between "Running" 1732 and "Suspended" 1738. These states may be utilized in case of any access to memory mapped registers, which may be at the memory and/or in the GPU.

FIG. 18 is an exemplary state machine of metacommand processing in a metaprocessor. Metacommand and event detection loop node 1832 can be configured to monitor the status of external requests and internal events/signals. The metacommand and event detection loop 1832 can be configured to detect a write access from external CPU, peer GPU, or received metacommand from currently parsed command stream or from PCI-X message interface as well as a local signal and/or event. Special context number encoding logic points the metacommand execution logic to the context affected by this metacommand. Context lock is then checked 1834 and if the key mismatches, alert flag and code for this context should be set without any further actions (circle 1838). If key matches, metacommand may be completely decoded with separate paths for explicit external metacommands, local event/signal implicit metacommands and implicit external metacommands (circle 1836).

Depending on type, the external metacommand can include a processed timer management logic and/or context synchronization logic. If an external metacommand is present, the external command can be decoded (circle 1840). Additionally, the predicate and/or condition can be modified (circle 1842). The external metacommand may be further processed by context status and condition monitor 1844, coupled with local scheduler and context management logic 1850. The state machine can then return to metacommand and event detection loop 1832 (block 1856).

If, at block 1840, a timer, mode setup metacommand is detected, the state machine can process the data in a timer management control logic (circle 1854). If the timer expires, the state machine can proceed to circle 1850. Similarly, if at circle 1840, a sync metacommand is detected, processing can occur in the context synchronization control logic (circle 1852).

From circle 1836, local event or signals activate the context status and condition monitor (circle 1844), which checks the mask and if a condition cause by this event/signal is masked the local event can set the alert flag and code without further actions (circle 1846). If the event is not masked or cause unconditional action, the monitor can request local scheduler to handle this event according to metacommand action register mapped to this event (circle 1850). If an action failed for whatever reason, the local scheduler sets an alert flag and code for this context (circle 1846). If local event causes the sync event, the event can be processed by context synchronization logic. An implicit metacommand may cause predicate/condition modification, context status change or sync metacommand execution depending on updated MMIO register (circle 1848). All of them will be handled by appropriate logic.

Figure 19:
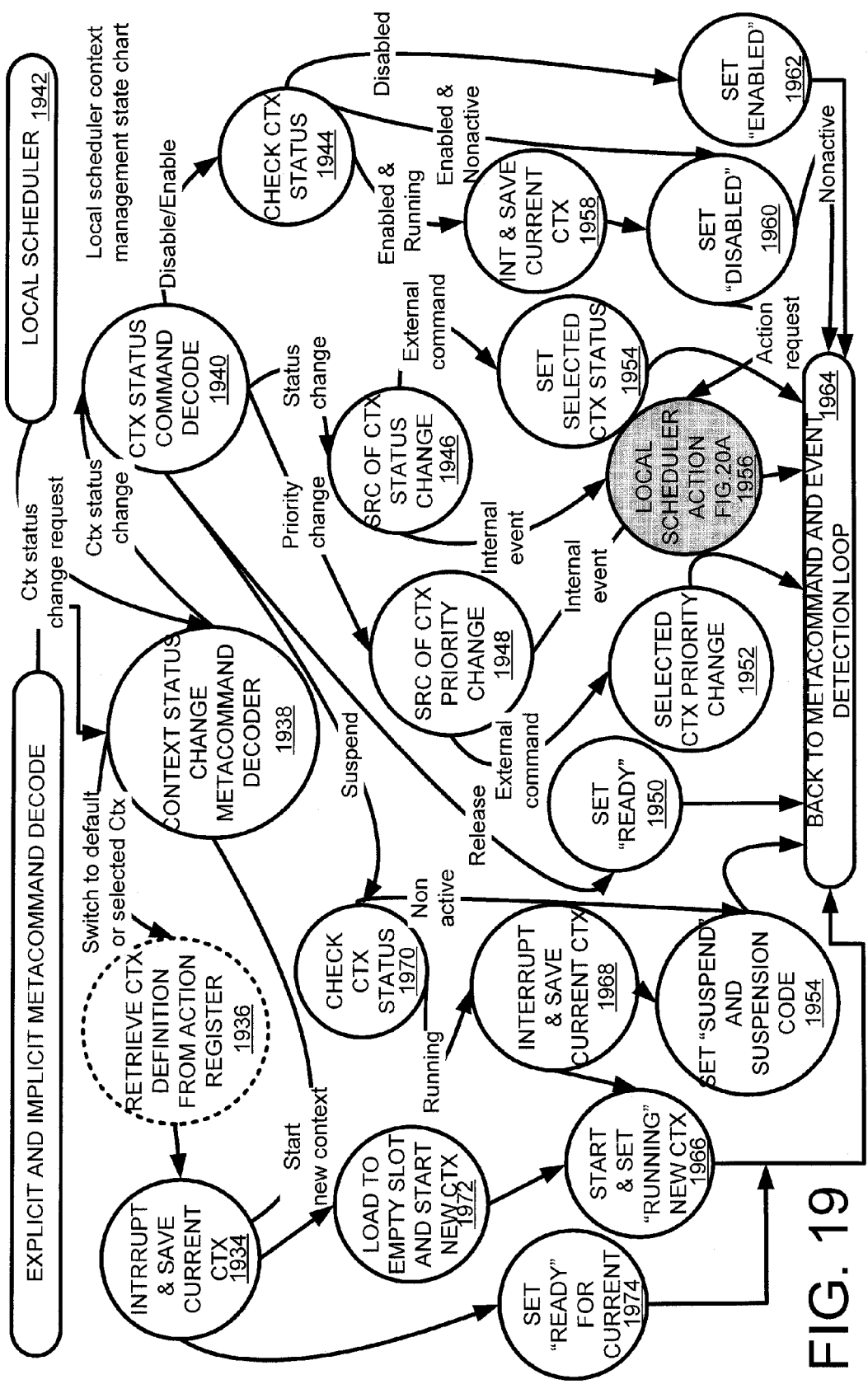
FIG. 19 is an exemplary state machine for local scheduler context management processing.

FIG. 19 depicts an exemplary implementation of a local scheduler context management state machine. The local scheduler context management state machine may receive, at circle 1938, "start new context" metacommand, which defines context to start by defining DMA head pointer to fetch context command and state stream. A current context may be interrupted and saved (circle 1934). The status of the saved context may be set to "Ready" status (circle 1974) because the saved context can be restarted any time. Empty slot of context register set can be allocated for this new context (circle 1972) and the execution of context is started with setting "Running" status (circle 1966).

If, at circle 1938, a metacommand requires a switch to another context (default or selected), the definition of this context may be retrieved from an action register (circle 1936) if the definition is not explicitly defined in the metacommand. If, at circle 1938, any metacommand requires context status or priority change, then the external commands may directly change the status of selected context. Internal events that cause the status or priority change may use a local scheduler to select the action on context from an associated action register, which may be mapped to particular event. If the command is to enable or disable particular context, the state machine proceeds to circle 1944. If, from circle 1944, this context is running and enabled, the context is interrupted and saved (circle 1958) and the context is sent to "Disabled" status (circle 1960). If the context is enabled and non-active, the context is simply set to a "Disabled" status (circle 1960). If the context is disabled, an enable command is executed that enables the context for further execution scheduling (circle 1962).

If, from circle 1940, a status change is indicated, the source of the context status change is determined (circle 1946) and a determination is made if this is an external command or an internal command. If this is an external command, the selected context status is set (circle 1954). If, on the other hand, this is an internal event, a local scheduler action is performed, as discussed in FIG. 20A (circle 1956).

If, at circle 1940, a priority change is indicated, the source of the context priority change is determined (circle 1948). If this is an external command, the selected context priority change is set (circle 1952). If this is an internal change, the local scheduler action may be performed (circle 1956).

If, at circle 1940, a release is indicated, the context may be set to ready status (circle 1950). If a s suspend is indicated, the context status may be checked (circle 1970). If the context is running, the state machine can interrupt and save the current context (circle 1968), the state machine can start and set the running of a new context (circle 1966) and the state machine can set suspend and suspension code (circle 1950). If, the context is not active, the state machine can set suspend and suspension code (circle 1950).

FIG. 20A illustrates a simplified local scheduler action in response of request of context management state machine from FIG. 19. After receipt of a request for context management, the state machine can configured predicates, logic operations, conditions, etc. for the context (circle 2032). After preliminary steps of configuration of predicates, conditions, and action registers with a mutual mapping, the local scheduler can select events for predicates and set an "update signaling" option (circle 2034). The local scheduler can configure and map action registers to conditions and unconditional events (circle 2036). The local scheduler can then detect a predicate change signal and/or a local scheduler request (circle 2038). The local scheduler can loop on detection of events and requests from other logic blocks. If a predicate change signal and/or request is detected, the state machine checks an associated final condition (circle 2040). If the condition is true or the signal/request is unconditional, the state machine requests the local scheduler executes the action defined by mapped action register (circle 2042), resets predicate and condition (circle 2044), and returns to main loop (circle 2038). If, at circle 2040, the signal/request is masked, the state machine sets an alert flag and code (circle 2046) and returns to circle 2038.

FIG. 20B depicts the concept of an implicit metacommand definition and execution, in more detail. There may be a plurality of GPU events and signals that may trigger conditional or unconditional metacommand execution in local scheduler in execution logic. The group of signals/events causing conditional actions of metaprocessor can be mapped (programmable or fixed) to predicate flags (blocks 2052, 2054). Such mapping, illustrated in FIG. 20B, may have a one-to-one correlation, where each signal is mapped to a predicate register flag. One or more predicates can be mapped to final condition flag (block 2056, 2058), logical operations between predicate values can be used for definition of a final condition of metacommand execution. This condition also can be masked and any predicate change does not initiate implicit metacommand execution. To define the action of a conditional metacommand, each condition flag may have mapping to one or more of metaprocessor action control registers (blocks 2060, 2066). Several conditions may be mapped to the same action control register. Mapping logic generates an action register selection and action code from this register is sent for execution to GPU local scheduler and metacommand execution logic.

In some cases, implicit metacommand could be unconditional depending on type of events (register updates) and GPU pipeline units signals. Those events/signals may also have a mapping to one or more action control registers. Such mapping is similar to non-maskable interrupts in a regular CPU and can be fixed or programmable. Mapping logic initiates action register selection and further execution of implicit metacommand (block 2068). Similarly, event mapping (block 2064) and signal mapping (block 2062) may also be sent to register pool (block 2066) and on to execution logic (block 2068).

FIG. 21 presents nonlimiting example of a conditional implicit metacommand action definition data flow, similar to the nonlimiting example from FIG. 20B. Event/signal selector (block 2132) has a module for each predicate flag, which may select particular event signal to be routed on the input of predicate flag register. In general, it is possible to select from all to one for each predicate flag, however for practical reasons one may restrict the scope of selection by grouping predicates and signals (events). A predicate flag register (block 2134) can also be set or reset externally by explicit metacommand or MMIO write. If predicate value has been changed, then an update signal may be sent to status and condition monitor. Additionally, predicate selector (block 2136 can configure predicates and predicate logic operations selector (block 2138) can select logical operations for the predicates.

Conditions and/or final condition flag values may be formed by a single selected predicate or group of predicates combined by logical operations between them. A standard set of logical operations could be applied to selected predicates or single predicate value can sent to condition flag register unchanged. Result of such operation forms condition flag value, which can be masked (at blocks 2140) if programmer wants to disable implicit metacommand initiated by this condition flag for certain time. For each condition flag, there is action register selector (block 2142), which contains the action register number defining metaoperation to be executed when condition is TRUE.

FIG. 22 illustrates relevant registers in a metaprocessor control register pool, which support predicate and condition configuration, as well as mapping of condition to action control registers. Predicate input event configuration registers (blocks 2232) may contain control fields for each predicate where selection of signals managing this predicate (blocks 2234) is defined. As a nonlimiting example, predicate input event configuration registers may including the following nonlimiting selection:

00—Explicit set/reset by an external agent
01—External write to context memory space
02—External write to sync register block
03—Internal write to sync register block
04—Execution Time expiration
05—Semaphore event
06—Internal Wait time expiration
07—Snoop event
08—CPU interrupt event
xx—other events Another version of implementation when selection defined using mask (blocks 2236) and multiple signals can modify a predicate. A predicate register contains number of predicate flag fields, those predicate flags can be set by selected events or externally and can be reset by local scheduler or externally. Switch to TRUE status can be signaled to local scheduler to process this condition initiated metacommand. A condition configuration register contains predicate selection mask (blocks 2236) to form final condition (blocks 2240) using logical operations (blocks 2238) defined in associated logic operation register. The following logic operations can be implemented with selected predicate values to form a condition: 0—Reserved, 1—NOOP, 2—AND, 3—OR, 4—XOR, 5—NOT (unary).

As a result, a final condition flag (blocks 2240) is set according to values of mapped predicates and logic operations between them. Each final condition flag can be masked and the TRUE condition may not initiate the metaoperation, but an alert flag and code can be set in the context register set that has been received event based conditional metacommand. Each final condition flag in final condition register is associated with condition action selection register where the number of action register is defined (blocks 2242). Finally, using this scheme we can form a request for metacommand action and provide a reference to action description in appropriate register (blocks 2244).

FIG. 23 illustrates context status, event and condition monitor state machine. This state machine refers to state machine in FIG. 18 and describes monitor activity in greater detail. State machine of FIG. 23 loops in the detection signals, events and requests (circle 2332). The state machine of FIG. 23 processes predicate update signals and events, timer based predicate and condition check, local scheduler requests, empty status query commands, run list status query commands and unconditional events or signals.

More specifically, if, at circle 2332, a predicate update signal or event is detected, a detect condition is effected (circle 2334), and the state machine can check the condition value (circle 2336). If the condition is false, the state machine returns to circle 2332. If, on the other hand, the condition is true, a condition mask can be checked (circle 2338). If the condition is masked, the state machine can set an alert flag and alert code (circle 2340). If the condition is not masked, the state machine can request a local scheduler action according to a mapped action register (circle 2342). The predicates and condition can be rest (circle 2344), and if this is a multiple condition loop, the state machine can return to circle 2336.

If, at circle 2332, a predicate/condition check timer has expired or the local scheduler requests a predicate check, the state machine can detect updated predicates (circle 2346). The state machine can then detect effected conditions (circle 2348). The state machine then proceeds to circle 2336 to check the condition value, as described above.

If, at circle 2332, an empty status query is detected, the state machine can detect empty status of a current run list context (circle 2350). If the context is empty, the context can be added to the empty list (circle 2354). If all contexts and run lists are processed, the state machine can send a query report to memory and interrupt to the CPU (circle 2356). If all contexts and run lists are not processed, the state machine returns to circle 2350.

If, at circle 2332, a query run list status is detected, the state machine can copy context status register content to the buffer (circle 2358). For a multiple context loop, this action can be repeated. If all context statuses are copied, the state machine can write the buffer to memory and interrupt/alert the CPU (circle 2360). Returning back to circle 2332, if an unconditional event or signal is detected, the state machine can request for local scheduler action according to the mapped action register (circle 2362).

FIG. 24 depicts a metaprocessor action control register mapped to one of the conditions defined by input event configuration register (illustrated as blocks 2432a, 2432b, but can include any number of registers, as indicated with a plurality of points between blocks) and condition configuration register from metaprocessor control register pool. Each predicate (blocks 2434a, 2434b) may be associated with signal or event, and can be selected (block 2436) to form the operands for a logic operation (block 2438) and result of logic operation can be set as a condition (block 2440), which is mapped (block 2442) to one of action control registers. An action control register (block 2444) may have main field, which describes the action to be taken in case a request is generated via condition or unconditional event, which is mapped to this action register. A tentative list of actions (block 2444) may include following actions, which may be taken alone or in combination with others:

0—Suspend current context and allow local scheduler to start new context
    1—Suspend current context and start default context
    2—Suspend current context and start selected context
    3—Conditional release of selected context
    4—Conditional suspend of selected context
    5—Increase context priority level
    6—Decrease context priority level
    7—Query selected context status
    8—Interrupt/alert remote CPU
    9—Interrupt/alert remote GPU
    xx—Other actions Encoding type may use enumeration for mutually exclusive actions and bit masks for actions which may be combined with others.

Other fields of action register describe details of action and provide necessary parameters. One of them is default context definition (block 2446) that describes the action in case switching to default context in action control main field. It may include:

0—Restart this context,
    1—Next ready in current run list,
    2—Highest priority in current run list
    3—First ready in next run list,
    4—Highest priority in next run list.

The purpose of selected context definition filed (block 2448) is similar to default context definition and may include a non-limited selection of several types of contexts to be switched to:

00—Context # in RL defined by selected context ID register
    01—Suspended by local scheduler
    02—Suspended by external agent
    03—Suspended by time slice control
    04—Suspended by condition
    05—Suspended by sync primitive (barrier, semaphore)
    06—Suspended as Empty
    07—Suspended on Page fault
    08—Suspended on General Protection Fault
    09—Suspended on New run list start
    10—Suspended on Wait (Internal wait, V-sync)

The selected context definition can be a multiple choice encoded via using the mask and local scheduler will select the context using priorities. Selected context ID registers (block 2450) contains explicit ID of context to be switched to. This ID may include Runlist number and context number. Remote GPU (block 2452) and remote CPU ID register fields (block 2454) define GPU/CPU ID to send interrupt/alert message and context/process ID to be notified about action taken in metaprocessor.

FIG. 25 contains exemplary state chart of local scheduler activity when it receives signals and requests. More specifically, at circle 2534, a local scheduler request can be polled. If a local event/signal request is detected, an action in the register that is configured for this event can be detected (circle 2532). If the action is a priority change, context priority can be increased or decreased (circle 2570). If the action is an interrupt/alert, the state machine can send an interrupt/alert message to the selected CPU and/or GPU. If, at circle 2532, a release or suspend is the detected action, the state machine can change the status of the selected context to "ready" or "suspend" (circle 2564). A signal can then be sent to status and condition monitoring logic (circle 2566).

If, at circle 2532, the detected action is a suspend current, the state machine can interrupt and save the current context (circle 2554). If the context is a selected context, the state machine can retrieve the selected context definition from an action register (circle 2556). The state machine can then check the status of the context (circle 2558). If the context is not ready, an alert message can be sent to a global scheduler (circle 2560). If, on the other hand, the context is ready, the defined context can be started (circle 2552). If, at circle 2554, a default context is selected, the state machine can retrieve the default context definition from an action register (circle 2562). The state machine can then can then proceed to circle 2558, as discussed above.

If, at circle 2534, a local arbitration request is detected, a context arbiter mode can be checked (circle 2536). If the mode is round robin, the next context in the current run list can be selected (circle 2548). If the context is not ready, the first ready context in the next run list can be selected (circle 255). If that context is ready, the defined context can be started (circle 2552). If there is no ready context in the GPU, an alert message can be send to the global scheduler (circle 2546).

If, at circle 2536, the arbiter mode is a priority mode, the status of the highest priority context in the current run list can be checked (circle 2538). If none are read in this priority, the checked priority can be decreased (circle 2540). If, at circle 2538, no context is ready in this run list, the highest priority context in the next run list can be started (circle 2542). If non are ready, a message can be sent to the global scheduler (circle 2546). If any context is ready, the detected context can be started (circle 2544).

FIG. 26A depicts exemplary configuration of a timer register block, which is included into metaprocessor control register pool. Each timer register may have input selector (blocks 2632) to make it sensible for particular signal/events. Exemplary selection may include following timer control events:

00—Start Context Execution,
    02—Start Internal Wait,
    03—Start Predicate check period,
    04—Semaphore event,
    05—Snoop event,
    06—CPU interrupt event,
    xx—other events Timers can work in different modes providing counting of clocks or events as well as down count and up count to the predetermined limit. A timer expiration signal can be mapped to one or more predicates which form the conditions associated with action register. Time/event counters (blocks 2634) can also be included.

FIG. 26B illustrates exemplary flowchart of timer related metacommand processing. More specifically, in the nonlimiting example of FIG. 26B, at circle 2636, data can be received via a local scheduler and/or a metacommand detection. The state machine can decode the context timeslice control. If the metacommand requests a setting of the timer, the selected timer is set (circle 238). An event selection for the predicate can also be set (circle 2640). A condition for the predicate can also be configured (circle 2642).

If, at circle 2636, a timer expiration event is detected, the configured predicate can be set (circle 2644). The context, status, event, and condition can be monitored (circle 2646). If the context is unconditional or active, a suspension code can be set to "time slice" (circle 2648). A mapped event/condition action can be selected (circle 2650). A local scheduler action can also be selected (circle 2652). If, at circle 2646, the context is masked, an alert flag and alert code can be set (circle 2654).

| Exemplary format of "Set timer/event counter metacommand" | | | | |
|---|---|---|---|---|
| Opcode | Opcode extension | Counter ID | Context ID | Counter Value |
| Main opcode | Variation of command action | Counter in metaprocess or control register block | Selected context (optional) | 64-128 bit value |

One should also note that another important task of a metaprocessor is a support for general synchronization primitives (FIG. 7 and FIG. 8). Context/process synchronization or peer-to-peer context/context may be provided by metaprocessor hardware and software. In general, sync primitives are not changed, only action on context management may be slightly different from original concept of primitives developed for CPU process/thread synchronization.

FIG. 27 depicts exemplary state machine of synchronization metacommand processing allowing to process metacommands, which support synchronization primitives. Sync metacommand decoder detects five types of sync metacommands: Metamutex, Condition, Semaphore, Notification and alerts and barrier metacommands.

At least a portion of those metacommands may take effect in case of access to context registers through the lock. In case of metamutex, the agent tries to acquire or lock the context from other agents and metamutex state machine processes such requests and sends positive or negative acknowledgement to requesting agent. In case of condition, the agent checks the lock and after checks the condition and run condition state machine, which performs all necessary actions. A semaphore command, depending on type, increments or decrements a semaphore register value. A semaphore P checks the value and, if zero, conditionally suspends the selected context. A semaphore V increments the value and checks waiting list. If any suspended contexts are waiting on this semaphore, the context status is changed to "ready."

Notification and alert sets alert flag and alert code for particular context. Before starting, this context may check the condition that facilitated the alert. A barrier is implemented using fence and wait command in case fence writing to the register or memory of particular context this context changes the status to "Ready" and is alerted to compare its wait value to updated fence when it starts. A wait command compares its value with fence register and may suspend or set ready the context.

More specifically, synchronization metacommand decoder 2732 is depicted in FIG. 27. A sync metacommand decoder 2732 can detect a plurality of types of sync metacommands, including but not limited to Metamutex, Condition, Semaphore, Notification and alerts and barrier metacommands. The metacommands may take effect in case of access to context registers through the lock. In case of a metamutex, the agent tries to acquire and/or lock the context from other agents and the metamutex state machine processes such requests and sends positive or negative acknowledgement to requesting agent. More specifically, as illustrated in the non-limiting example of FIG. 27, the context lock can be checked 2734. If the context was locked by another agent, a metamutex request can be queued 2736. A negative acknowledgement can then be sent to the agent 2738. Additionally, a periodic check can be performed between circle 2736 and circle 2738. If, on the other hand, the context is unlocked or uses a known key, a metamutex state machine can be utilized 2740. A positive acknowledgement can then be sent to the agent 2742.

In the case of a condition, the agent checks the lock 2744 and then checks the condition and run condition state machine 2746. The diagram then proceeds to condition state machine 2748. The context lock command (from sync metacommand decoder 2732) can be checked 2750 to determine whether there is a semaphore P or a semaphore V. A semaphore increments and/or decrements the semaphore register value, depending on the type of semaphore command. More specifically, if a semaphore P is present, the semaphore can be decremented 2752. A semaphore P checks the value 2754, and if the value is zero, conditionally suspends selected context 2754. If the value is not equal to zero, the diagram proceeds back to the metacommand and event detection loop.

If, at circle 2750, a semaphore V is detected, the Semaphore V increments the value and checks waiting list 2758. If any suspended contexts are waiting, this semaphore changes their status to "ready" 2760.

From sync metacommand decoder 2732, a notification and alert checks the context lock 2762 and sets an alert flag 2764 and alert code 2766 for particular context. Additionally, from sync metacommand decoder 2732, a barrier may be implemented using a fence and wait command. The context lock can be checked for a fence and/or a wait command 2768. If a fence is detected, the fence value can be written to a register 2770. The context can then be sent to "Ready" status 2772 and the diagram can return to set alert flag 2764 and set alert code 2766 to compare the context wait value to the updated fence when the fence begins.

If at circle 2768, a wait command is determined, the wait command compares its value with fence register 2774. If the value of the wait command is less than or equal to the barrier, the diagram returns to circle 2772, to set ready the context. If, the value of the wait command is greater than the barrier, selected context can be suspended and an S-code can be set 2776.

FIG. 28A illustrates metamutex state machine, which executes disable/enable context and lock/unlock context metacommands. Disable indicates that the context would not react to operations and events except enabling agent the it ID in lock register. A context is not be executed and activated by any local events as well. An enable command from the agent with the same ID as in a lock key register may enable the context and make it sensitive to any agents. Lock and unlock commands do not block the context itself, it continue to be sensitive to local scheduler. Only access to context registers are locked from other agents except one who acquired the lock.

From metamutex decode 2832, a received disable means that a context may not be configured to react to operations and events except enabling an agent ID in the lock register. A context may not be executed and activated by local events, as well. As such, the context can be disabled 2834, an enabling agent type can be set 2836, and a lock key (enabling agent ID) can be set 2838. A positive acknowledgement can then be sent to agent 2840.

An enable command from the agent with the same ID as in a lock key register can enable the context and make the context sensitive to agents. If an enable command is received, the context can be enabled 2842 and the context can be set to "Any Agent" type 2844. Lock and unlock commands may not block the context itself, but may continue to be sensitive to a local scheduler. Access to context registers may be locked from other agents except one who acquired the lock. If a lock command is received, the context can be locked 2846, the locking agent type can be set 2848 and the lock key (agent ID) can be set 2850. If an unlock command is received, the context can be unlocked 2852 and the agent type and ID can be cleared 2854.

FIG. 28B depicts sync condition decoding and processing state machine. From condition decode 2856, condition wait checks a predicate 2858 and if the predicate is true, the condition wait changes the context status to "Ready" 2860. In case of an immediate start request, the condition wait also starts this context 2862. In case of a false condition at circle 2858, the condition wait changes the status to "suspended" 2864, but the context may continue to execute until interrupted by a local scheduler. In case of an immediate stop, the context may be switched right away 2866. The diagram can then return back to metacommand and event detection loop.

Condition signal and broadcast will set alert flags and alert codes for selected or all contexts respectively. More specifically, for a condition signal, a ready selected context can be set 2868, a context alert flag can be set 2870, and a context alert code can be set 2872. For a condition broadcast, ready all contexts can be set 2874, all context alerts can be set 2876, and all context alert cones can be set 2878.

Immediate start and immediate stop are hard versions of sync condition wait which cause immediate actions, soft action version will just set up the status of context leaving to local scheduler context switch. FIG. 28B illustrates a condition state machine, which executes condition wait, condition signal and condition broadcast metacommands. Condition wait checks predicate and if it is true it changes the context status to "Ready." Similarly, in case of immediate start request this context is started. In case of a false condition, the status is changed to "suspended" but the context will continue to execute until interrupted by local scheduler. In case of immediate stop, the context will be switched right away. Condition signal and broadcast will set alert flags and alert codes for selected or all contexts respectively.

FIG. 29 illustrates an example of metaprocessor control register pool, which contains few register blocks or groups including nonlimiting examples of predicate and condition configuration block, unconditional event and signal configuration block (blocks 2946, 2948), sync primitive register block (blocks 2950, 2952), metaprocessor action control register block (blocks 2960, 2962), timer configuration and control register block (blocks 2964, 2966), and local scheduler control register block (blocks 2968, 2970, 2972). Functionality of predicate and condition registers have been described in previous sections and examples of implementation of such registers are depicted in FIG. 30.

Unconditional event and signal mapping registers (blocks 2946, 2948) may contain mapping of action registers to different signals and events as it is illustrated in FIG. 31. Sync primitive register block contains a group of semaphore registers and sync primitive control register with examples in FIG. 31, described below. A semaphore register (block 2950) contains a mode field, flag field for binary semaphores, and counter field for counting semaphores. In addition, this register may contain the number of waiting context for this semaphore in each run list. A sync primitive control register (2952) may contain metamutex control part (FIG. 31) with lock check periodic time value and trace mode selection fields. For sync condition control the sync primitive control register may have a definition start/stop mode which may be immediate or defined by local scheduler. A condition broadcast scope also can be defined as in single run list or multiple run lists.

FIG. 30 is an example of predicate and condition configuration register implementation. More specifically, as illustrated in the nonlimiting example of FIG. 30, input event configuration 3032 can include one or more input event selections for predicates, each of which may include 4 bits (however this is not a requirement). Predicate update signaling enable register 3034 can include a 32-bit register (not a requirement). Final condition and mask register 3036 may also include 32-bits, with a plurality of final condition flags and masks. Condition configuration register 3038 may include predicate selections for a predetermined condition. Logic operation register 3040 can include logical operations (e.g., &, OR, XOR, etc.). Condition action configuration register 3042 can include a plurality of action registers for a plurality of conditions.

FIG. 31 is an example of implementation of some other metaprocessor control registers. More specifically, as illustrated in the nonlimiting example of FIG. 31, unconditional event mapping register 3132 can include a plurality of register updates. Unconditional internal signal mapping register 3134 can include a plurality of events/signals. Semaphore register 3136 can include a semaphore and associated mode, flag and counter, as well as a semaphore waiting list status. Sync primitive control register 3138 can include metamutex control with a periodic check time, and a trace mode, as well as a sync condition control with a start/stop mode and a broadcast scope. Local scheduler status and control register can include a run list arbitration mode, with a plurality of run lists.

FIG. 32 depicts an exemplary embodiment of metaprocessor instruction set formats. A first 32-bit word (or Double Words DW) contains an opcode or header (blocks 3232, 3240, 3250) of metacommand and action modifier fields (blocks 3234, 3242, 3252). One group of meta-instructions may write some data to the memory supporting synchronization primitives with operating system utilities and has 64-bit data (block 3236) and 64-bit address (block 3238) in 4 DW attached to header DW. Another group of metacommands may manipulate by GPU registers, predicates and conditions and in second DW it contains action code (block 3244) and action target ID (block 3246), third DW may contain the content of register to be written (block 3236).

Another group of metacommands may have up to five DWs. These metacommands includes opcode and action modifier DW (block 3250), second DW with action code and action attributes 1 and 2, third DW with action attribute 3 and optional memory address if required. Opcode and header field includes metaprocessor opcode, command format length, and format definition that describes the type of action description (explicit in metacommand or implicit in metaprocessor control register), attribute usage and memory address format if used.

Action modifier part (block 3252) may contain the action register reference in case of an implicit action description, GPU and CPU interrupt and alert messages generation flags, metacommand command scope definition and wait mask defining internal signals to be synchronized.

Action code field (block 3254) in the second DW is similar to embodiments previously described in metaprocessor action register. The action code may include codes related to register, predicate and condition manipulation and monitoring. As a nonlimiting example, several conditional metacommands can be implemented using such approach. Action attribute 1 (block 3256) defines default context to start, action attribute 2 (block 3258) defines selected context to start. Action attribute 3 (block 3258) defines a local context ID. The third DW contains context ID to be switched to, remote GPU and CPU IDs to send an interrupt or alert messages. Optional memory address (block 3262) may be used to copy or fetch some data from system or video memory.

One should note that the flowcharts included herein show the architecture, functionality, and operation of a possible implementation of software and/or hardware. In this regard, each block can be interpreted to represent a module, segment, or portion of code, logical component, which can be configured to execute at least one instructions for implementing the specified logical function(s). It should also be noted that in some alternative implementations, the functions noted in the blocks may occur out of the order. For example, two steps shown in succession may in fact be executed substantially concurrently or the blocks may sometimes be executed in the reverse order, depending upon the functionality involved.

One should also note that any of the logical steps listed herein, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

It should also be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.
Implementation of described above functionality can different depending on the architecture of GPU and may include hardwired or programmable cores. As a nonlimiting example, implementations of the functionality described above can be different depending on the architecture of the GPU and may include hardwired and/or programmable processing logic cores.

Therefore, at least the following is claimed:

1. A Metacommand Processing Unit within a Graphics Processing Unit (GPU), comprising:
    a metaprocessor configured with at least one context register, the metaprocessor including context management logic; and
    a metaprocessor control register block coupled to the metaprocessor, the metaprocessor control register block configured to receive metaprocessor configuration data, the metaprocessor control register block further configured to define actions to be performed by the context management logic,
    wherein the metaprocessor is further configured to perform at least one of: GPU-to-GPU synchronization and Central Processing Unit (CPU)-to-GPU synchronization in a multi-GPU and multi-CPU configuration, wherein the metaprocessor is further configured to execute groups of metacommands for synchronization and context management of local, remote, and peer actors with respect to the GPU.

2. The Metacommand Processing Unit of claim 1, further comprising: a Bus Interface Unit (BIU) configured to provide access from a system processor to the metaprocessor.

3. The Metacommand Processing Unit of claim 1, further comprising:
    a bus message decoder and encoder configured to receive and send messages from and to a peer GPU via an interconnection media.

4. The Metacommand Processing Unit of claim 1, further comprising:
    a GPU command stream processor configured to fetch a current context command stream and send commands for execution to at least one of the following:
    a GPU pipeline and the metaprocessor.

5. The Metacommand Processing Unit of claim 1, wherein the metaprocessor is configured to process at least one implicit metacommand.

6. The Metacommand Processing Unit of claim 5, wherein the at least one implicit metacommand is described by at least one of the following: an internal signal and a control register update event.

7. The Metacommand Processing Unit of claim 1, wherein the metaprocessor is configured to process at least one explicit metacommand.

8. The Metacommand Processing Unit of claim 7, wherein the at least one explicit command is described by a command token.

9. The Metacommand Processing Unit of claim 1, further comprising an explicit metacommand decoder.

10. The Metacommand Processing Unit of claim 1, further comprising an implicit metacommand decoder, the implicit metacommand decoder including an event detector coupled with an event mapping table and a signal detector coupled with a signal mapping table.

11. The Metacommand Processing Unit of claim 1, further comprising a condition mapping component configured to define conditional selection of metacommand action code.

12. The Metacommand Processing Unit of claim 1, wherein the synchronization is based on at least one of the following:
    a local scheduler, a context status, event and condition monitor, a context synchronization control logic, and timer management logic.

13. The Metacommand Processing Unit of claim 1, further comprising local scheduler logic, the local scheduler logic including event and request processing logic and context management logic.

14. The Metacommand Processing Unit of claim 1, wherein the context management logic is configured to execute at least one metacommand selected from changing a status of a selected context, loading and starting a new context, switching to a selected context, suspending a selected context, and changing a priority of a selected context.

15. The Metacommand Processing Unit of claim 1, wherein the local actors comprise local GPU circuits and pipeline blocks with a current GPU context, wherein the remote actors comprise a CPU-based scheduler, and wherein the peer actors comprise a different GPU context relative to the current GPU context.

16. A system within a Graphics Processing Unit (GPU) for processing metacommands, comprising:
    metacommand execution logic configured to execute at least one metacommand, wherein the at least one metacommand is executed to perform at least one of: GPU-to-GPU synchronization and Central Processing Unit (CPU)-to-GPU synchronization in a multi-GPU and multi-CPU configuration, wherein the metacommand execution logic is further configured to execute groups of metacommands for synchronization and context management of local, remote, and peer actors with respect to the GPU;

a context description register block configured to receive a context select signal and a context status update signal and provide context status data to the metacommand execution logic; and a metaprocessor control register block configured to receive a select predicate and condition signal and a select unconditional action signal and provide a final condition signal and metacommand action code to metacommand execution logic;

wherein the metacommand execution logic is further configured to execute at least one of changing a status of a selected context, loading and starting a new context, switching to a selected context, suspending a selected context, and changing a priority of a selected context.

17. The system of claim 16, further comprising an implicit metacommand decoder configured to detect a register update and at least one internal GPU signal.

18. The system of claim 17, wherein the implicit metacommand decoder includes at least one of the following:

an event mapping block, a signal mapping block, an event detector block, and a signal detector block.

19. The system of claim 16, further comprising an explicit metacommand decoder configured to provide a metacommand action code and condition selection from a command token.

20. The system of claim 19, wherein the metacommand execution logic configured to execute at least one state machine configured to perform at least one of the following:

state transition, processing a metacommand, context management processing, signal and request processing, conditional and unconditional event processing, context, status, and event condition monitoring, local scheduling, and timer related metacommand processing.

21. The system of claim 16, wherein the metaprocessor control register block includes at least one of the following:

a predicate and condition configuration register, a condition mapping component to select action register, and a metacommand action register.

22. A method for executing a metacommand within a Graphics Processing Unit (GPU), comprising:

detecting a new metacommand, wherein the new metacommand is executed to perform at least one of: GPU-to-GPU synchronization and Central Processing Unit (CPU)-to-GPU synchronization in a multi-GPU and multi-CPU configuration, wherein detected new metacommands are executed for synchronization and context management of local, remote, and peer actors with respect to the GPU;

determining whether the detected metacommand is an implicit metacommand;

in response to determining that the detected metacommand is an implicit metacommand, updating a context register, detecting an event type associated with the updated context register;

determining whether the detected metacommand is an explicit metacommand; and in response to determining that the detected metacommand is an explicit metacommand, determining whether action encoding is a direct action code and, in response to determining that the action encoding is a direct action code, decoding the action and sending the action code to a logic block;

wherein the new metacommand includes performing at least one of changing a status of a selected context, loading and starting a new context, switching to a selected context, suspending a selected context, and changing a priority of a selected context.

23. The method of claim 22, further comprising executing the metacommand and updating status data associated with a context.

24. The method of claim 22, further comprising, in response to determining that the metacommand is an implicit metacommand, determining whether signal routing is conditional and, in response to determining that the signal routing is conditional, setting a predicate associated with the metacommand and retrieving an action code using condition mapping.

25. The method of claim 22, further comprising, in response to determining that the metacommand is an implicit metacommand, determining whether signal routing is unconditional and, in response to determining that the signal routing is unconditional, retrieving an action code using at least one of the following: event mapping and signal mapping.

26. The method of claim 22, further comprising determining at least one error setting an alert for an affected context.

* * * * *